United States Patent
Darji et al.

(10) Patent No.: US 12,254,206 B2
(45) Date of Patent: Mar. 18, 2025

(54) NON-DISRUPTIVELY MOVING A STORAGE FLEET CONTROL PLANE

(71) Applicant: PURE STORAGE, INC., Mountain View, CA (US)

(72) Inventors: Prakash Darji, Santa Clara, CA (US); Lawrence Mertes, San Jose, CA (US); Taher Vohra, Sunnyvale, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

(21) Appl. No.: 17/849,254

(22) Filed: Jun. 24, 2022

(65) Prior Publication Data

US 2022/0317912 A1    Oct. 6, 2022

Related U.S. Application Data

(63) Continuation-in-part of application No. 17/214,426, filed on Mar. 26, 2021, now Pat. No. 12,131,056.

(60) Provisional application No. 63/346,715, filed on May 27, 2022, provisional application No. 63/021,835, filed on May 8, 2020.

(51) Int. Cl.
G06F 3/06    (2006.01)

(52) U.S. Cl.
CPC .......... G06F 3/0647 (2013.01); G06F 3/0604 (2013.01); G06F 3/067 (2013.01)

(58) Field of Classification Search
CPC ..... G06F 3/0647; G06F 3/06404; G06F 3/067
See application file for complete search history.

(56) References Cited

U.S. PATENT DOCUMENTS

| | | |
|---|---|---|
| 5,706,210 A | 1/1998 | Kumano et al. |
| 5,799,200 A | 8/1998 | Brant et al. |
| 5,933,598 A | 8/1999 | Scales et al. |
| 6,012,032 A | 1/2000 | Donovan et al. |
| 6,085,333 A | 7/2000 | Dekoning et al. |
| 6,643,641 B1 | 11/2003 | Snyder |
| 6,647,514 B1 | 11/2003 | Umberger et al. |
| 6,789,162 B1 | 9/2004 | Talagala et al. |

(Continued)

FOREIGN PATENT DOCUMENTS

| | | |
|---|---|---|
| EP | 0725324 A2 | 8/1996 |
| WO | 2012087648 A2 | 6/2012 |

(Continued)

OTHER PUBLICATIONS

Bellamy-McIntyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

(Continued)

*Primary Examiner* — Baboucarr Faal

(57) ABSTRACT

Non-disruptively moving a storage fleet control plane, including deploying, on an edge device, one or more agents that are managed by a control plane residing in a cloud computing environment; mediating one or more API requests, generated by the control plane, directed to the one or more agents on the edge device; and migrating, in response to a first condition, the control plane to the edge device.

20 Claims, 23 Drawing Sheets

(56) References Cited

U.S. PATENT DOCUMENTS

| | | |
|---|---|---|
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,200,887 B2 | 6/2012 | Bennett |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,444,822 B1 | 9/2016 | Borowiec et al. |
| 9,507,532 B1 | 11/2016 | Colgrove et al. |
| 9,632,870 B2 | 4/2017 | Bennett |
| 9,779,177 B1 | 10/2017 | Reiner et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison et al. |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0314408 A1* | 10/2014 | Wittenschlaeger ...... H04L 49/15 370/254 |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0222694 A1 | 8/2015 | Pandey et al. |
| 2015/0378888 A1 | 12/2015 | Zhang et al. |
| 2016/0098323 A1 | 4/2016 | Mutha et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2018/0081562 A1 | 3/2018 | Vasudevan |

(56) References Cited

U.S. PATENT DOCUMENTS

| | | | |
|---|---|---|---|
| 2018/0205574 A1* | 7/2018 | Radunovic | .......... H04L 67/1034 |
| 2019/0171494 A1 | 6/2019 | Nucci et al. | |
| 2019/0220485 A1 | 7/2019 | Jung et al. | |
| 2020/0160191 A1 | 5/2020 | Brisimi et al. | |
| 2021/0056121 A1 | 2/2021 | Jayanthi | |
| 2021/0112141 A1 | 4/2021 | Jonnavalli | |
| 2021/0311758 A1* | 10/2021 | Cao | ........................ G06F 8/70 |
| 2021/0349657 A1 | 11/2021 | Darji | |

FOREIGN PATENT DOCUMENTS

| | | |
|---|---|---|
| WO | 2013071087 A1 | 5/2013 |
| WO | 2014110137 A1 | 7/2014 |
| WO | 2016015008 A1 | 1/2016 |
| WO | 2016151584 A2 | 9/2016 |
| WO | 2016190938 A1 | 12/2016 |
| WO | 2016195759 A1 | 12/2016 |
| WO | 2016195958 A1 | 12/2016 |
| WO | 2016195961 A1 | 12/2016 |
| WO | 2021226344 A1 | 11/2021 |

OTHER PUBLICATIONS

ETSI, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Faith, "dictzip file format", GitHub.com (online), accessed Jul. 28, 2015, 1 page, URL: github.com/fidlej/idzip.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, Apr. 29, 2016, 12 pages.

International Search Report and Written Opinion, PCT/US2016/015008, May 4, 2016, 12 pages.

International Search Report and Written Opinion, PCT/US2016/016333, Jun. 8, 2016, 12 pages.

International Search Report and Written Opinion, PCT/US2016/020410, Jul. 8, 2016, 12 pages.

International Search Report and Written Opinion, PCT/US2016/032052, Aug. 30, 2016, 17 pages.

International Search Report and Written Opinion, PCT/US2016/032084, Jul. 18, 2016, 12 pages.

International Search Report and Written Opinion, PCT/US2016/035492, Aug. 17, 2016, 10 pages.

International Search Report and Written Opinion, PCT/US2016/036693, Aug. 29, 2016, 10 pages.

International Search Report and Written Opinion, PCT/US2016/038758, Oct. 7, 2016, 10 pages.

International Search Report and Written Opinion, PCT/US2016/040393, Sep. 22, 2016, 10 pages.

International Search Report and Written Opinion, PCT/US2016/044020, Sep. 30, 2016, 11 pages.

International Search Report and Written Opinion, PCT/US2016/044874, Oct. 7, 2016, 11 pages.

International Search Report and Written Opinion, PCT/US2016/044875, Oct. 5, 2016, 13 pages.

International Search Report and Written Opinion, PCT/US2016/044876, Oct. 21, 2016, 12 pages.

International Search Report and Written Opinion, PCT/US2016/044877, Sep. 29, 2016, 13 pages.

International Search Report and Written Opinion, PCT/US2021/031106, Sep. 13, 2021, 16 pages.

Kong, "Using PCI Express as the Primary System Interconnect in Multiroot Compute, Storage, Communications and Embedded Systems", White Paper, IDT.com (online), Aug. 28, 2008, 12 pages, URL: www.idt.com/document/whp/idt-pcie-multi-root-white-paper.

Li et al., "Access Control for the Services Oriented Architecture", Proceedings of the 2007 ACM Workshop on Secure Web Services (SWS '07), Nov. 2007, pp. 9-17, ACM New York, NY.

Microsoft, "Hybrid for SharePoint Server 2013—Security Reference Architecture", Microsoft (online), Oct. 2014, 53 pages, URL: hybrid.office.com/img/Security_Reference_Architecture.pdf.

Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Microsoft, "Hybrid Identity", Microsoft (online), Apr. 2014, 36 pages, URL: www.aka.ms/HybridIdentityWp.

Pcmag, "Storage Array Definition", Published May 10, 2013, URL: http://web.archive.org/web/20130510121646/http://www.pcmag.com/encyclopedia/term/52091/storage-array, 2 pages.

Storer et al., "Secure Data Deduplication", Proceedings of the 4th ACM International Workshop on Storage Security and Survivability (StorageSS'08), Oct. 2008, 10 pages, ACM New York, NY. USA, DOI: 10.1145/1456469.1456471.

Sweere, "Creating Storage Class Persistent Memory with NVDIMM", Published in Aug. 2013, Flash Memory Summit 2013, URL: http://ww.flashmemorysummit.com/English/Collaterals/Proceedings/2013/20130814_T2_Sweere.pdf, 22 pages.

Techopedia, "What is a disk array", techopedia.com (online), Jan. 13, 2012, 1 page, URL: web.archive.org/web/20120113053358/http://www.techopedia.com/definition/1009/disk-array.

Webopedia, "What is a disk array", webopedia.com (online), May 26, 2011, 2 pages, URL: web/archive.org/web/20110526081214/http://www.webopedia.com/TERM/D/disk_array.html.

Wikipedia, "Convergent Encryption", Wikipedia.org (online), accessed Sep. 8, 2015, 2 pages, URL: en.wikipedia.org/wiki/Convergent_encryption.

* cited by examiner

NON-DISRUPTIVELY MOVING A STORAGE FLEET CONTROL PLANE

CROSS-REFERENCE TO RELATED APPLICATIONS

This is a continuation in-part application for patent entitled to a filing date and claiming the benefit of earlier-filed U.S. patent application Ser. No. 17/214,426, filed Mar. 26, 2021, herein incorporated by reference in its entirety, which claims the benefit of U.S. Provisional Patent Application No. 63/021,835, filed May 8, 2020; this application also claims priority from U.S. Provisional Patent Application No. 63/346,715, filed May 27, 2022.

DESCRIPTION OF EMBODIMENTS

Figure 1A:
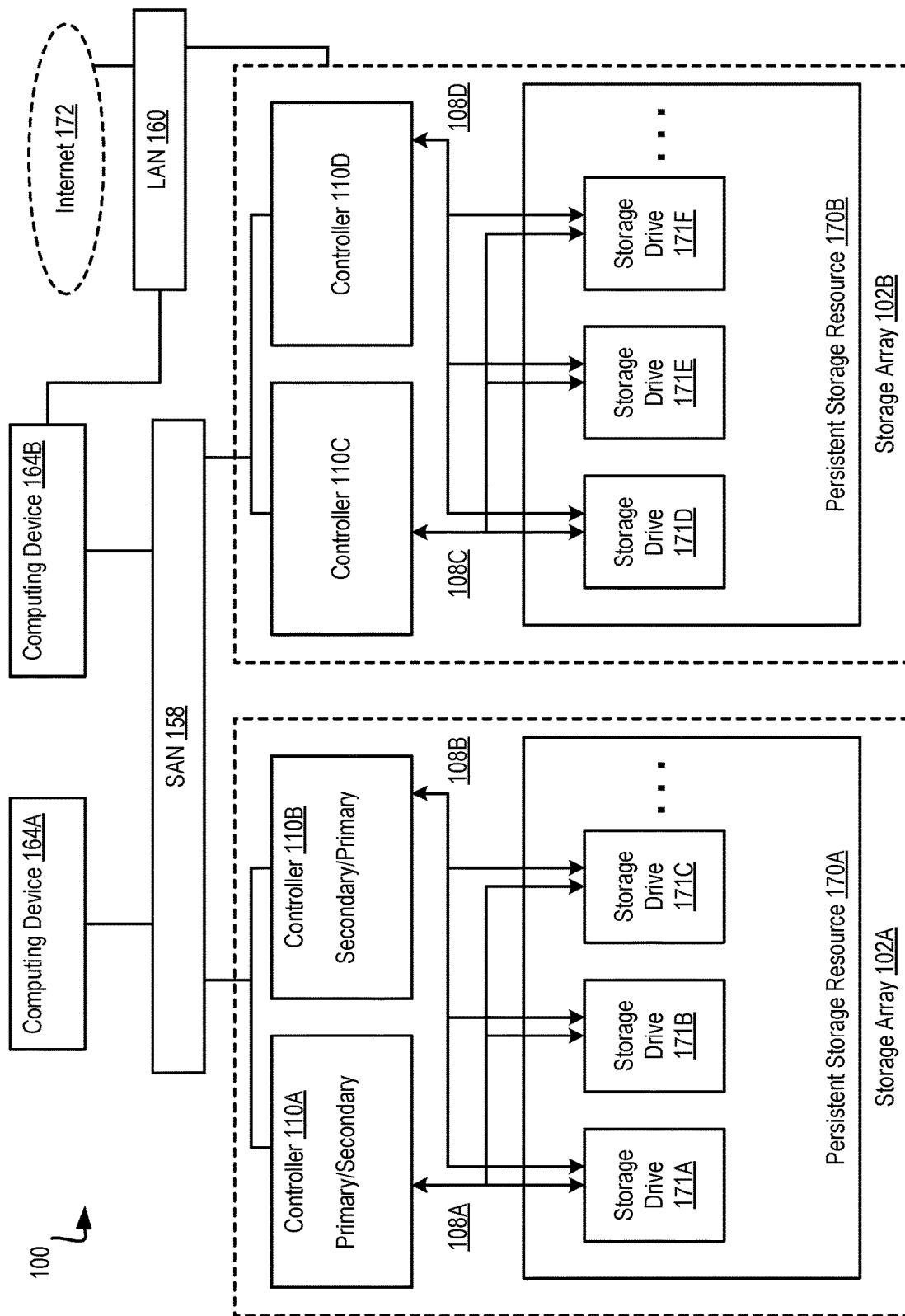
FIG. 1A illustrates a first example system for data storage in accordance with some implementations.

Example methods, apparatus, and products for non-disruptively moving a storage fleet control plane in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
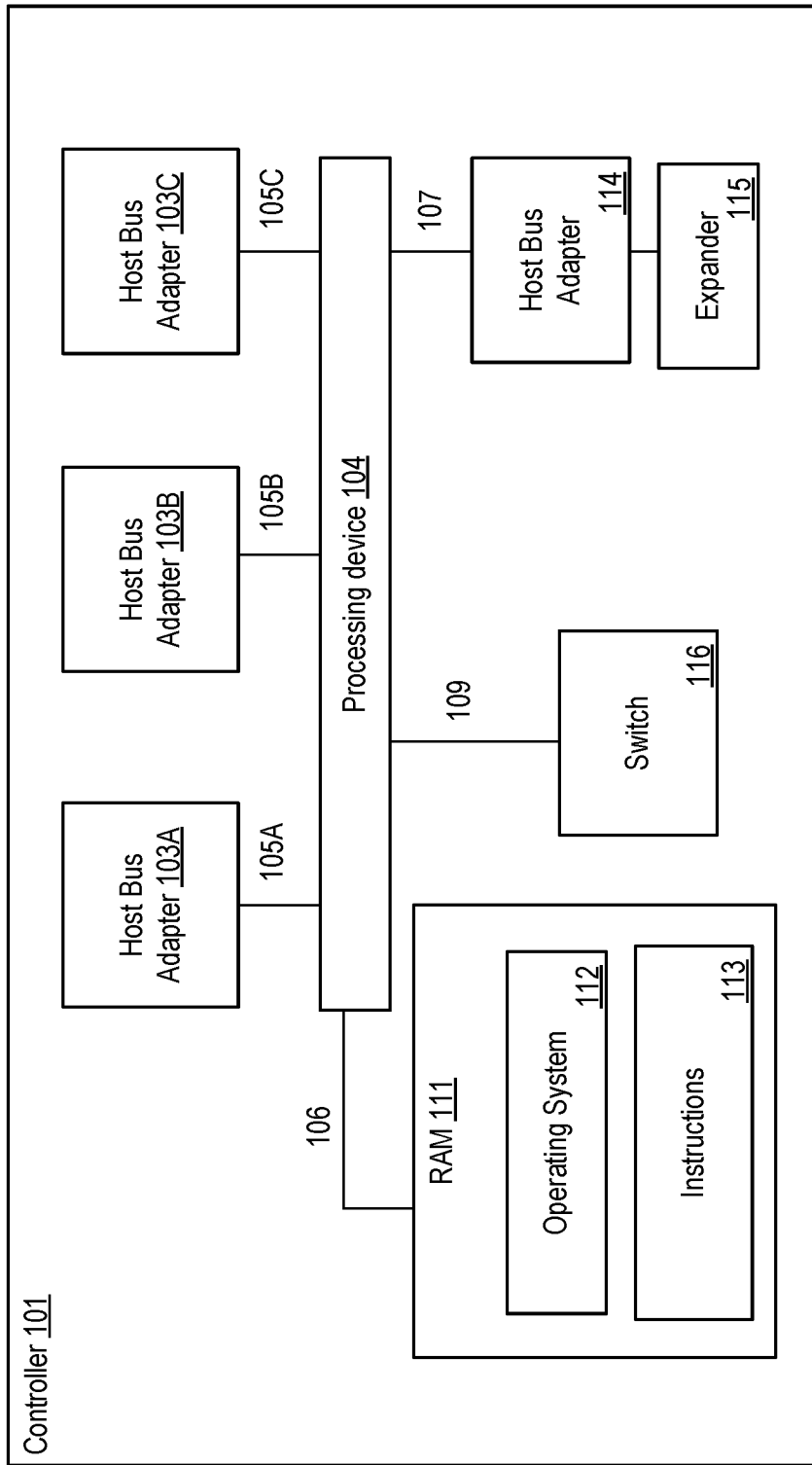
FIG. 1B illustrates a second example system for data storage in accordance with some implementations.

FIG. 1B illustrates an example system for data storage, in accordance with some implementations. Storage array controller 101 illustrated in FIG. 1B may be similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
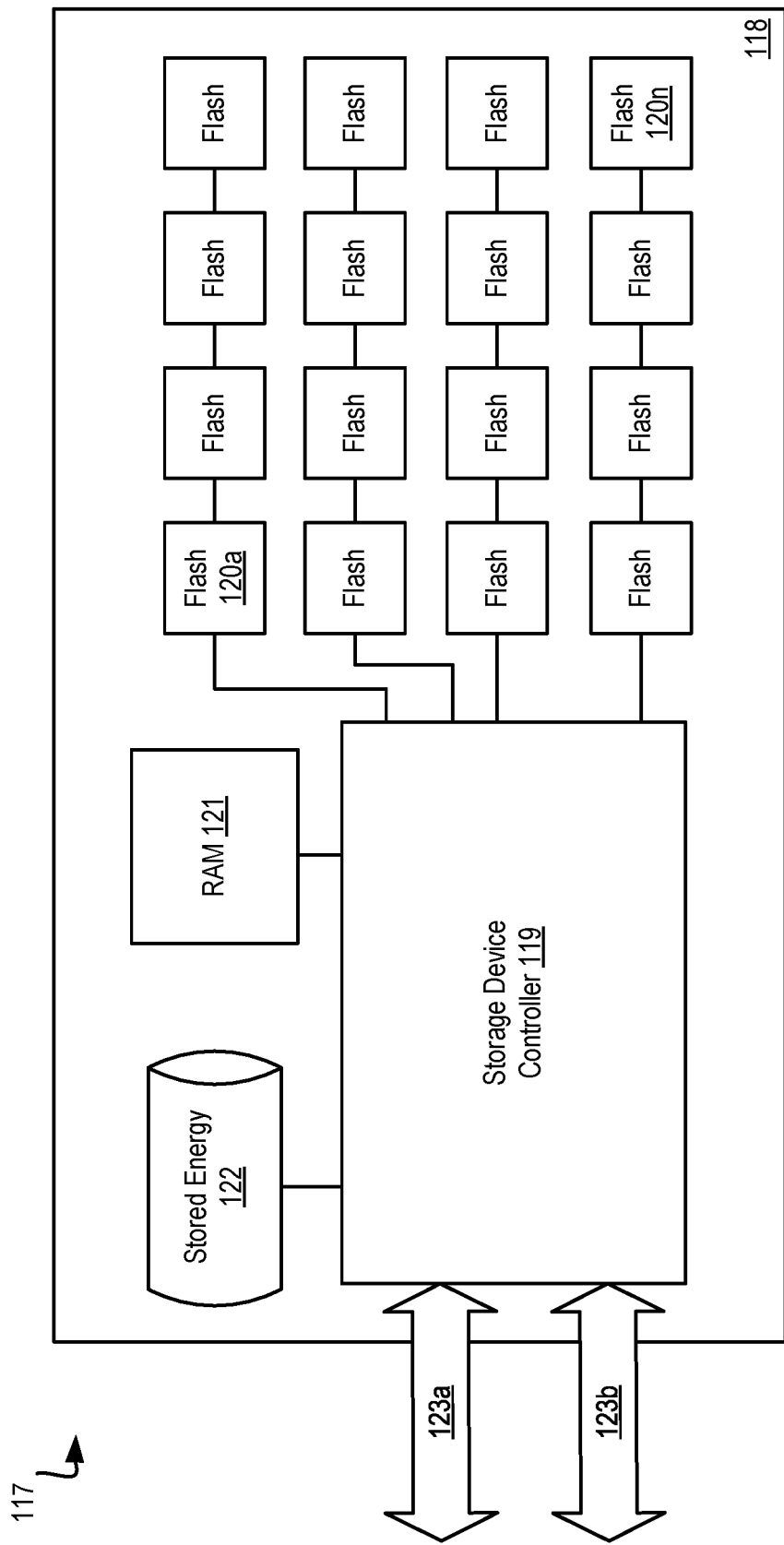
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
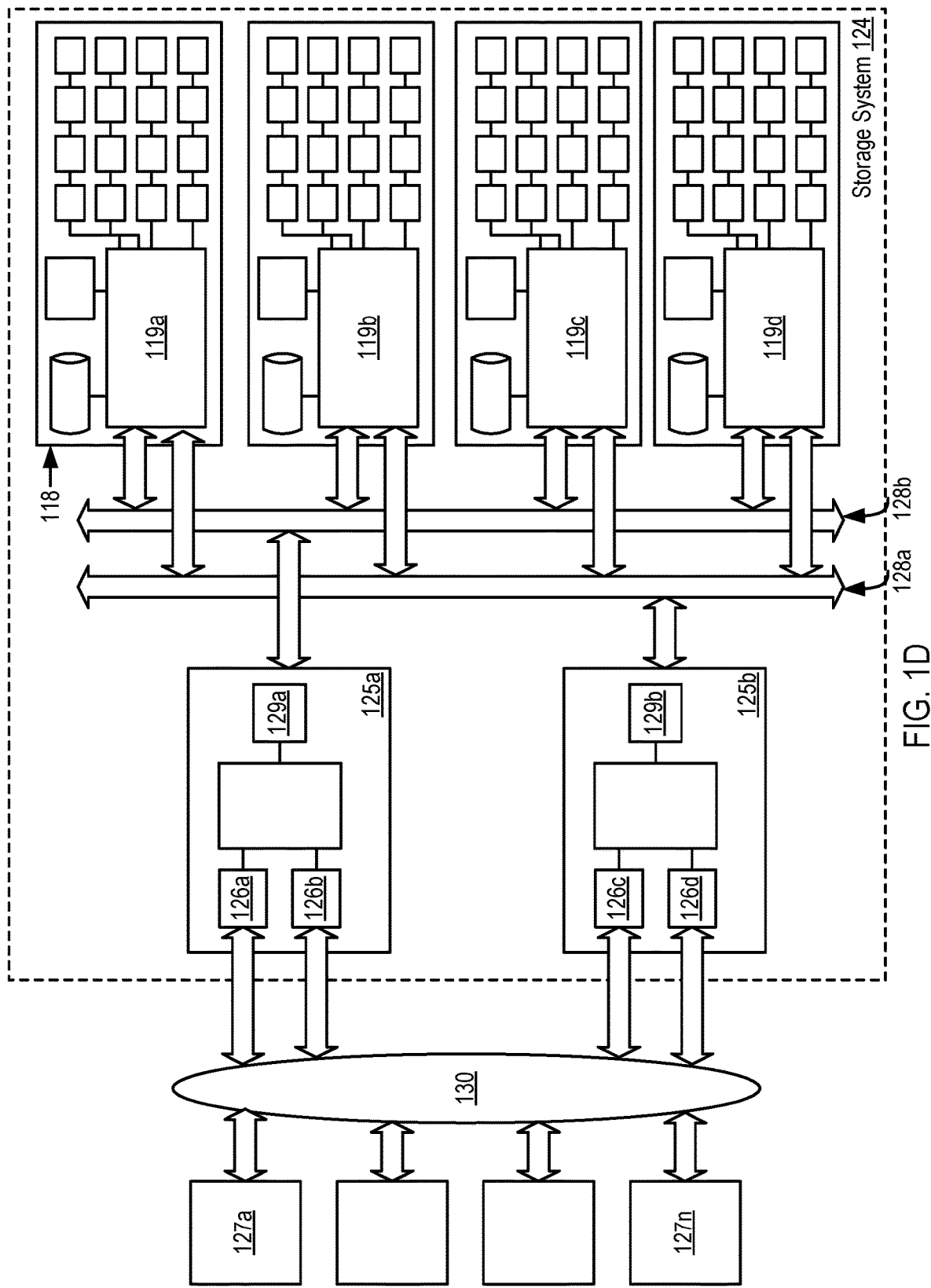
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
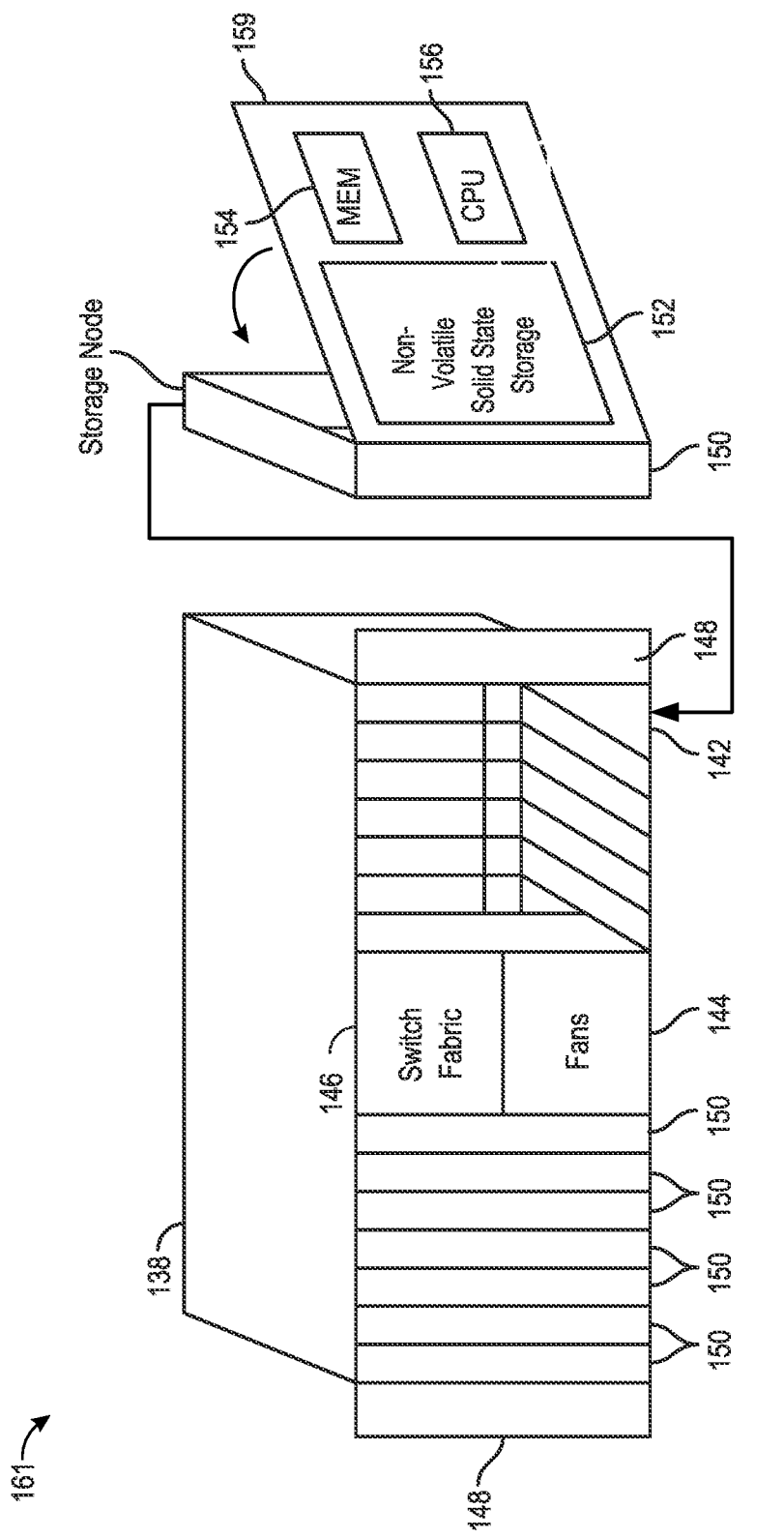
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
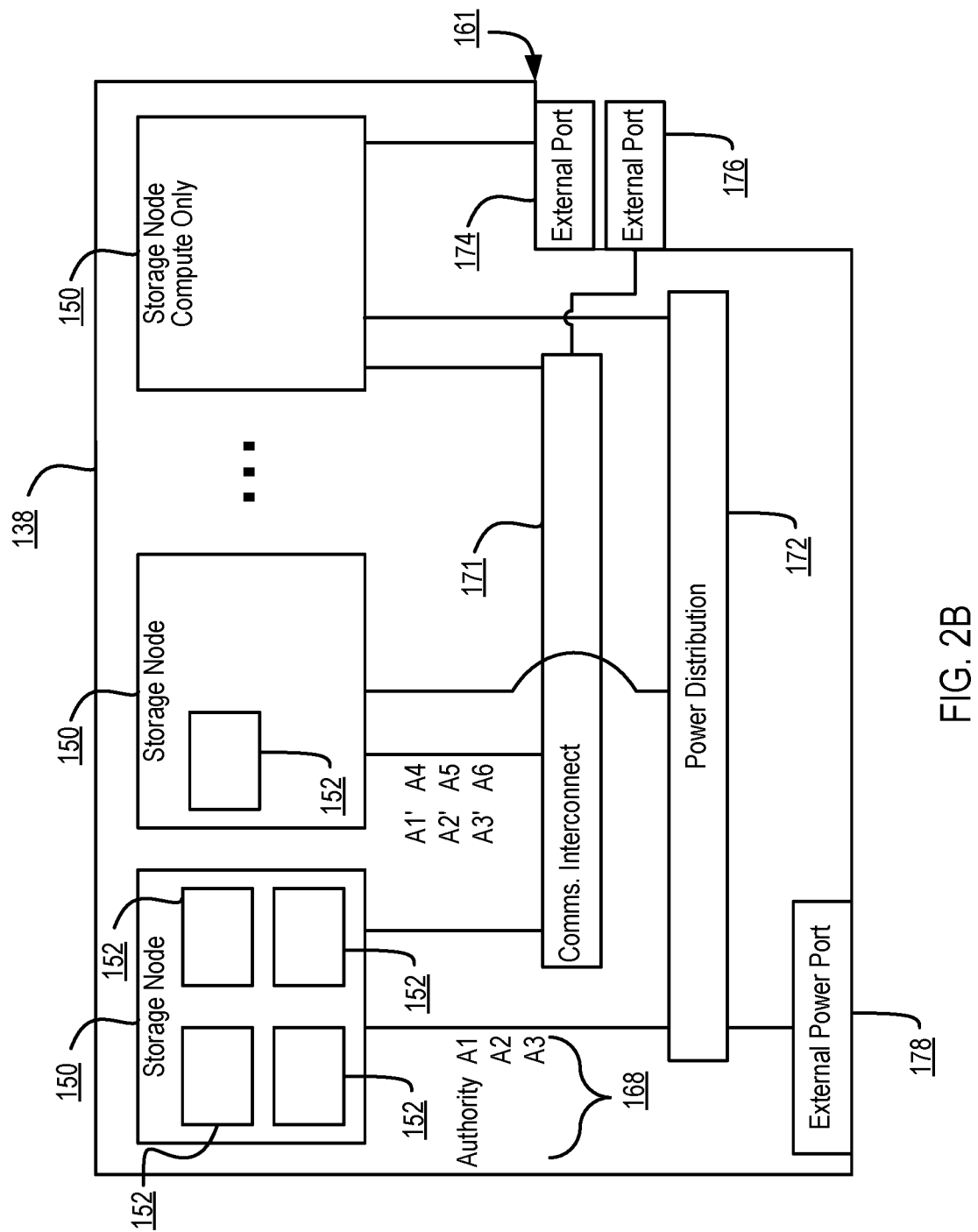
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
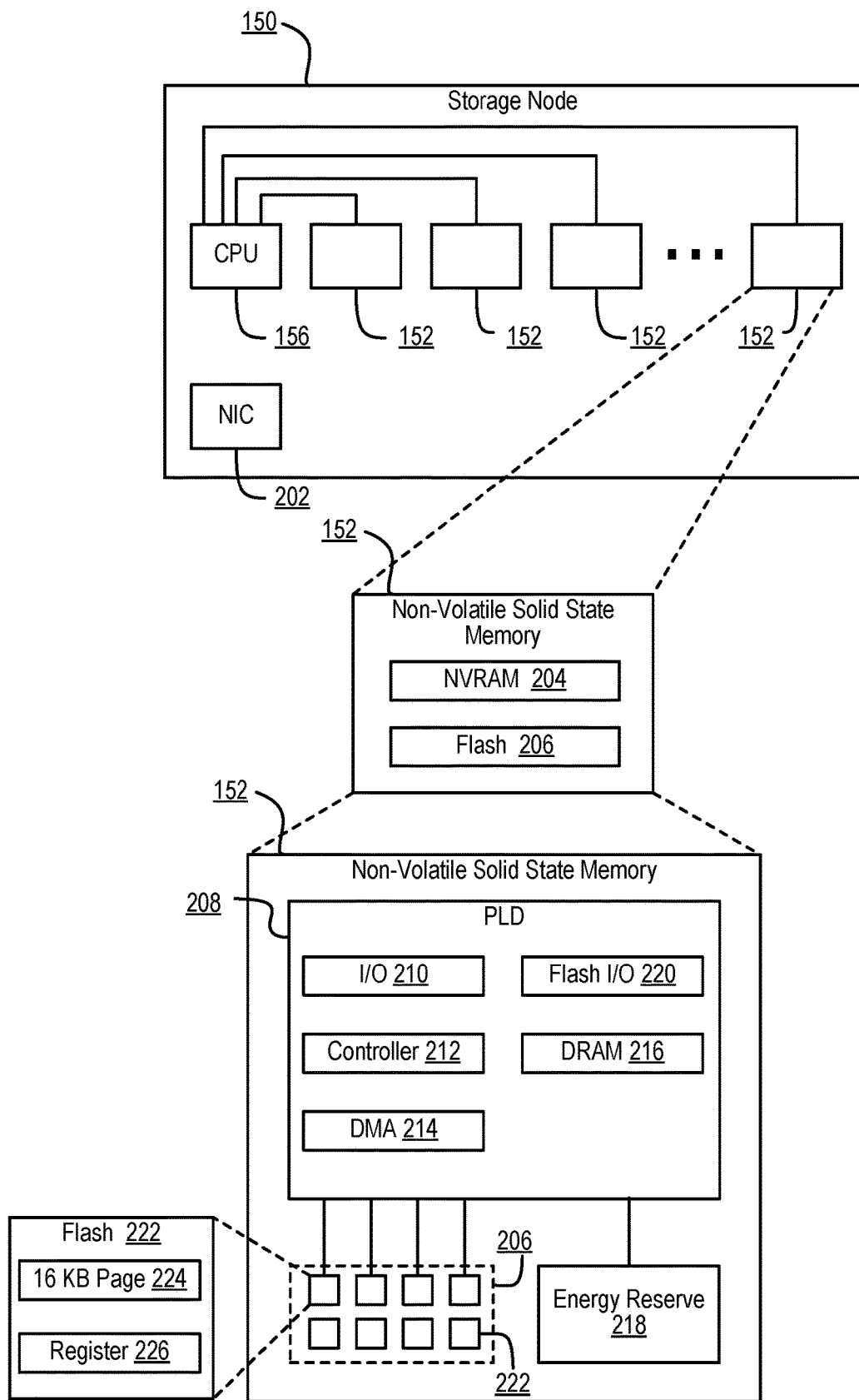
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e., multichip packages), in hybrid packages, as bare dies on a printed circuit board or other substrate, as encapsulated dies, etc. In the embodiment shown, the non-volatile solid state storage 152 has a controller 212 or other processor, and an input output (U/O) port 210 coupled to the controller 212. U/O port 210 is coupled to the CPU 156 and/or the network interface controller 202 of the flash storage node 150. Flash input output (U/O) port 220 is coupled to the flash dies 222, and a direct memory access unit (DMA) 214 is coupled to the controller 212, the DRAM 216 and the flash dies 222. In the embodiment shown, the U/O port 210, controller 212, DMA unit 214 and flash 1/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
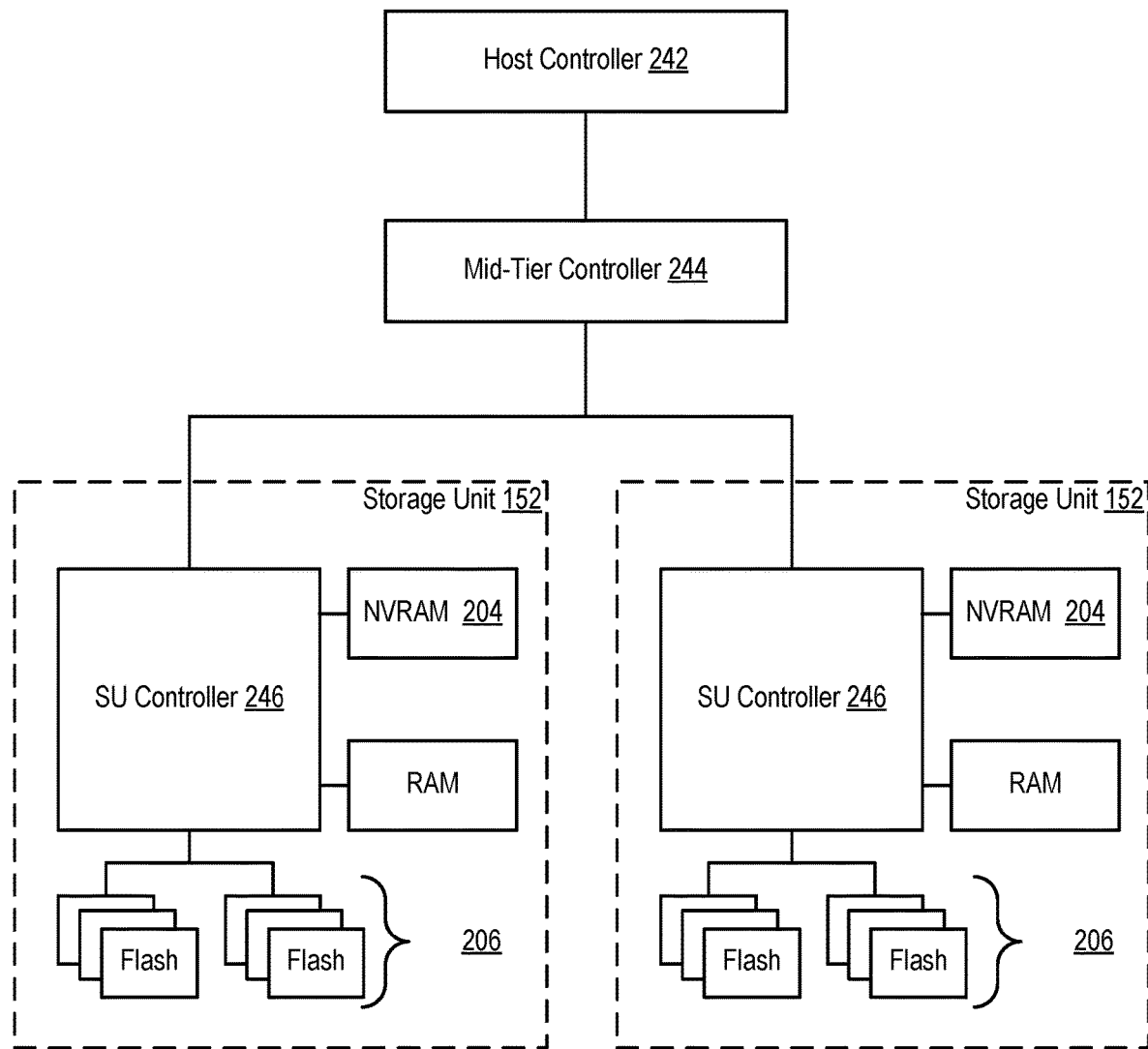
FIG. 2D shows a storage server environment, which uses embodiments of the storage nodes and storage units of some previous figures in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
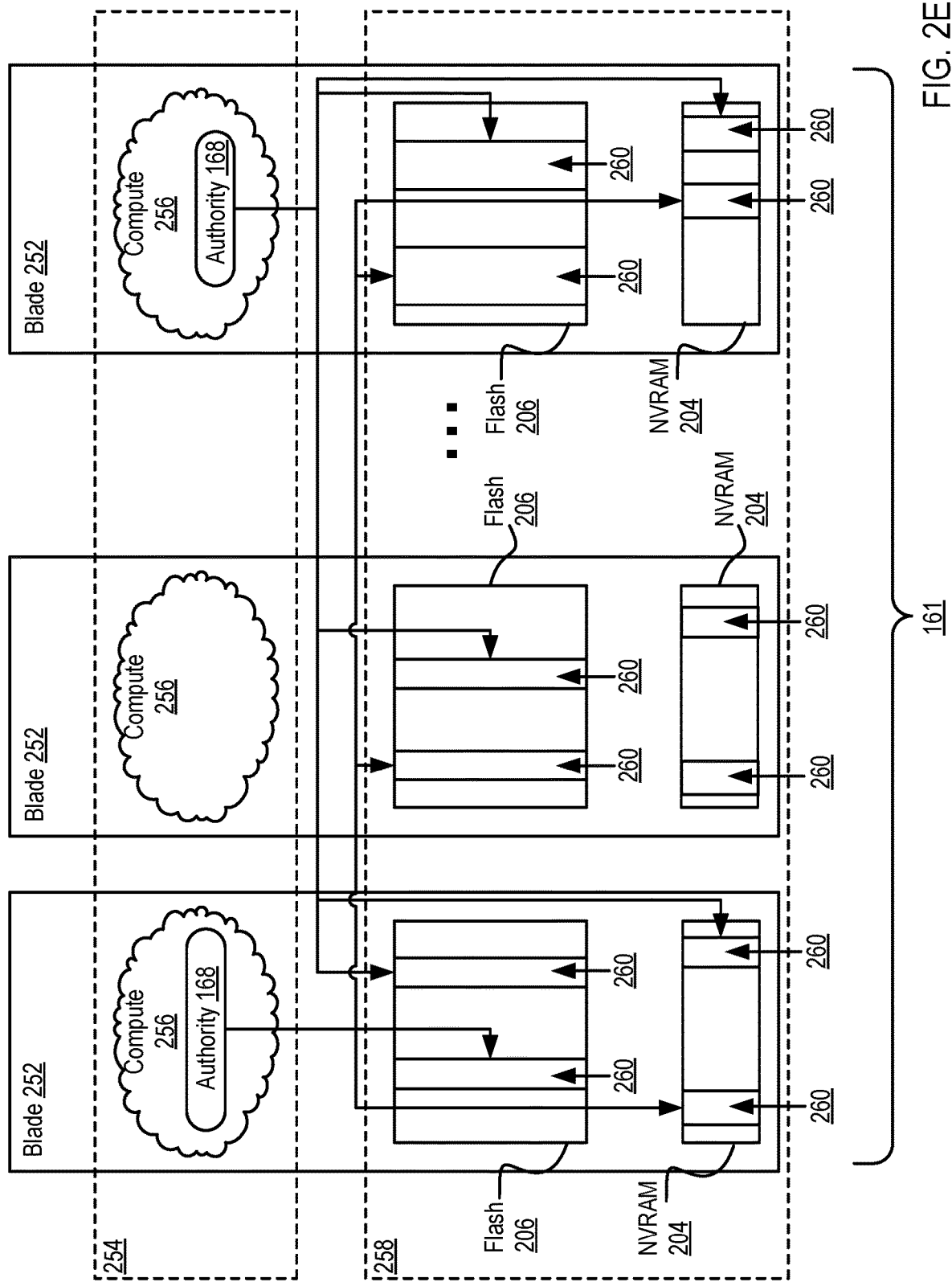
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g., partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
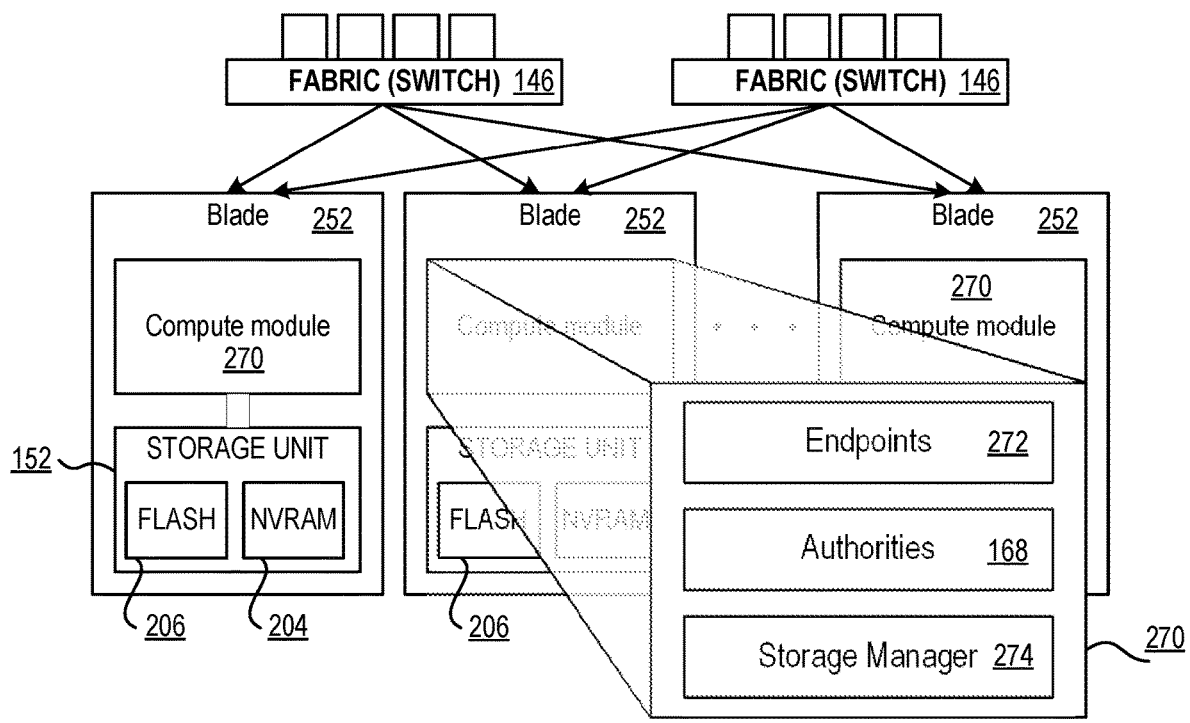
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
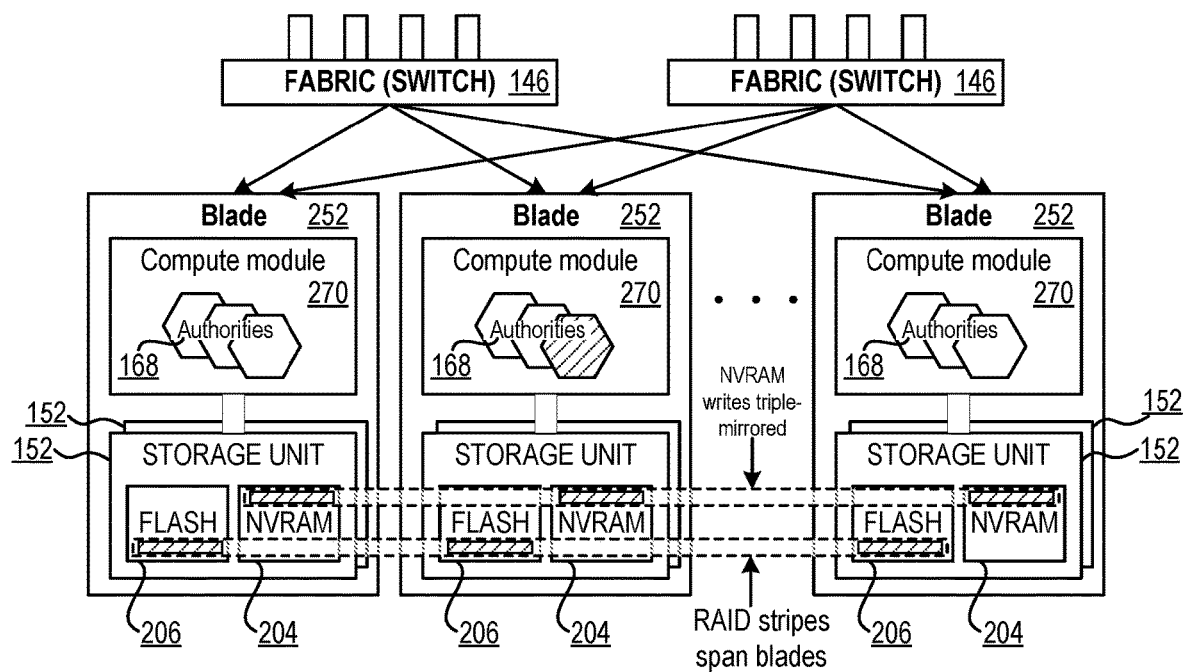
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
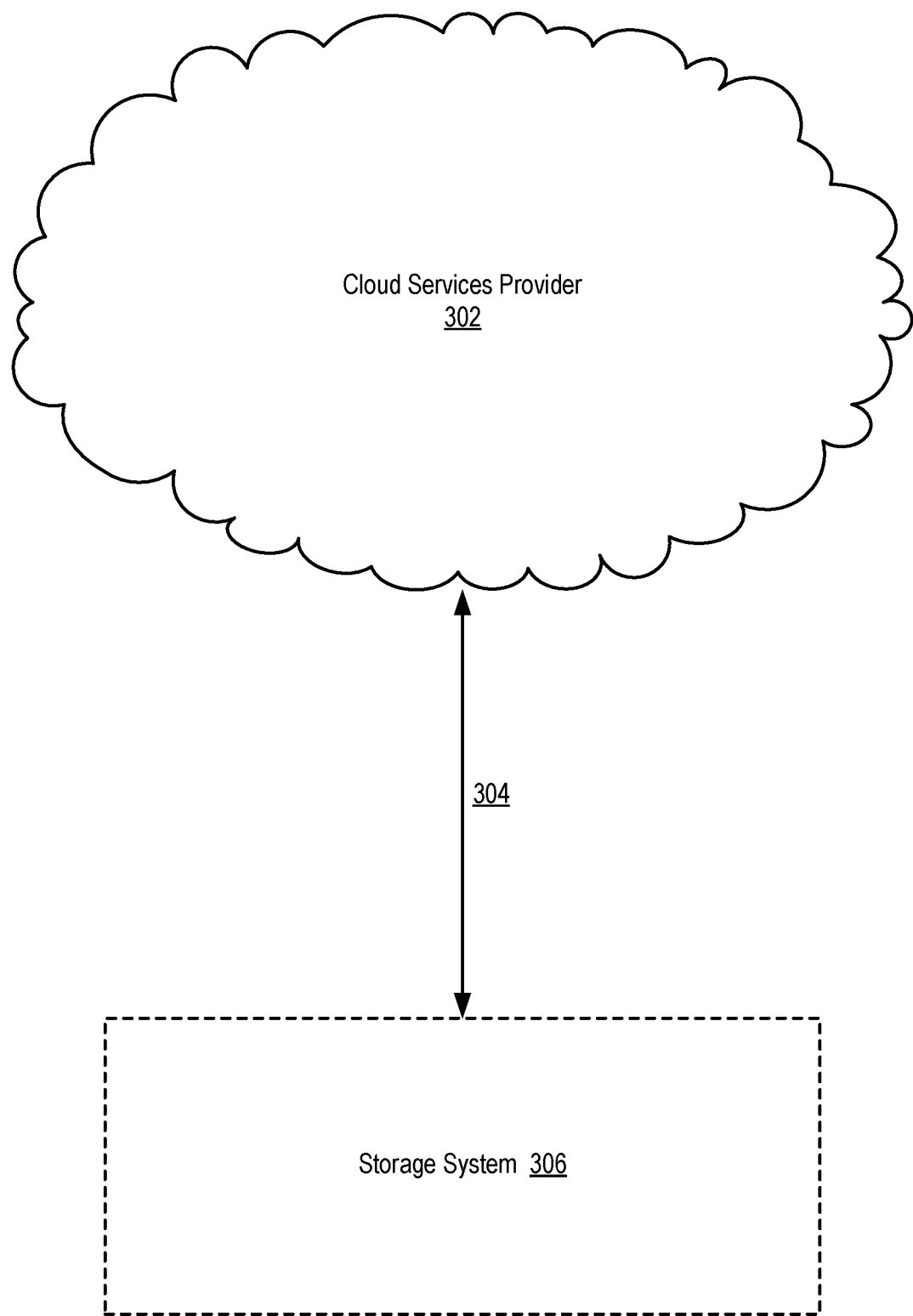
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-ID and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
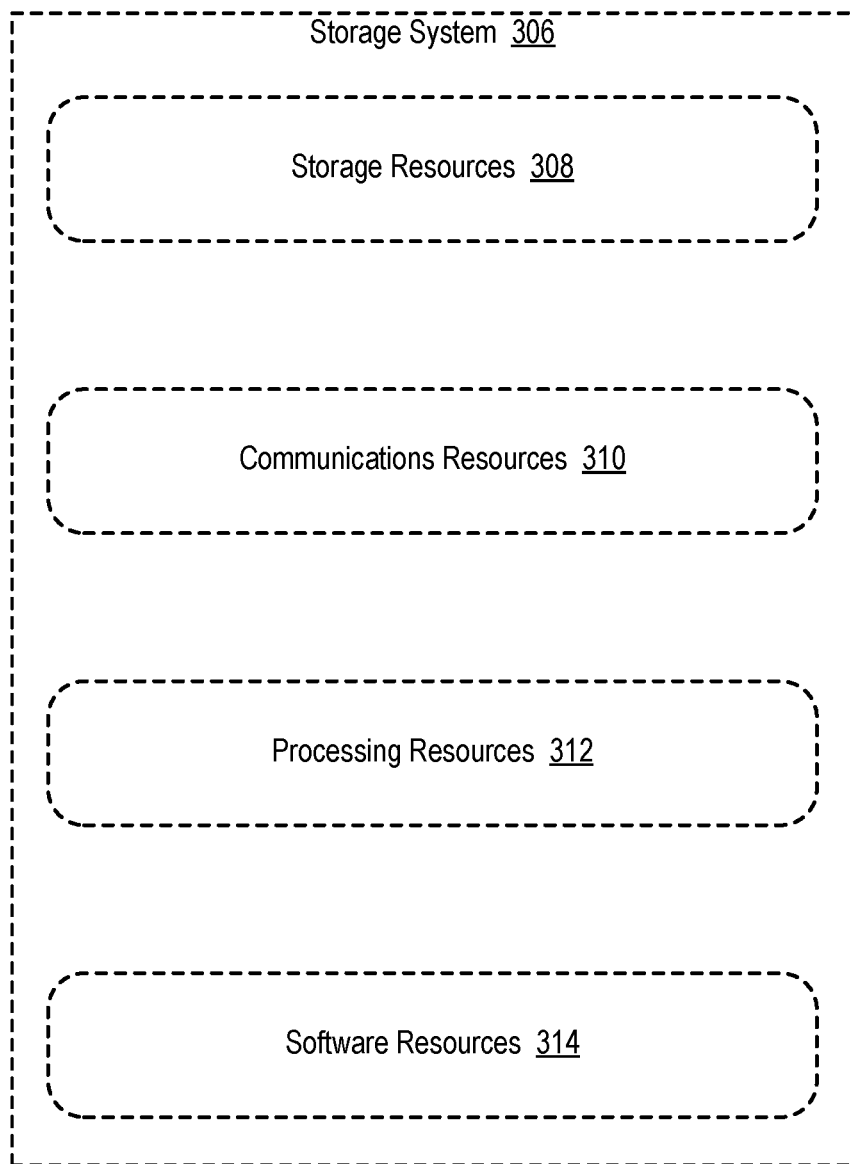
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3A may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
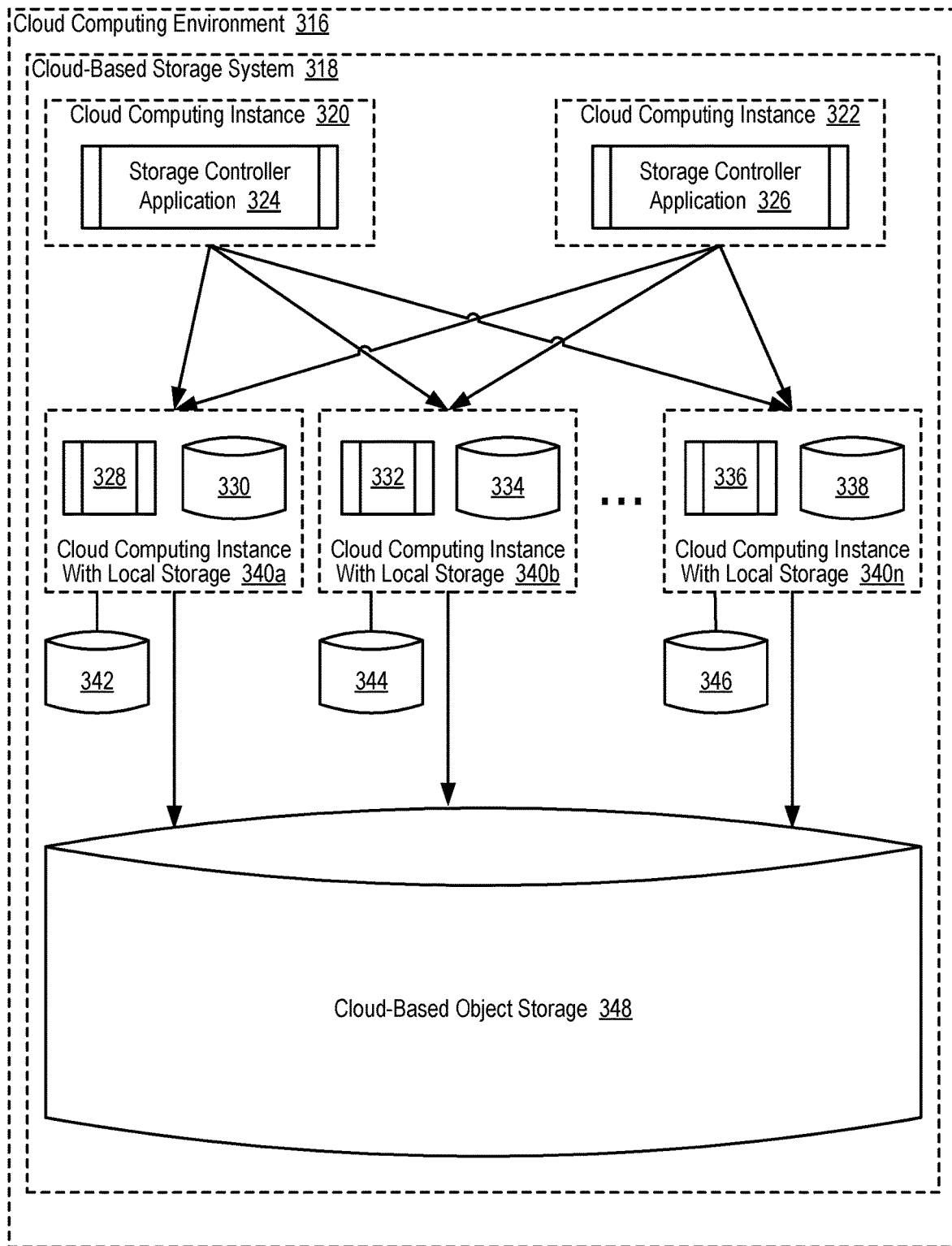
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS'), Microsoft Azure, Google Cloud Platform, IBM Cloud, Oracle Cloud, and others. The cloud-based storage system 318 may be used to provide services similar to the services that may be provided by the storage systems described above. For example, the cloud-based storage system 318 may be used to provide block storage services to users of the cloud-based storage system 318, the cloud-based storage system 318 may be used to provide storage services to users of the cloud-based storage system 318 through the use of solid-state storage, and so on.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data received from the users of the cloud-based storage system 318 to the cloud-based storage system 318, erasing data from the cloud-based storage system 318, retrieving data from the cloud-based storage system 318 and providing such data to users of the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322.

Consider an example in which the cloud computing environment 316 is embodied as AWS and the cloud computing instances are embodied as EC2 instances. In such an example, the cloud computing instance 320 that operates as the primary controller may be deployed on one of the instance types that has a relatively large amount of memory and processing power while the cloud computing instance 322 that operates as the secondary controller may be deployed on one of the instance types that has a relatively small amount of memory and processing power. In such an example, upon the occurrence of a failover event where the roles of primary and secondary are switched, a double failover may actually be carried out such that: 1) a first failover event where the cloud computing instance 322 that formerly operated as the secondary controller begins to operate as the primary controller, and 2) a third cloud computing instance (not shown) that is of an instance type that has a relatively large amount of memory and processing power is spun up with a copy of the storage controller application, where the third cloud computing instance begins operating as the primary controller while the cloud computing instance 322 that originally operated as the secondary controller begins operating as the secondary controller again. In such an example, the cloud computing instance 320 that formerly operated as the primary controller may be terminated. Readers will appreciate that in alternative embodiments, the cloud computing instance 320 that is operating as the secondary controller after the failover event may continue to operate as the secondary controller and the cloud computing instance 322 that operated as the primary controller after the occurrence of the failover event may be terminated once the primary role has been assumed by the third cloud computing instance (not shown).

Readers will appreciate that while the embodiments described above relate to embodiments where one cloud computing instance 320 operates as the primary controller and the second cloud computing instance 322 operates as the secondary controller, other embodiments are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n depicted in FIG. 3C may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 I3 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block-storage 342, 344, 346 that is offered by the cloud computing environment 316. The block-storage 342, 344, 346 that is offered by the cloud computing environment 316 may be embodied, for example, as Amazon Elastic Block Store ('EBS') volumes. For example, a first EBS volume may be coupled to a first cloud computing instance 340a, a second EBS volume may be coupled to a second cloud computing instance 340b, and a third EBS volume may be coupled to a third cloud computing instance 340n. In such an example, the block-storage 342, 344, 346 that is offered by the cloud computing environment 316 may be utilized in a manner that is similar to how the NVRAM devices described above are utilized, as the software daemon 328, 332, 336 (or some other module) that is executing within a particular cloud comping instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud comping instance 340a, 340b, 340n. In an alternative embodiment, rather than using the block-storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM.

In the example depicted in FIG. 3C, the cloud computing instances 340a, 340b, 340n with local storage 330, 334, 338 may be utilized, by cloud computing instances 320, 322 that support the execution of the storage controller application 324, 326 to service I/O operations that are directed to the cloud-based storage system 318. Consider an example in which a first cloud computing instance 320 that is executing the storage controller application 324 is operating as the primary controller. In such an example, the first cloud computing instance 320 that is executing the storage controller application 324 may receive (directly or indirectly via the secondary controller) requests to write data to the cloud-based storage system 318 from users of the cloud-based storage system 318. In such an example, the first cloud computing instance 320 that is executing the storage controller application 324 may perform various tasks such as, for example, deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances 340*a*, 340*b*, 340*n* with local storage 330, 334, 338. Either cloud computing instance 320, 322, in some embodiments, may receive a request to read data from the cloud-based storage system 318 and may ultimately send a request to read data to one or more of the cloud computing instances 340*a*, 340*b*, 340*n* with local storage 330, 334, 338.

Readers will appreciate that when a request to write data is received by a particular cloud computing instance 340*a*, 340*b*, 340*n* with local storage 330, 334, 338, the software daemon 328, 332, 336 or some other module of computer program instructions that is executing on the particular cloud computing instance 340*a*, 340*b*, 340*n* may be configured to not only write the data to its own local storage 330, 334, 338 resources and any appropriate block-storage 342, 344, 346 that are offered by the cloud computing environment 316, but the software daemon 328, 332, 336 or some other module of computer program instructions that is executing on the particular cloud computing instance 340*a*, 340*b*, 340*n* may also be configured to write the data to cloud-based object storage 348 that is attached to the particular cloud computing instance 340*a*, 340*b*, 340*n*. The cloud-based object storage 348 that is attached to the particular cloud computing instance 340*a*, 340*b*, 340*n* may be embodied, for example, as Amazon Simple Storage Service ('S3') storage that is accessible by the particular cloud computing instance 340*a*, 340*b*, 340*n*. In other embodiments, the cloud computing instances 320, 322 that each include the storage controller application 324, 326 may initiate the storage of the data in the local storage 330, 334, 338 of the cloud computing instances 340*a*, 340*b*, 340*n* and the cloud-based object storage 348.

Readers will appreciate that, as described above, the cloud-based storage system 318 may be used to provide block storage services to users of the cloud-based storage system 318. While the local storage 330, 334, 338 resources and the block-storage 342, 344, 346 resources that are utilized by the cloud computing instances 340*a*, 340*b*, 340*n* may support block-level access, the cloud-based object storage 348 that is attached to the particular cloud computing instance 340*a*, 340*b*, 340*n* supports only object-based access. In order to address this, the software daemon 328, 332, 336 or some other module of computer program instructions that is executing on the particular cloud computing instance 340*a*, 340*b*, 340*n* may be configured to take blocks of data, package those blocks into objects, and write the objects to the cloud-based object storage 348 that is attached to the particular cloud computing instance 340*a*, 340*b*, 340*n*.

Consider an example in which data is written to the local storage 330, 334, 338 resources and the block-storage 342, 344, 346 resources that are utilized by the cloud computing instances 340*a*, 340*b*, 340*n* in 1 MB blocks. In such an example, assume that a user of the cloud-based storage system 318 issues a request to write data that, after being compressed and deduplicated by the storage controller application 324, 326 results in the need to write 5 MB of data. In such an example, writing the data to the local storage 330, 334, 338 resources and the block-storage 342, 344, 346 resources that are utilized by the cloud computing instances 340*a*, 340*b*, 340*n* is relatively straightforward as 5 blocks that are 1 MB in size are written to the local storage 330, 334, 338 resources and the block-storage 342, 344, 346 resources that are utilized by the cloud computing instances 340*a*, 340*b*, 340*n*. In such an example, the software daemon 328, 332, 336 or some other module of computer program instructions that is executing on the particular cloud computing instance 340*a*, 340*b*, 340*n* may be configured to: 1) create a first object that includes the first 1 MB of data and write the first object to the cloud-based object storage 348, 2) create a second object that includes the second 1 MB of data and write the second object to the cloud-based object storage 348, 3) create a third object that includes the third 1 MB of data and write the third object to the cloud-based object storage 348, and so on. As such, in some embodiments, each object that is written to the cloud-based object storage 348 may be identical (or nearly identical) in size. Readers will appreciate that in such an example, metadata that is associated with the data itself may be included in each object (e.g., the first 1 MB of the object is data and the remaining portion is metadata associated with the data).

Readers will appreciate that the cloud-based object storage 348 may be incorporated into the cloud-based storage system 318 to increase the durability of the cloud-based storage system 318. Continuing with the example described above where the cloud computing instances 340*a*, 340*b*, 340*n* are EC2 instances, readers will understand that EC2 instances are only guaranteed to have a monthly uptime of 99.9% and data stored in the local instance store only persists during the lifetime of the EC2 instance. As such, relying on the cloud computing instances 340*a*, 340*b*, 340*n* with local storage 330, 334, 338 as the only source of persistent data storage in the cloud-based storage system 318 may result in a relatively unreliable storage system. Likewise, EBS volumes are designed for 99.999% availability. As such, even relying on EBS as the persistent data store in the cloud-based storage system 318 may result in a storage system that is not sufficiently durable. Amazon S3, however, is designed to provide 99.999999999% durability, meaning that a cloud-based storage system 318 that can incorporate S3 into its pool of storage is substantially more durable than various other options.

Readers will appreciate that while a cloud-based storage system 318 that can incorporate S3 into its pool of storage is substantially more durable than various other options, utilizing S3 as the primary pool of storage may result in storage system that has relatively slow response times and relatively long I/O latencies. As such, the cloud-based storage system 318 depicted in FIG. 3C not only stores data in S3 but the cloud-based storage system 318 also stores data in local storage 330, 334, 338 resources and block-storage 342, 344, 346 resources that are utilized by the cloud computing instances 340*a*, 340*b*, 340*n*, such that read operations can be serviced from local storage 330, 334, 338 resources and the block-storage 342, 344, 346 resources that are utilized by the cloud computing instances 340*a*, 340*b*, 340*n*, thereby reducing read latency when users of the cloud-based storage system 318 attempt to read data from the cloud-based storage system 318.

In some embodiments, all data that is stored by the cloud-based storage system 318 may be stored in both: 1) the cloud-based object storage 348, and 2) at least one of the local storage 330, 334, 338 resources or block-storage 342, 344, 346 resources that are utilized by the cloud computing instances 340*a*, 340*b*, 340*n*. In such embodiments, the local storage 330, 334, 338 resources and block-storage 342, 344, 346 resources that are utilized by the cloud computing instances 340*a*, 340*b*, 340*n* may effectively operate as cache that generally includes all data that is also stored in S3, such that all reads of data may be serviced by the cloud computing instances 340a, 340b, 340n without requiring the cloud computing instances 340a, 340b, 340n to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block-storage 342, 344, 346 resources that are utilized by the cloud computing instances 340a, 340b, 340n. In such an example, various policies may be utilized to determine which subset of the data that is stored by the cloud-based storage system 318 should reside in both: 1) the cloud-based object storage 348, and 2) at least one of the local storage 330, 334, 338 resources or block-storage 342, 344, 346 resources that are utilized by the cloud computing instances 340a, 340b, 340n.

As described above, when the cloud computing instances 340a, 340b, 340n with local storage 330, 334, 338 are embodied as EC2 instances, the cloud computing instances 340a, 340b, 340n with local storage 330, 334, 338 are only guaranteed to have a monthly uptime of 99.9% and data stored in the local instance store only persists during the lifetime of each cloud computing instance 340a, 340b, 340n with local storage 330, 334, 338. As such, one or more modules of computer program instructions that are executing within the cloud-based storage system 318 (e.g., a monitoring module that is executing on its own EC2 instance) may be designed to handle the failure of one or more of the cloud computing instances 340a, 340b, 340n with local storage 330, 334, 338. In such an example, the monitoring module may handle the failure of one or more of the cloud computing instances 340a, 340b, 340n with local storage 330, 334, 338 by creating one or more new cloud computing instances with local storage, retrieving data that was stored on the failed cloud computing instances 340a, 340b, 340n from the cloud-based object storage 348, and storing the data retrieved from the cloud-based object storage 348 in local storage on the newly created cloud computing instances. Readers will appreciate that many variants of this process may be implemented.

Consider an example in which all cloud computing instances 340a, 340b, 340n with local storage 330, 334, 338 failed. In such an example, the monitoring module may create new cloud computing instances with local storage, where high-bandwidth instances types are selected that allow for the maximum data transfer rates between the newly created high-bandwidth cloud computing instances with local storage and the cloud-based object storage 348. Readers will appreciate that instances types are selected that allow for the maximum data transfer rates between the new cloud computing instances and the cloud-based object storage 348 such that the new high-bandwidth cloud computing instances can be rehydrated with data from the cloud-based object storage 348 as quickly as possible. Once the new high-bandwidth cloud computing instances are rehydrated with data from the cloud-based object storage 348, less expensive lower-bandwidth cloud computing instances may be created, data may be migrated to the less expensive lower-bandwidth cloud computing instances, and the high-bandwidth cloud computing instances may be terminated.

Readers will appreciate that in some embodiments, the number of new cloud computing instances that are created may substantially exceed the number of cloud computing instances that are needed to locally store all of the data stored by the cloud-based storage system 318. The number of new cloud computing instances that are created may substantially exceed the number of cloud computing instances that are needed to locally store all of the data stored by the cloud-based storage system 318 in order to more rapidly pull data from the cloud-based object storage 348 and into the new cloud computing instances, as each new cloud computing instance can (in parallel) retrieve some portion of the data stored by the cloud-based storage system 318. In such embodiments, once the data stored by the cloud-based storage system 318 has been pulled into the newly created cloud computing instances, the data may be consolidated within a subset of the newly created cloud computing instances and those newly created cloud computing instances that are excessive may be terminated.

Consider an example in which 1000 cloud computing instances are needed in order to locally store all valid data that users of the cloud-based storage system 318 have written to the cloud-based storage system 318. In such an example, assume that all 1,000 cloud computing instances fail. In such an example, the monitoring module may cause 100,000 cloud computing instances to be created, where each cloud computing instance is responsible for retrieving, from the cloud-based object storage 348, distinct $1/100,000$th chunks of the valid data that users of the cloud-based storage system 318 have written to the cloud-based storage system 318 and locally storing the distinct chunk of the dataset that it retrieved. In such an example, because each of the 100,000 cloud computing instances can retrieve data from the cloud-based object storage 348 in parallel, the caching layer may be restored 100 times faster as compared to an embodiment where the monitoring module only create 1000 replacement cloud computing instances. In such an example, over time the data that is stored locally in the 100,000 could be consolidated into 1,000 cloud computing instances and the remaining 99,000 cloud computing instances could be terminated.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. Consider an example in which the monitoring module monitors the performance of the could-based storage system 318 via communications with one or more of the cloud computing instances 320, 322 that each are used to support the execution of a storage controller application 324, 326, via monitoring communications between cloud computing instances 320, 322, 340a, 340b, 340n, via monitoring communications between cloud computing instances 320, 322, 340a, 340b, 340n and the cloud-based object storage 348, or in some other way. In such an example, assume that the monitoring module determines that the cloud computing instances 320, 322 that are used to support the execution of a storage controller application 324, 326 are undersized and not sufficiently servicing the I/O requests that are issued by users of the cloud-based storage system 318. In such an example, the monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

Consider, as an additional example of dynamically sizing the cloud-based storage system 318, an example in which the monitoring module determines that the utilization of the local storage that is collectively provided by the cloud computing instances 340a, 340b, 340n has reached a predetermined utilization threshold (e.g., 95%). In such an example, the monitoring module may create additional cloud computing instances with local storage to expand the pool of local storage that is offered by the cloud computing instances. Alternatively, the monitoring module may create one or more new cloud computing instances that have larger amounts of local storage than the already existing cloud computing instances 340a, 340b, 340n, such that data stored in an already existing cloud computing instance 340a, 340b, 340n can be migrated to the one or more new cloud computing instances and the already existing cloud computing instance 340a, 340b, 340n can be terminated, thereby expanding the pool of local storage that is offered by the cloud computing instances. Likewise, if the pool of local storage that is offered by the cloud computing instances is unnecessarily large, data can be consolidated and some cloud computing instances can be terminated.

Readers will appreciate that the cloud-based storage system 318 may be sized up and down automatically by a monitoring module applying a predetermined set of rules that may be relatively simple of relatively complicated. In fact, the monitoring module may not only take into account the current state of the cloud-based storage system 318, but the monitoring module may also apply predictive policies that are based on, for example, observed behavior (e.g., every night from 10 PM until 6 AM usage of the storage system is relatively light), predetermined fingerprints (e.g., every time a virtual desktop infrastructure adds 100 virtual desktops, the number of IOPS directed to the storage system increase by X), and so on. In such an example, the dynamic scaling of the cloud-based storage system 318 may be based on current performance metrics, predicted workloads, and many other factors, including combinations thereof.

Readers will further appreciate that because the cloud-based storage system 318 may be dynamically scaled, the cloud-based storage system 318 may even operate in a way that is more dynamic. Consider the example of garbage collection. In a traditional storage system, the amount of storage is fixed. As such, at some point the storage system may be forced to perform garbage collection as the amount of available storage has become so constrained that the storage system is on the verge of running out of storage. In contrast, the cloud-based storage system 318 described here can always 'add' additional storage (e.g., by adding more cloud computing instances with local storage). Because the cloud-based storage system 318 described here can always 'add' additional storage, the cloud-based storage system 318 can make more intelligent decisions regarding when to perform garbage collection. For example, the cloud-based storage system 318 may implement a policy that garbage collection only be performed when the number of IOPS being serviced by the cloud-based storage system 318 falls below a certain level. In some embodiments, other system-level functions (e.g., deduplication, compression) may also be turned off and on in response to system load, given that the size of the cloud-based storage system 318 is not constrained in the same way that traditional storage systems are constrained.

Readers will appreciate that embodiments of the present disclosure resolve an issue with block-storage services offered by some cloud computing environments as some cloud computing environments only allow for one cloud computing instance to connect to a block-storage volume at a single time. For example, in Amazon AWS, only a single EC2 instance may be connected to an EBS volume. Through the use of EC2 instances with local storage, embodiments of the present disclosure can offer multi-connect capabilities where multiple EC2 instances can connect to another EC2 instance with local storage ('a drive instance'). In such embodiments, the drive instances may include software executing within the drive instance that allows the drive instance to support I/O directed to a particular volume from each connected EC2 instance. As such, some embodiments of the present disclosure may be embodied as multi-connect block storage services that may not include all of the components depicted in FIG. 3C.

In some embodiments, especially in embodiments where the cloud-based object storage 348 resources are embodied as Amazon S3, the cloud-based storage system 318 may include one or more modules (e.g., a module of computer program instructions executing on an EC2 instance) that are configured to ensure that when the local storage of a particular cloud computing instance is rehydrated with data from S3, the appropriate data is actually in S3. This issue arises largely because S3 implements an eventual consistency model where, when overwriting an existing object, reads of the object will eventually (but not necessarily immediately) become consistent and will eventually (but not necessarily immediately) return the overwritten version of the object. To address this issue, in some embodiments of the present disclosure, objects in S3 are never overwritten. Instead, a traditional 'overwrite' would result in the creation of the new object (that includes the updated version of the data) and the eventual deletion of the old object (that includes the previous version of the data).

In some embodiments of the present disclosure, as part of an attempt to never (or almost never) overwrite an object, when data is written to S3 the resultant object may be tagged with a sequence number. In some embodiments, these sequence numbers may be persisted elsewhere (e.g., in a database) such that at any point in time, the sequence number associated with the most up-to-date version of some piece of data can be known. In such a way, a determination can be made as to whether S3 has the most recent version of some piece of data by merely reading the sequence number associated with an object—and without actually reading the data from S3. The ability to make this determination may be particularly important when a cloud computing instance with local storage crashes, as it would be undesirable to rehydrate the local storage of a replacement cloud computing instance with out-of-date data. In fact, because the cloud-based storage system 318 does not need to access the data to verify its validity, the data can stay encrypted and access charges can be avoided.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described above may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation. Reinforcement learning may be employed to find the best possible behavior or path that a particular software application or machine should take in a specific situation. Reinforcement learning differs from other areas of machine learning (e.g., supervised learning, unsupervised learning) in that correct input/output pairs need not be presented for reinforcement learning and sub-optimal actions need not be explicitly corrected.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains. In addition to supporting the storage and use of blockchain technologies, the storage systems described above may also support the storage and use of derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available—including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs)

and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to $2^n$ different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

Figure 3D:
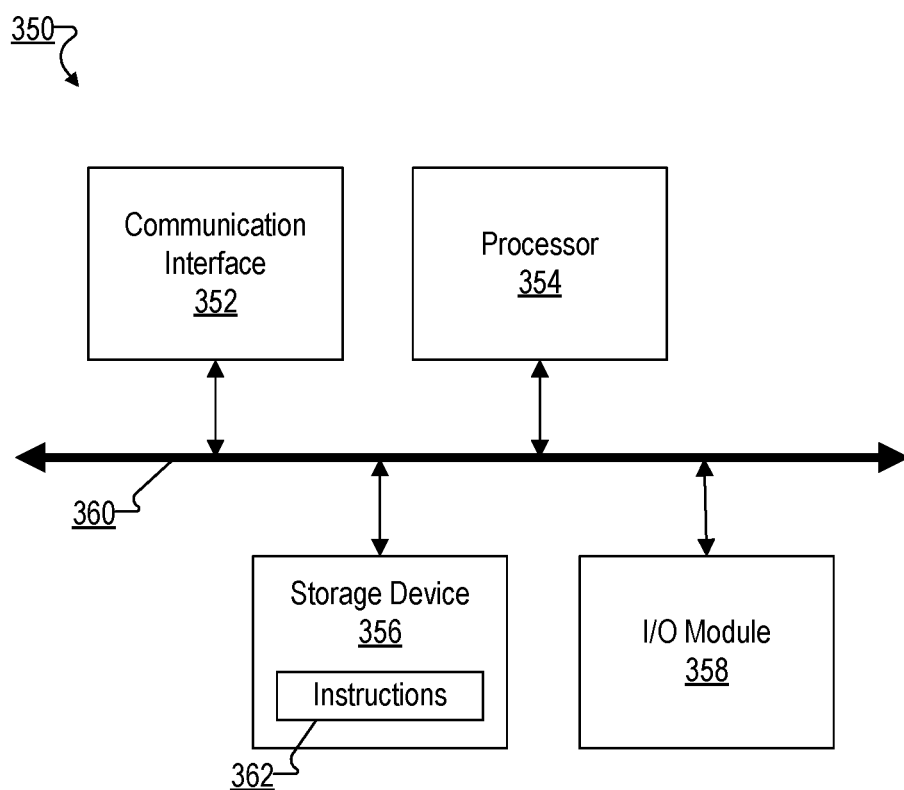
FIG. 3D illustrates an exemplary computing device that may be specifically configured to perform one or more of the processes described herein.

For further explanation, FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device.

For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

Figure 4:
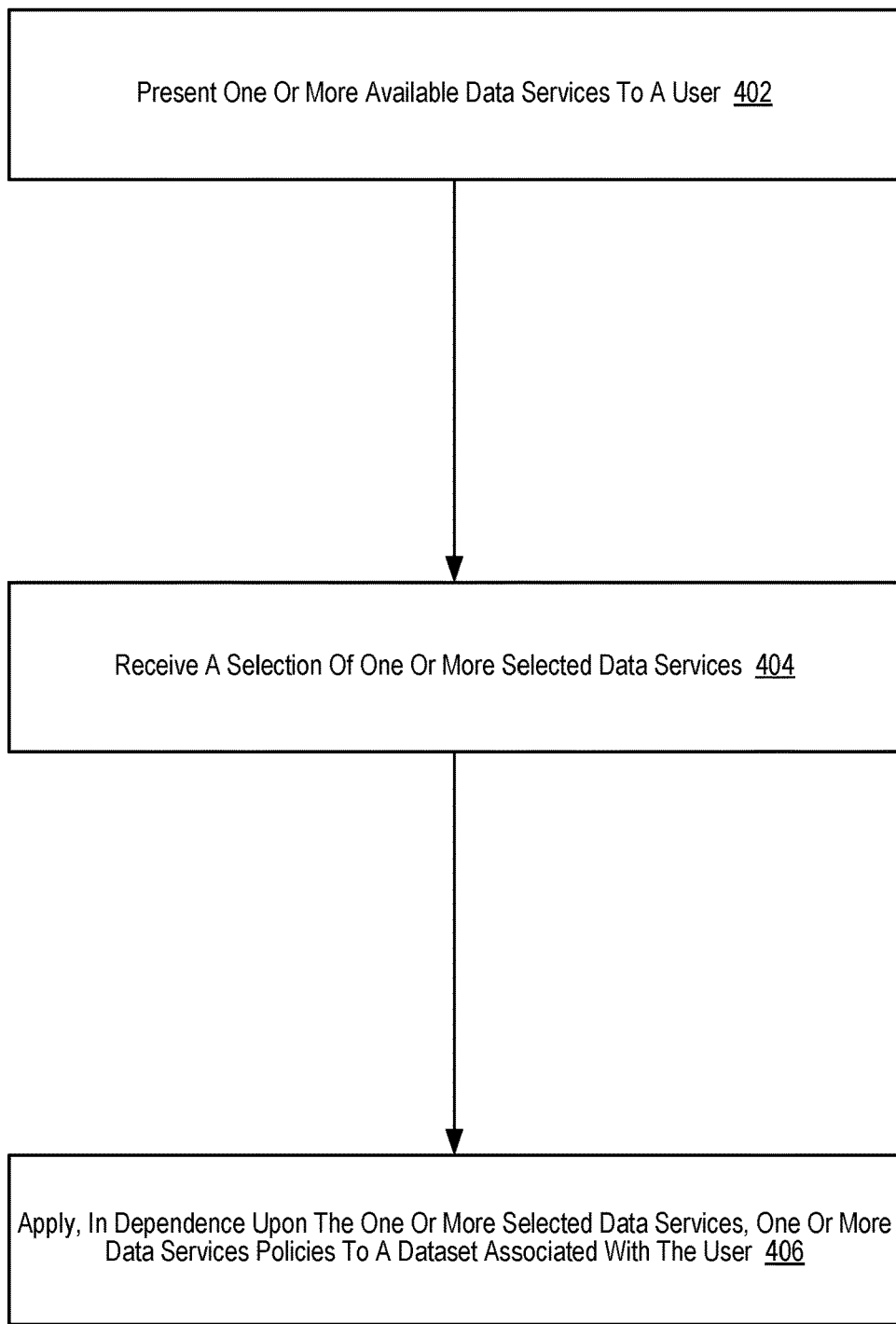
FIG. 4 sets forth a flow chart illustrating an example method of providing data management as-a-service in accordance with some embodiments of the present disclosure.

For further explanation, FIG. 4 sets forth a flow chart illustrating an example method of providing data management as-a-service in accordance with some embodiments of the present disclosure. Although not depicted in FIG. 4, the method illustrated in FIG. 4 may be carried out, at least in part, by one or more data services modules. The one or more data services modules may be embodied, for example, as computer program instructions executing on virtualized computer hardware such as a virtual machine, as computer program instructions executing with a container, or embodied in some other way. In such an example, the one or more data services modules may be executing in a public cloud environment such as Amazon AWS™, Microsoft Azure™, and so on. Alternatively, the one or more data services modules may be executing in a private cloud environment, in a hybrid cloud environment, on dedicated hardware and software as would be found in a datacenter, or in some other environment.

The one or more data services modules may be configured to present one or more available data services to a user, receive a selection of one or more selected data services, and at least assist in the process of applying, in dependence upon the one or more selected data services, one or more data services policies to a dataset associated with the user, as will be described in greater detail below. Furthermore, the one or more data services modules may be configured to perform other steps as will be described in greater detail below. In such a way, the one or more data services modules may essentially act as a gateway to physical devices such as one or more storage systems (including, for example, the storage systems described above as well as their variants), one or more networking devices, one or more processing devices, and other devices that can drive the operation of such devices so as to deliver a wide array of data services.

The example method depicted in FIG. 4 includes presenting 402 one or more available data services to a user. The one or more available data services may be embodied as services that may be provided to consumers (i.e., a user) of the data services to manage data that is associated with the consumer of the data services. Data services may be applied to various forms of data including, for example, to one or more files in a file system, to one or more objects, to one or more blocks of data that collectively form a dataset, to one or more blocks of data that collectively form a volume, to multiple volumes, and so on. Data services may be applied to a user selected dataset or, alternatively, may be applied to some data that is selected based on one or more policies or heuristics. For example, some data (e.g., data that has personally identifiable information) in a dataset may have one set of data services applied to it whereas other data (e.g., data that does not have personally identifiable information) in the same dataset may have a different set of data services applied to it.

As an illustrative example of available data services that may be presented 402 to a user, data services may be presented 402 to the user that are associated with different levels of data protection. For example, data services may be presented to the user that, when selected and enforced, guarantee the user that data associated with that user will be protected such that various recovery point objectives ('RPO') can be guaranteed. A first available data service may ensure, for example, that some dataset associated with the user will be protected such that any data that is more than 5 seconds old can be recovered in the event of a failure of the primary data store whereas a second available data service may ensure that the dataset that is associated with the user will be protected such that any data that is more than 5 minutes old can be recovered in the event of a failure of the primary data store. Readers will appreciate that this is just one example of available date services that may be presented 402 to the user. Additional available date services that may be presented 402 to the user will be described in greater detail below.

The example method depicted in FIG. 4 also includes receiving 404 a selection of one or more selected data services. The one or more selected data services may represent data services, chosen from the set of all available data services, that the user would like to have applied to a particular dataset that is associated with the user. Continuing with the example described above in which a first available data service may ensure that some dataset associated with the user will be protected such that any data that is more than 5 seconds old can be recovered in the event of a failure of the primary data store whereas a second available data service may ensure that the dataset that is associated with the user will be protected such that any data that is more than 5 minutes old can be recovered in the event of a failure of the primary data store, the user may select the first available data service to minimize data loss in the event of a failure of the primary data store. Readers will appreciate, however, that the monetary cost of the first available data service may be higher than the monetary cost of the second available data service, such that user's can weigh these cost differences and chose a data service that is most appropriate for their applications, data, and so on. The user's selection of one or more selected data services may be received 404, for example, via a GUI that is presented to the user, as part of a performance tier selected by the user, or in some other way.

The example method depicted in FIG. 4 also includes applying 406, in dependence upon the one or more selected data services, one or more data services policies to a dataset associated with the user. The one or more data services policies may be embodied, for example, as one or more rules that, when enforced or implemented, causes an associated data service to be provided. Continuing with the example described above in which a user selected a first available data service to ensure that some dataset associated with the user will be protected such that any data that is more than 5 seconds old can be recovered in the event of a failure of the primary data store, the one or more data services policies that may be applied 406 can include, for example, a policy that causes a snapshot of the user's dataset to be taken every 5 seconds and sent to one or more backup storage systems. In such a way, even if the primary data store failed or otherwise became unavailable, a snapshot would have been taken no more than 5 seconds prior to the failure, and such a snapshot could be recovered from one or more backup storage systems. In other examples, other data services policies may be applied 406 to replay I/O events that caused the dataset to be modified so as to provide the associated selected data services, or some other data services policies may be applied 406 that cause the associated selected data services to be provided.

Readers will appreciate that in some embodiments, where one or more data services modules may be configured to present 402 one or more available data services to a user and to receive 404 a selection of one or more selected data services, the one or more data services modules may not be responsible for applying 406 the one or more data services policies to a dataset associated with the user. Instead, the one or more data services modules may instruct (via one or more APIs, via one or more messages, or in some other way) some other entity to apply 406 the one or more data services policies to the dataset that is associated with the user. For example, the one or more data services modules may utilize APIs provided by storage system to cause the storage system to carry out backup operations as described above in order to provide the first available data service described above in which a dataset associated with the user will be protected such that any data that is more than 5 seconds old can be recovered in the event of a failure of the primary data store.

Readers will appreciate that many data services may be presented 402 to a user, selected by a user, and ultimately result in one or more data services policies being applied 406 to a dataset associated with the user in dependence upon the one or more data services selected by the user. A non-exhaustive list of data services that may be made available is included below, although readers will appreciate that additional data services may be made available in accordance with some embodiments of the present disclosure.

One example of data services that may be presented 402 to a user, selected by a user (where such a selection is received 404 by one or more data services modules or similar mechanism), and ultimately applied 406 to a dataset associated with the user can include one or more data compliance services. Such data compliance services may be embodied, for example, as services that may be provided to consumers (i.e., a user) the data compliance services to ensure that the user's datasets are managed in a way to adhere to various regulatory requirements. For example, one or more data compliance services may be offered to a user to ensure that the user's datasets are managed in a way so as to adhere to the General Data Protection Regulation ('GDPR'), one or data compliance services may be offered to a user to ensure that the user's datasets are managed in a way so as to adhere to the Sarbanes-Oxley Act of 2002 ('SOX'), or one or more data compliance services may be offered to a user to ensure that the user's datasets are managed in a way so as to adhere to some other regulatory act. In addition, the one or more data compliance services may be offered to a user to ensure that the user's datasets are managed in a way so as to adhere to some non-governmental guidance (e.g., to adhere to best practices for auditing purposes), the one or more data compliance services may be offered to a user to ensure that the user's datasets are managed in a way so as to adhere to a particular clients or organizations requirements, and so on. In this example, the data compliance services may be presented 402 to a user, a selection of one or more selected data services may be received 404, and the selected data compliance services may be applied 406 to a dataset that is associated with the user.

Consider an example in which a particular data compliance service is designed to ensure that a user's datasets are managed in a way so as to adhere to the requirements set forth in the GDPR. While a listing of all requirements of the GDPR can be found in the regulation itself, for the purposes of illustration, an example requirement set forth in the GDPR requires that pseudonymization processes must be applied to stored data in order to transform personal data in such a way that the resulting data cannot be attributed to a specific data subject without the use of additional information. For example, data encryption techniques can be applied to render the original data unintelligible, and such data encryption techniques cannot be reversed without access to the correct decryption key. As such, the GDPR may require that the decryption key be kept separately from the pseudonymised data. One particular data compliance service may be offered to ensure adherence to the requirements set forth in this paragraph.

In order to provide this particular data compliance service, the data compliance service may be presented 402 to a user (e.g., via a GUI) and selected by the user, thereby causing a selection of the particular data compliance service to be received 404. In response to receiving 404 the selection of the particular data compliance service, one or more data services policies may be applied 406 to a dataset associated with the user to carry out the particular data compliance service. For example, a data services policy may be applied requiring that the dataset be encrypted prior to be stored in a storage system, prior to being stored in a cloud environment, or prior to being stored elsewhere. In order to enforce this policy, a requirement may be enforced not only requiring that the dataset be encrypted when stored, but a requirement may be put in place requiring that the dataset be encrypted prior to transmitting the dataset (e.g., sending the dataset to another party). In such an example, a data services policy may also be put in place requiring that any encryption keys used to encrypt the dataset are not stored on the same system that stores the dataset itself. Readers will appreciate that many other forms of data compliance services may be offered and implemented in accordance with embodiments of the present disclosure.

Another example of data services that may be presented 402 to a user, selected by a user (where such a selection is received 404 by one or more data services modules or similar mechanism), and ultimately applied 406 to a dataset associated with the user can include one or more high availability data services. Such high availability data services may be embodied, for example, as services that may be provided to consumers (i.e., a user) of the high availability data services to ensure that the user's datasets are guaranteed to have a particular level of uptime (i.e., to be available a predetermined amount of time). For example, a first high availability data service may be offered to a user to ensure that the user's dataset has three nine of availability, meaning that the dataset is available 99.9% of the time. A second high availability data service may be offered, however, to a user to ensure that the user's dataset has five nines of availability, meaning that the dataset is available 99.999% of the time. Other high availability data services may be offered that ensure other levels of availability. Likewise, the high availability data services may also be delivered in such a way so as to ensure various levels of uptime for entities other than the dataset. For example, a particular high availability data service may ensure that one or more virtual machines, one or more containers, one or more data access endpoints, or some other entity is available a particular amount of time. In this example, the high availability data services may be presented 402 to a user, a selection of one or more selected data services may be received 404, and the selected high availability data services may be applied 406 to a dataset (or other entity) that is associated with the user.

Consider an example in which a particular high availability data service is designed to ensure that the user's dataset has five nines of availability, meaning that the dataset is available 99.999% of the time. In such an example and in order to deliver on this uptime guarantee, one or more data services policies that are associated with such a high availability data service may be applied and enforced. For example, a data services policy may be applied requiring that the dataset be mirrored across a predetermined number of storage systems, a data services policy may be applied requiring that the dataset be mirrored across a predetermined number of availability zones in a cloud environment, a data services policy may be applied requiring that the dataset be replicated in a particular way (e.g., synchronously replicated such that multiple up-to-date copies of the dataset exist), and so on.

Readers will appreciate that many other forms of high availability data services may be offered and implemented in accordance with embodiments of the present disclosure. For example, such high availability data services may be associated with data services policies that not only guarantee that a particular number of copies of the dataset exist in order to protect against failures of the storage infrastructure (e.g., a failure of the storage system itself), but high availability data services may also be associated with data service policies that are designed to prevent the dataset from becoming unavailable for other reasons. For example, a high availability data service may be associated with one or more data services policies that require a particular level of redundancy in networking paths so that the availability to meet the uptime requirements associated with the dataset are not comprised by a lack of data communications paths to access the storage resources that contain the dataset. In other embodiments of the present disclosure, additional forms of high availability data services may be offered and implemented.

Another example of data services that may be presented 402 to a user, selected by a user (where such a selection is received 404 by one or more data services modules or similar mechanism), and ultimately applied 406 to a dataset associated with the user can include one or more disaster recovery services. Such disaster recovery services may be embodied, for example, as services that may be provided to consumers (i.e., a user) of the disaster recovery services to ensure that a user's dataset may be recovered in accordance with certain parameters in the event of a disaster. For example, a first disaster recovery service may be offered to a user to ensure that the user's dataset can be recovered in accordance with a first RPO and a first recovery time objective ('RTO') in the event that the storage system that stores the dataset fails, or some other form of disaster occurs that causes the dataset to become unavailable. A second disaster recovery service may be offered, however, to a user to ensure that the user's dataset can be recovered in accordance with a second RPO and a second RTO in the event that the storage system that stores the dataset fails, or some other form of disaster occurs that causes the dataset to become unavailable. Other disaster recovery services may be offered that ensure other levels of recoverability outside of the scope of RPO and RTO. Likewise, the disaster recovery services may also be delivered in such a way so as to ensure various levels of recoverability for entities other than the dataset. For example, a particular disaster recovery service may ensure that one or more virtual machines, one or more containers, one or more data access endpoints, or some other entity can be recovered in a certain amount of time or in accordance with some other metric. In this example, the disaster recovery services may be presented 402 to a user, a selection of one or more selected disaster recovery services may be received 404, and the selected disaster recovery services may be applied 406 to a dataset (or other entity) that is associated with the user.

Consider an example in which a particular disaster recovery service is designed to ensure that the user's dataset has an RPO and RTO of zero, meaning that the dataset must be immediately available with no loss of data in the event that a particular storage system that stores the dataset fails or some other form of disaster occurs. In such an example and in order to deliver on these RPO/RTO guarantees, one or more data services policies that are associated with such a disaster recovery service may be applied and enforced. For example, a data services policy may be applied requiring that the dataset be synchronously replicated across a predetermined number of storage systems, meaning that a request to modify the dataset can only be acknowledge as complete when all of the storage systems that include a copy of the dataset have modified the dataset in accordance with the request. Stated different, a modifying operation (e.g., a write) is either applied to all copies of the dataset that reside on the storage systems or to none of the copies of the dataset that reside on the storage systems, such that the failure of one storage system does not prevent a user from accessing the same, up-to-date copy of the dataset.

Readers will appreciate that many other forms of disaster recovery services may be offered and implemented in accordance with embodiments of the present disclosure. For example, such disaster recovery services may be associated with data services policies that not only guarantee that a disaster can be recovered from in accordance with a particular RPO or RTO requirement, but disaster recovery services may also be associated with data service policies that are designed to ensure that the dataset (or other entity) can be recovered to a predetermined location or system, disaster recovery services may also be associated with data service policies that are designed to ensure that the dataset (or other entity) can be recovered at no more than a predetermined maximum cost, disaster recovery services may also be associated with data service policies that are designed to ensure that specific actions are carried out in response to detecting a disaster (e.g., spinning up a clone of the failed system), and so on. In other embodiments of the present disclosure, additional forms of disaster recovery services may be offered and implemented.

Another example of data services that may be presented 402 to a user, selected by a user (where such a selection is received 404 by one or more data services modules or similar mechanism), and ultimately applied 406 to a dataset associated with the user can include one or more data archiving services (including data offloading services). Such data archiving services may be embodied, for example, as services that may be provided to consumers (i.e., a user) of the data archiving services to ensure that the user's datasets are archived in a certain way, such as according to a certain set of preferences, parameters, and the like. For example, one or more data archiving services may be offered to a user to ensure that the user's datasets are archived when data has not been accessed in a predetermined period of time, when data has been invalid for a certain period of time, after the dataset reaches a certain size, when a storage system that stores the dataset has reached a predetermined utilization level, and so on. In this example, the data archiving services may be presented 402 to a user, a selection of one or more selected data archiving services may be received 404, and the selected data archiving services may be applied 406 to a dataset that is associated with the user.

Consider an example in which a particular data archiving service is designed to ensure that a portion of a user's dataset that have been invalidated (e.g., the portion has been replaced with an updated portion, the portion has been deleted) are archived within 24 hours of the data being invalidated. In order to provide this particular data archiving service, the data archiving service may be presented 402 to a user (e.g., via a GUI) and selected by the user, thereby causing a selection of the particular data archiving service to be received 404. In response to receiving 404 the selection of the particular data archiving service, one or more data services policies may be applied 406 to a dataset associated with the user to carry out the particular data archiving service. For example, a data services policy may be applied requiring that any operations that would cause data to be invalidated (e.g., an overwrite, a deletion) be cataloged and that every 12 hours a process examines the cataloged operations and migrates an invalidated data to an archive. Likewise, the data services policy may place restrictions on processes such as garbage collection to prevent such processes from deleting data that has not yet been archived, if appropriate. Readers will appreciate that in this example, the data archiving service may operate in coordination with one or more data compliance services, as the requirement to archive data may be created by one or more regulations. For example, a user selecting a particular data compliance service that requires that certain data be retained for a predetermined period of time may automatically trigger a particular data archiving service that can deliver the required level of data archiving and retention. Likewise, some data archiving services may be incompatible with some data compliance services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more quality-of-service ('QoS') data services. Such QoS data services may be embodied, for example, as services that may be provided to consumers (i.e., a user) of the data compliance services to ensure that the user's datasets can be accessed in accordance with predefined performance metrics. For example, a particular QoS data service may guarantee that reads that are directed to the user's dataset can be serviced within a particular amount of time, that writes directed to the user's dataset can be serviced within a particular amount of time, that a user may be guaranteed a predetermined number of IOPS that are directed to the user's dataset, and so on. In this example, the QoS data services may be presented 402 to a user, a selection of one or more selected data services may be received 404, and the selected QoS data services may be applied 406 to a dataset that is associated with the user.

Consider an example in which a particular QoS data service is designed to ensure that a user's datasets can be accessed in a way such that read latencies and write latencies are guaranteed to be lower than a predetermined amount of time. In order to provide this particular QoS data service, the QoS data service may be presented 402 to a user (e.g., via a GUI) and selected by the user, thereby causing a selection of the particular QoS data service to be received 404. In response to receiving 404 the selection of the particular QoS data service, one or more data services policies may be applied 406 to a dataset associated with the user to carry out the particular QoS data service. For example, a data services policy may be applied requiring that the dataset be retained within storage that can be used to deliver the required read latencies and write latencies. For example, if the particular QoS data service required relatively low read latencies and write latencies, the data services policies associated with this particular QoS data service may require that the user's dataset be stored in relatively high performance storage that is located relatively proximate to any hosts that issue I/O operations that are directed to the dataset.

Readers will appreciate that many other forms of QoS data services may be offered and implemented in accordance with embodiments of the present disclosure. In fact, the QoS data services may operate in coordination with one or more other data services. For example, a particular QoS data service may operate in coordination with a particular high availability data service, as the QoS data service may be associated with a particular availability requirement that can be implemented through the application of a particular high availability data service. Likewise, a particular QoS data service may operate in coordination with a particular data replication service, as the QoS data service may be associated with a particular performance guarantee that can only be achieved by replicating (via a particular data replication service) the dataset to storage that is relatively close to the source of I/O operations that are directed to the dataset. Likewise, some QoS data services may be incompatible with other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more data protection services. Such data protection services may be embodied, for example, as services that may be provided to consumers (i.e., a user) of the data protection services to ensure that the user's datasets are being protected and disseminated in certain way. For example, one or more data protection services may be offered to a user to ensure that the user's datasets are managed in a way so as to limit how personal data can be used or disseminated. In this example, the data protection services may be presented 402 to a user, a selection of one or more selected data protection services may be received 404, and the selected data protection services may be applied 406 to a dataset that is associated with the user.

Consider an example in which a particular data protection service is designed to ensure that a user's datasets are not disseminated outside of a particular organization associated with the user. In order to provide this particular data protection service, the data protection service may be presented 402 to a user (e.g., via a GUI) and selected by the user, thereby causing a selection of the particular data protection service to be received 404. In response to receiving 404 the selection of the particular data protection service, one or more data services policies may be applied 406 to a dataset associated with the user to carry out the particular data protection service. For example, a data services policy may be applied requiring that the dataset not be replicated, backed up, or otherwise stored in a public cloud such as Amazon AWS™. Likewise, a data services policy may be applied that requires that certain credentials be provided in order to access the dataset such as, for example, credentials that can be used to verify that the requestor is an authorized member of the particular organization that is associated with the user.

Readers will appreciate that many other forms of data protection services may be offered and implemented in accordance with embodiments of the present disclosure. In fact, the data protection services may operate in coordination with one or more other data services. For example, a particular data protection service may operate in coordination with one or more data compliance services, as the requirement to restrict the access to or sharing of data may be created by one or more regulations. For example, a user selecting a particular data compliance service that requires that certain data cannot be shared may automatically trigger a particular data protection service that can deliver the required level of data privacy. Likewise, some data protection services may be incompatible with some other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more virtualization management services (including container orchestration). Such virtualization management services may be embodied, for example, as services that may be provided to consumers (i.e., a user) of the virtualization management services to ensure that the user's virtualized resources are managed in accordance with predefined policies. For example, one or more virtualization management services may be offered to a user to ensure that the user's datasets can be presented in a way such that the dataset is accessible by one or more virtual machines or containers associated with the user, even when the underlying dataset resides within storage that may not be typically available to virtual machines or containers. For example, the virtualization management services may be configured to present the dataset as part of a virtual volume that is made available to a virtual machine, a container, or some other form of virtualized execution environment. In addition, the one or more virtualization management services may be offered to a user to ensure that the user's virtualized execution environments are backed up and can be restored in the event of a failure. For example, the virtualization management service may cause an image of a virtual machine to be restored and may capture state information associated with the virtual machine such that the virtual machine can be restored to its previous state if the virtual machine fails. In other embodiments, the virtualization management services may be used to manage the virtualized execution environments associated with the user and to provide storage resources to such virtualized execution environments. In this example, the virtualization management services may be presented 402 to a user, a selection of one or more selected virtualization management services may be received 404, and the selected virtualization management services may be applied 406 to a dataset or virtualized environment (including combinations thereof) that is associated with the user.

Consider an example in which a particular virtualization management service is designed to provide persistent storage to a containerized application that otherwise would not be able to retain data beyond the life of the container itself, and that the data associated with a particular container would be retained for 24 hours after the container is destroyed. In order to provide this particular virtualization management service, one or more data services policies may be applied 406 to a dataset or virtualized environment associated with the user to carry out the particular virtualization management service. For example, a data services policy may be applied that creates and configures a virtual volume that can be accessed by the container, where the virtual volume is backed by physical storage on a physical storage system. In such an example, once the container is destroyed, the data services policy may also include rules that prevent a garbage collection process or some other process from deleting the contents of the physical storage on a physical storage system that was used to back the virtual volume for at least 24 hours.

Readers will appreciate that many other forms of virtualization management services may be offered and implemented in accordance with embodiments of the present disclosure. In fact, the virtualization management services may operate in coordination with one or more other data services. For example, a particular virtualization management service may operate in coordination with one or more QoS data services, as the virtualized environments (e.g., virtual machines, containers) that are given access to persistent storage via a virtualization management service may also have performance demands that can be satisfied through the enforcement of a particular QoS data service. For example, a user selecting a particular QoS data service that requires that a particular entity receive access to storage resources that can meet a particular performance requirement may trigger a particular virtualization management service when the entity is a virtualized entity. Likewise, some virtualization management services may be incompatible with some other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more fleet management services. Such fleet management services may be embodied, for example, as services that may be provided to consumers (i.e., a user) of the fleet management services to ensure that the user's storage resources (physical, cloud-based, and combinations thereof), and even related resources, are managed in a particular way. For example, one or more fleet management services may be offered to a user to ensure that the user's datasets are distributed across a fleet of storage systems in a way that best suits the performance needs associated with dataset. For example, a production version of a dataset may be placed on relatively high performance storage systems to ensure that the dataset can be accessed using relatively low latency operations (e.g., reads, writes), where a test/dev version of the dataset may be placed on relatively low performance storage systems as accessing the dataset using relatively high latency operations (e.g., reads, writes) may be permissible in a test/dev environment. In other examples, the one or more fleet management services may be offered to a user to ensure that the user's datasets are distributed in such a way so as to achieve load balancing goals where some storage systems are not overburdened while others are underutilized, to ensure that datasets are distributed in such a way so as to achieve high levels of data reduction (e.g., grouping similar datasets together in the hopes of achieving better data deduplication that would occur with a random distribution of the datasets), to ensure that datasets are distributed in such a way so as to adhere to data compliance regulations, and so on. In this example, the fleet management services may be presented 402 to a user, a selection of one or more selected fleet management services may be received 404, and the selected fleet management services may be applied 406 to a dataset, storage resource, or other resource that is associated with the user.

Consider an example in which a particular fleet management service is designed to ensure that a user's datasets are distributed in such a way so as to place the datasets on storage systems that are physically closest to the host that most frequently accesses the datasets. In order to provide this particular fleet management service, one or more data services policy may be applied requiring that the location of the host that most frequently accesses a particular dataset be taken into consideration when placing the dataset. Furthermore, the one or more data services policy that may be applied may further require that if a different host becomes the host that most frequently accesses the particular dataset, the particular dataset should be replicated to a storage system that is most physically proximate to the different host.

Readers will appreciate that many other forms of fleet management services may be offered and implemented in accordance with embodiments of the present disclosure. In fact, the fleet management services may operate in coordination with one or more other data services. For example, a particular fleet management service may operate in coordination with one or more data compliance services, as the ability to move datasets in such a way may be limited by a regulatory requirement that is being enforced by one or more data compliance services. For example, a user selecting a particular data compliance service that restricts the ability to move a dataset around may cause a particular fleet management service to only take into consideration target storage systems that a dataset could be moved to without violating a policy enforced by a selected data compliance service when the fleet management system is evaluating where a dataset that resides on a source storage system should be moved to in pursuit of some fleet management objective. Likewise, some fleet management services may be incompatible with some other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more cost optimization services. Such cost optimization services may be embodied, for example, as services that may be provided to consumers (i.e., a user) of the cost optimization services to ensure that the user's datasets, storage systems, and other resources are managed in a way so as to minimize the cost to the user. For example, one or more cost optimization services may be offered to a user to ensure that the user's datasets are being replicated in a way that minimizes the costs (e.g., as measured in terms of dollars) associated with replicating data from a source storage system to any of a plurality of available target storage systems, to ensure that the user's datasets are being managed in a way that minimizes the costs associated with storing the dataset, to ensure that the user's storage systems or other resources are being managed in such a way so as to reduce the power consumption costs associated with operation the storage systems or other resources, or in other ways, including ensuring the user's datasets, storage systems, or other resources are being managed to as to minimize or reduce the cumulative costs of multiple expenses associated with the datasets, storage systems, or other resources. In addition, the one or more cost optimization services may even take into consideration contractual costs such as, for example, a financial penalty associated with violating a service level agreement associated with a particular user. In fact, the costs associated with performing an upgrade or performing some other action may also be taken into consideration, along with many other forms of costs that can be associated with providing data services and data solutions to customers. In this example, the cost optimization services may be presented 402 to a user, a selection of one or more selected cost optimization services may be received 404, and the selected cost optimization services may be applied 406 to a dataset that is associated with the user.

Consider an example in which a particular cost optimization services is designed to ensure that a user's datasets being managed in such a way that the cost to store the datasets are minimized, in spite of the fact that the user has a separate requirement that the dataset be stored within a local, on-premises storage system and also mirrored to at least one other storage resource. For example, the dataset can be mirrored to the cloud or mirrored to an off-site storage system. In order to provide this particular cost optimization service, a data services policy may be applied requiring that, for each possible replication target, the costs associated with transmitting the dataset to the replication target and the costs associated with storing the dataset on the replication target must be taken into consideration. In such an example, enforcing such a data services policy may result in the dataset being mirrored to the replication target with the lowest expected costs.

Readers will appreciate that many other forms of cost optimization services may be offered and implemented in accordance with embodiments of the present disclosure. In fact, the cost optimization services may operate in coordination with one or more other data services. For example, a particular cost optimization service may operate in coordination with one or more QoS data services, as the ability to store a dataset within a particular storage resource may be limited by performance requirements that are associated with QoS data services. For example, a user selecting a particular QoS data service that creates a requirement that the dataset must be accessible within certain latency maximums, may restrict the ability of the cost optimization service to consider all possible storage resources as a possible location where the dataset can be stored, as some storage resources (or combination of storage resources and other resources such as networking resources required to access the storage resources) may not be capable of delivering the level of performance required by the QoS data service. As such, the particular cost optimization service may only take into consideration target storage systems that a dataset could reside within and still be accessed in accordance with the requirements of the QoS data service that has been selected for the dataset. Likewise, some cost optimization services may be incompatible with some other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more workload placement services. Such workload placement services may be embodied, for example, as services that may be provided to consumers (i.e., a user) of the workload placement services to ensure that the user's datasets are managed in a way to adhere to various requirements related to where data is stored within a system that includes different storage resources. For example, one or more workload placement services may be offered to a user to ensure that the user's datasets are managed in a way so as to load balance accesses to data across the different storage resources, to ensure that the user's datasets are managed in a way so as to optimize a particular performance metric (e.g., read latency, write latency, data reduction) for selected datasets, to ensure that the user's datasets are managed in a way such that mission critical datasets are unlikely to be unavailable or subjected to relatively long access times, and so on.

Consider an example in which a particular workload placement service is designed to achieve a predetermined load balancing objective across three on-premises storage systems that are associated with a particular user. In order to provide this particular workload placement services, a data services policy may be applied requiring that three storage systems be regularly monitored to ensure that each storage system is servicing relatively similar number of IOPS and also storing a relatively similar amount of data. In such an example, if a first storage system is storing a relatively large amount of data but servicing a relatively small number of IOPS relative to the third storage system, enforcing a data services policy associated with the particular workload placement service may result in moving a relatively large (in terms of GB, for example) but infrequently accessed dataset on the first storage system to the third storage system, as well as moving a relatively small (in terms of GB) but frequently accessed dataset that is stored on the third storage system to the first storage system—all in pursuit of ensuring that each storage system is servicing relatively similar number of IOPS and also storing a relatively similar amount of data.

Readers will appreciate that many other forms of workload placement services may be offered and implemented in accordance with embodiments of the present disclosure. In fact, the workload placement services may operate in coordination with one or more other data services. For example, a particular workload placement service may operate in coordination with one or more QoS data services, as the ability to store a dataset within a particular storage resource may be limited by performance requirements that are associated with QoS data services. For example, a user selecting a particular QoS data service that creates a requirement that the dataset must be accessible within certain latency maximums, may restrict the ability of the workload placement service to load balance across storage resources, as some storage resources (or combination of storage resources and other resources such as networking resources required to access the storage resources) may not be capable of delivering the level of performance required by the QoS data service. As such, the particular workload placement service may only take into consideration target storage systems that a dataset could reside within and still be accessed in accordance with the requirements of the QoS data service that has been selected for the dataset. Likewise, some workload placement services may be incompatible with some other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more dynamic scaling services. Such dynamic scaling services may be embodied, for example, as services that may be provided to consumers (i.e., a user) of the dynamic scaling services to ensure scale up and down storage resources associated with a user's datasets as needed. For example, one or more dynamic scaling services may be offered to a user to ensure that the user's datasets and storage resources are managed in a way so as to meet various objectives that can be achieved by scaling measures.

Consider an example in which a particular dynamic scaling service is designed to ensure that a user's mission critical datasets are managed in a way such that the datasets do not reside on any storage resource that is more than 85% utilized in terms of storage capacity or IOPS capacity. In order to provide this particular dynamic scaling service, a data services policy may be applied requiring that: 1) a storage resource be scaled up (if possible) once this utilization threshold is hit, or 2) workloads be rearranged once this threshold is hit in order to bring the storage resources that store the mission critical dataset below 75% in terms of storage capacity and IOPS capacity. For example, if a dataset resides in a cloud-based storage system as described above, the cloud-based storage system may be scaled by adding additional virtual drives (i.e., cloud-computing instances with local storage), the cloud-based storage system may be scaled by using higher performance cloud computing instances to execute the storage controller applications, and so on. Alternatively, if the dataset resides on a physical storage system that cannot be immediately scaled, some datasets may be migrated off of the physical storage system until utilization levels are acceptable.

Readers will appreciate that many other forms of dynamic scaling services may be offered and implemented in accordance with embodiments of the present disclosure. In fact, the dynamic scaling services may operate in coordination with one or more other data services. For example, a particular dynamic scaling service may operate in coordination with one or more QoS data services, as the ability to provide certain levels of performance as required by the QoS data service may be dependent upon having properly scaled storage resources (or other resources). For example, a user selecting a particular QoS data service that creates a requirement that the dataset must be accessible within certain latency maximums, may immediately trigger one or more dynamic scaling services required to scale resources in a way that the latency targets can be met. Likewise, some dynamic scaling services may be incompatible with some other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more performance optimization services. Such performance optimization services may be embodied, for example, as services that may be provided to consumers (i.e., a user) of the performance optimization services to ensure that the user's datasets, storage resources, and other resources are managed in a way to maximize performance as measured by a variety of possible metrics. For example, one or more performance optimization services may be offered to a user to ensure that the user's storage resources are being maximized in terms of the collective amount of IOPS that may be service, to ensure that life of different storage resources are being maximized through the application of wear leveling policies, by ensuring that the users storage resources are being managed so as to minimize total power consumption, by ensuring that the users storage resources are being managed to ensure uptime of the resources, or in other ways. Likewise, the one or more performance optimization services may be offered to a user to ensure that the user's dataset are accessible in accordance with various performance objectives. For example, the user's datasets may be managed so as to offer the best performance in terms of IOPS for particular datasets, the user's datasets may be managed so as to offer the best performance in terms of data reduction for particular datasets, the user's datasets may be managed so as to offer the best performance in terms of availability for particular datasets, or in some other way.

Consider an example in which a particular performance optimization service is designed to ensure that a user's storage resources are managed in a way so as to maximize the amount of data that may be collectively stored on the storage resources collectively. In order to provide this particular performance optimization service, the performance optimization service may be presented 402 to a user (e.g., via a GUI) and selected by the user, thereby causing a selection of the particular performance optimization service to be received 404. In response to receiving 404 the selection of the particular performance optimization service, one or more data services policies may be applied 406 to a dataset associated with the user to carry out the particular performance optimization service. For example, a data services policy may be applied requiring that certain types of data be stored on storage resources that implement compression method that are likely to achieve the best data compression results. For example, if one storage system utilizes compression algorithms that are more effective at compressing text data and a second storage system utilizes compression algorithms that are more effective at compressing video data, implementing the data services policies may result in video data being stored on the second storage system and text data being stored on the first storage system. Likewise, a data services policy may be applied that requires that data from similar host applications be stored in the same storage resources in order to improve the level of data deduplication that may be achieved. For example, if data from database application can be more effectively deduplicated when deduplicated against data from other database applications and data from an image processing application can be more effectively deduplicated when deduplicated against data from other image processing applications, implementing the data services policies may result in all data from database applications being stored on a first storage system and all data from image processing applications being stored on a second storage system, in pursuit of better deduplication ratios than would achieve by storing data from each type of application on the same storage system. By achieving better data reduction ratios in the backend storage systems, more data can be stored in the storage resources from the perspective of the user.

For example, using the compression example described above, if a first storage system can compress some data from an uncompressed size of 1 TB to a compressed size of 300 GB whereas a second storage system can only compress that same 1 TB of data to a compressed size of 600 GB (because the storage systems use different compression algorithms), the amount of storage that is available from the user's perspective looks different as storing the data on the second storage system requires consuming an additional 300 GB of storage from a backend pool of storage systems whose physical capacity is fixed (whereas their logical capacity can be improved through intelligent placement of data).

Readers will appreciate that many other forms of performance optimization services may be offered and implemented in accordance with embodiments of the present disclosure. In fact, the performance optimization services may operate in coordination with one or more other data services. For example, a particular performance optimization service may operate in coordination with one or more QoS data services, as the ability to provide certain levels of performance as required by the QoS data service may restrict the ability to place datasets on particular storage resources. For example, if a user selects a particular QoS data service that creates a requirement that the dataset must be accessible within certain latency maximums but also selects a particular performance optimization service designed to maximize logical storage capacity, only those storage resources that can satisfy both requirements may be candidates for receiving the dataset, even if other storage resources can provide for better results with respect to one service (while not able to meet the requirements of another service). For example, a dataset may not be able to be placed on a particular storage system that can only offer relatively high I/O latencies (because placing the dataset in such a way would cause the QoS policy to be violated) even if that particular storage systems may be able to perform excellent data compression of the dataset by virtue of supporting a compression algorithm that is highly efficient for that dataset. As such, some performance optimization services may be incompatible with some other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more network connectivity services. Such network connectivity services may be embodied, for example, as services that may be provided to consumers (i.e., a user) of the network connectivity services to ensure that the user's datasets, storage resources, networking resources, and other resources are managed in a way to adhere to various connectivity requirements. For example, one or more network connectivity services may be offered to a user to ensure that the user's datasets are reachable via a predetermined number of networking paths that are not reliant on any shared hardware or software components. Likewise, the one or more network connectivity services may be offered to a user to ensure that the user's datasets are managed in a way so as to only be reachable via secure data communications channels, by ensuring that a user's datasets are managed in a way so as to inform host applications of the optimal data communications path for accessing the dataset, to ensure that storage resources that store the user's dataset can communicate over data communications paths that meet certain requirements, and many others.

Consider an example in which a particular network connectivity service is designed to ensure that a user's datasets are reachable via a predetermined number of networking paths that are not reliant on any shared hardware or software components. In order to provide this particular network connectivity service, the network connectivity service may be presented 402 to a user (e.g., via a GUI) and selected by the user, thereby causing a selection of the particular network connectivity service to be received 404. In response to receiving 404 the selection of the particular network connectivity service, one or more data services policies may be applied 406 to a dataset associated with the user to carry out the particular network connectivity service. For example, a data services policy may be applied requiring that the dataset reside on at least two distinct storage resources (e.g., two distinct storage systems) that can be reachable from an application host or other device that accesses the dataset via distinct data communications networks. To that end, applying the data services policy may cause the dataset to be replicated from one storage resource to another, applying the data services policy may cause a mirroring mechanism to be activated to ensure that the dataset resided on both storage resources, or some other mechanism may be used to enforce the policy.

Readers will appreciate that many other forms of network connectivity services may be offered and implemented in accordance with embodiments of the present disclosure. In fact, the network connectivity services may operate in coordination with one or more other data services. For example, a particular network connectivity services may operate in coordination with one or more replication services, QoS services, data compliance services, and other services as the ability to place datasets in such a way so as to adhere to a particular network connectivity service may be limited based on the ability to replicate the dataset in accordance with the replication service, and further based on the ability to meet the performance requirements guaranteed by a QoS service, and still further based on the ability to place datasets in order to adhere to one or more data compliance services. For example, in the example set forth above where the network connectivity service required that the dataset reside on at least two distinct storage resources (e.g., two distinct storage systems) that can be reachable from an application host or other device that accesses the dataset via distinct data communications networks, a combination of storage resources could only be selected if the other services could also be provided. In some embodiments, if two storage resources that could not deliver on all of the selected services were not available, the user could be prompted to remove some selected service, a best fit algorithm could be used to select the two storage systems that came closest to being able to deliver the selected services, or some other action could be taken. As such, some network connectivity services may be incompatible with some other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more data analytic services. Such data analytic services may be embodied, for example, as services that may be provided to consumers (i.e., a user) of the data analytic services to provide data analytics capabilities to a user's datasets, storage resources, and other resources. For example, one or more data analytic services may be offered that analyze the contents of a user's dataset, that cleanse the contents of the user's dataset, that perform data collection operations to create or augment a user's datasets, and so on.

Readers will appreciate that many other forms of data analytic services may be offered and implemented in accordance with embodiments of the present disclosure. In fact, the data analytic services may operate in coordination with one or more other data services. For example, a particular data analytic services may operate in coordination with one or more QoS data services, such that accesses to the dataset for the purposes of performing data analytics may be given lower priority than more traditional accesses of the data (e.g., user-initiated reads and writes) in order to avoid violating the performance guarantees set forth in the QoS data service. As such, some data analytic services may be incompatible with some other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more data portability services. Such data portability services may be embodied, for example, as services that may be provided to consumers (i.e., a user) of the data portability services to allow the user to perform various data movement, data conversion, or similar processes on the user's datasets. For example, one or more data portability services may be offered to a user to allow the user to migrate their datasets from one storage resource to another storage resources, to allow the user to convert their dataset from one format (e.g., block data) to another format (e.g., object data), to allow the user to consolidate data, to allow the user to transfer their datasets from one data controller (e.g., a first cloud-services vendor) to another data controller (e.g., a second cloud-services vendor), to allow the users to convert their dataset from being compliant with a first set of regulations to being compliant with a second set of regulations, and so on. In this example, the data portability services may be presented 402 to a user, a selection of one or more selected data portability services may be received 404, and the selected data portability services may be applied 406 to a dataset that is associated with the user.

Consider an example in which a particular data portability service is designed to allow the user to transfer their datasets from a first data controller (e.g., a first cloud-services vendor) to a second data controller (e.g., a second cloud-services vendor). In order to provide this particular data portability service, a data services policy may be applied that causes the dataset to periodically be converted to be compatible with the second data controller's infrastructure. Readers will appreciate that many other forms of data portability services may be offered and implemented in accordance with embodiments of the present disclosure. In fact, the data portability services may operate in coordination with one or more other data services. For example, a particular data portability service may operate in coordination with one or more data compliance services, such that migration of a dataset from a first data controller to a second data controller may be restricted so as to not cause the user to violate a regulatory compliance set forth in the one or more data compliances services. As such, some data portability services may be incompatible with some other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more upgrade management services. Such upgrade management services may be embodied, for example, as services that may be provided to consumers (i.e., a user) of the data compliance services to ensure that the user's datasets, storage resources, and other resources can be upgraded or kept up-to-date as various updates become available. For example, one or more upgrade management services may be offered to a user to ensure that the user's storage resources are upgrade upon the occurrence of certain thresholds (e.g., age, utilization), to ensure that system software is upgrades as patches and new releases become available, to upgrade cloud components are new cloud service offerings become available, to ensure that storage related resources such as file systems are upgraded as upgrades or updates become available, and so on.

Consider an example in which a particular upgrade management service is designed to ensure that a user's storage resources managed in a way so as to guarantee that new software updates to a user's storage systems are applied as new software updates become available. In order to provide this particular upgrade management service, a data services policy may be applied requiring a storage system periodically check for updates, download any updates, and install updates within 24 hours of the update becoming available. Readers will appreciate that many other forms of upgrade management services may be offered and implemented in accordance with embodiments of the present disclosure. In fact, the upgrade management services may operate in coordination with one or more other data services. For example, a particular upgrade management service may operate in coordination with one or more QoS services, such that updates or upgrades are only applied at times when QoS requirements can be maintained by the resources being upgraded or by some other resource. As such, some upgrade management services may be incompatible with some other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more data security services. Such data security services may be embodied, for example, as services that may be provided to consumers (i.e., a user) of the data security services to ensure that the user's datasets, storage resources, and other resources are managed in a way to adhere to various security requirements. For example, one or more data security services may be offered to a user to ensure that the user's datasets are encrypted in accordance with certain standards both at rest (when stored on a storage resource) and in transit such that end-to-end encryption is achieved. In fact, the one or more data security services may include guarantees describing how data will be protected at rest, guarantees describing how data will be protected in transit, guarantees describing private/public key systems that will be used, guarantees describing how access to the datasets or resources will be restricted, and so on.

Consider an example in which a particular data security service is designed to guarantee that a dataset that is stored on a particular storage resource will be encrypted using keys that are maintained on resources other than the storage resource such as, for example, a key server. In order to provide this particular data security service, a data services policy may be applied requiring that the storage resource requests a key from the key server, encrypts the dataset (or any unencrypted portion thereof), and delete the encryption key each time that the dataset is modified (e.g., via a write). Likewise, in order to service reads, the storage resource may need to request a key from the key server, decrypt the dataset, and delete the encryption key. Readers will appreciate that many other forms of data security services may be offered and implemented in accordance with embodiments of the present disclosure. In fact, the data security services may operate in coordination with one or more other data services. For example, a particular data security service may operate in coordination with one or more QoS services, such that only certain QoS services may be made available when a particular data security service is selected, as the requirement to perform various security functions may limit the extent to which high performance guarantees can be made. As such, some data security service may be incompatible with some other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more converged system management services. Such converged system management services may be embodied, for example, as services that may be provided to consumers (i.e., a user) of the converged system management services to ensure that the user's datasets, storage resources, and other resources in a converged system are managed in a way to adhere to some policies. For example, one or more converged system management services may be offered to a user to ensure that a converged infrastructure that includes storage resources and one or more GPU servers that are designed for AI/ML applications can be managed in a certain way. Likewise, one or more converged system management services may be offered to a user to ensure that a converged infrastructure that includes storage resources and on-premises cloud infrastructures (e.g., an Amazon Outpost) may be managed in a certain way. For example, the one or more converged system management services may guarantee that I/O operations that are directed to storage resources and were initiated by the GPU servers in the converged infrastructure described above will be prioritized over I/O operations initiated by devices that are external to the converged infrastructure. Readers will appreciate that many other forms of converged system management services may be offered and implemented in accordance with embodiments of the present disclosure. In fact, the converged system management services may operate in coordination with one or more other data services. As such, some converged system management services may be incompatible with some other data services, such that a user may be prevented from selecting two conflicting or otherwise incompatible services.

Another example of data services that may be presented 402 to a user, selected by a user (where such a selection is received 404 by one or more data services modules or similar mechanism), and ultimately applied 406 to a dataset associated with the user can include one or more application development services. Such application development services may be embodied, for example, as services that may be provided to consumers (i.e., a user) of the data compliance services to facilitate the development and testing of applications, as well as carry out any other aspects of the application development and testing cycle. For example, one or more application development services may be offered to a user to that enable the user to quickly create clones of production datasets for development purposes, to create a clone of a production dataset that has personally identified information obfuscated, to spin up additional virtual machines or containers for testing, to manage all of the connectivity required between test execution environments and the dataset that such environments utilize, and so on. In order to provide for such application development services, one or more data services policies may be applied 406 to a dataset associated with the user to carry out the particular application development service. For example, a data services policy may be applied that, upon user request, creates a clone of a production dataset, where personally identifiable information in the dataset obfuscated in the clone, and subsequently stores the clone on a storage resource that is available for development and testing operations.

Readers will appreciate that many other forms of application development services may be offered and implemented in accordance with embodiments of the present disclosure. In fact, the application development services may operate in coordination with one or more other data services. For example, a particular application development services may operate in coordination with one or more replication policies, such that clones of a production dataset may only be sent to non-production environments (e.g., to a development and test environment). As such, some application development services may be incompatible with some other data services, such that a user may be prevented from selecting two conflicting or otherwise incompatible services.

Readers will appreciate that while examples were given above in which a user may select multiple services and that compatibility may need to be established between the selected services, there are many other combinations of services (as well as individual services) that may be presented 402 to a user, selected by a user (where such a selection is received 404 by one or more data services modules or similar mechanism), and ultimately applied 406 to a dataset, storage resource, or some other resource associated with the user. Readers will further appreciate that many of the example data services described above (and other services) may include some level of overlap and may also be associated with similar, related, or even identical data services policies.

Readers will further appreciate that various mechanisms may be used to attach one or more data services policies to a particular dataset. For example, metadata may be attached to the dataset that identifies particular data services policies that the dataset is subject to. Alternatively, a centralized repository may be maintained that associates identifiers of each dataset with the data services policies that the dataset is subjected to. Likewise, various devices may maintain information describing datasets that they handle. For example, a storage system may maintain information describing data services policies that each dataset that is stored within the storage system is subjected to, networking equipment may maintain information describing data services policies that each dataset that passes through the networking equipment is subjected to, and so on. Alternatively, such information may be maintained elsewhere and may be accessible to the various devices. In other embodiments, other mechanisms may be used to attach one or more data services policies to a particular dataset.

Figure 5:
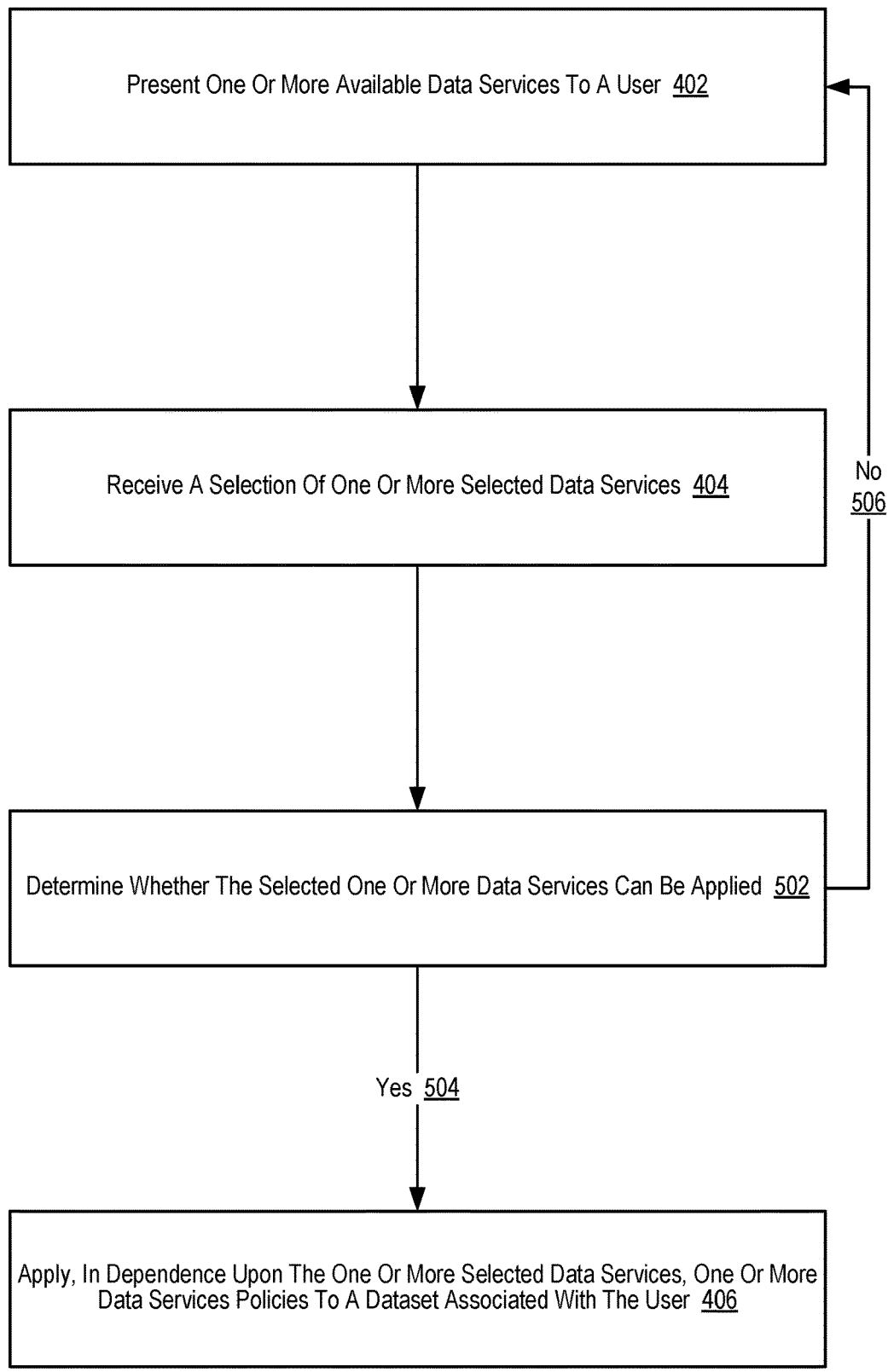
FIG. 5 sets forth a flow chart illustrating an additional example method of providing data management as-a-service in accordance with some embodiments of the present disclosure.

For further explanation, FIG. 5 sets forth a flow chart illustrating an additional example method of providing data management as-a-service in accordance with some embodiments of the present disclosure. The example method depicted in FIG. 5 is similar to the example method depicted in FIG. 4, as the example method depicted in FIG. 5 also includes presenting 402 one or more available data services to a user, receiving 404 a selection of one or more selected data services, and applying 406, in dependence upon the one or more selected data services, one or more data services policies to a dataset associated with the user.

In the example methods described herein, the one or more available data services that are presented 402 to the user may be selected in dependence upon one or more previously selected services. For example and as described in greater detail above, in some situations two data services may conflict with each other so that the two data services may not be delivered at the same time for the same dataset (or same set of resources). For example, a service that places a storage system in its highest performance mode may conflict with a service that is intended to minimize the storage resource's power consumption. Likewise, a data service that guarantees that a dataset can be accessed with relatively low read and write latencies may conflict with a data service that guarantees that writes are mirrored to multiple storage systems before being acknowledged to a host that issues write operations, as it may be impossible to service writes in a way that is low latency while also mirroring multiple copies of a write before acknowledging that the write has completed. As such, an evaluation may be made as to whether a particular service can actually be delivered given the selections that a user has already made. Continuing with the example above, if a user has already selected the service that places a storage system in its highest performance mode, the service that is intended to minimize the storage resource's power consumption may not be presented 402 to the user—at least not in a way that allows the user to select the power conservation service without first de-selecting the high performance service.

The example method depicted in FIG. 5 also includes determining 502 whether the selected one or more data services can be applied 406. In the example methods described herein, determining 502 whether the selected one or more data services can be applied 406 may be carried out in dependence upon one or more previously selected services. Determining 502 whether the selected one or more data services can be applied 406 may be carried out, for example, by accessing a list or other source of information describing which services are compatible with each other, by accessing a list or other source of information describing which services are incompatible with each other, or in some other way where compatibility is determined based on predetermined configuration or configuration-like information. In other embodiments, determining 502 whether the selected one or more data services can be applied 406 may be a more dynamic process where information describing the current state of storage resources, networking resources, user activity such as the amount of reads and writes being directed to the datasets or storage systems, and various other metrics may be used to determine 502 whether the selected one or more data services can be applied 406.

Consider an example in which a particular service guarantees that a dataset can be accessed within relatively low latencies for both reads and writes. In this example, also assume that the storage resources that store the dataset are currently operating a full utilization levels, such that the storage resource is servicing as many IOPS as it is capable of servicing. In such an example, especially where the dataset is not currently able to be accessed within the relatively low latencies for both reads and writes that are guaranteed by the particular service, a determination 512 may be made that the particular service cannot be applied (at least not before other actions such as upgrading the storage resource, migrating workloads, etc.) given that the storage resource is already operating at its peak performance capacity.

In such an example, if it is affirmatively 504 determined that the selected one or more can be applied, the example method depicted in FIG. 5 can proceed by actually applying 506 the one or more selected services. If it is determined that the selected one or more cannot 506 be applied, however, a user may again be presented 402 one or more available data services. Such a presentation may be modified as described above to preventing conflicting services from being presented, such a presentation may include the user being prompted to de-select one or more services (with information presented to the user that describes the incompatibility or conflict), or other modified versions of the services available may be presented 402.

Figure 6:
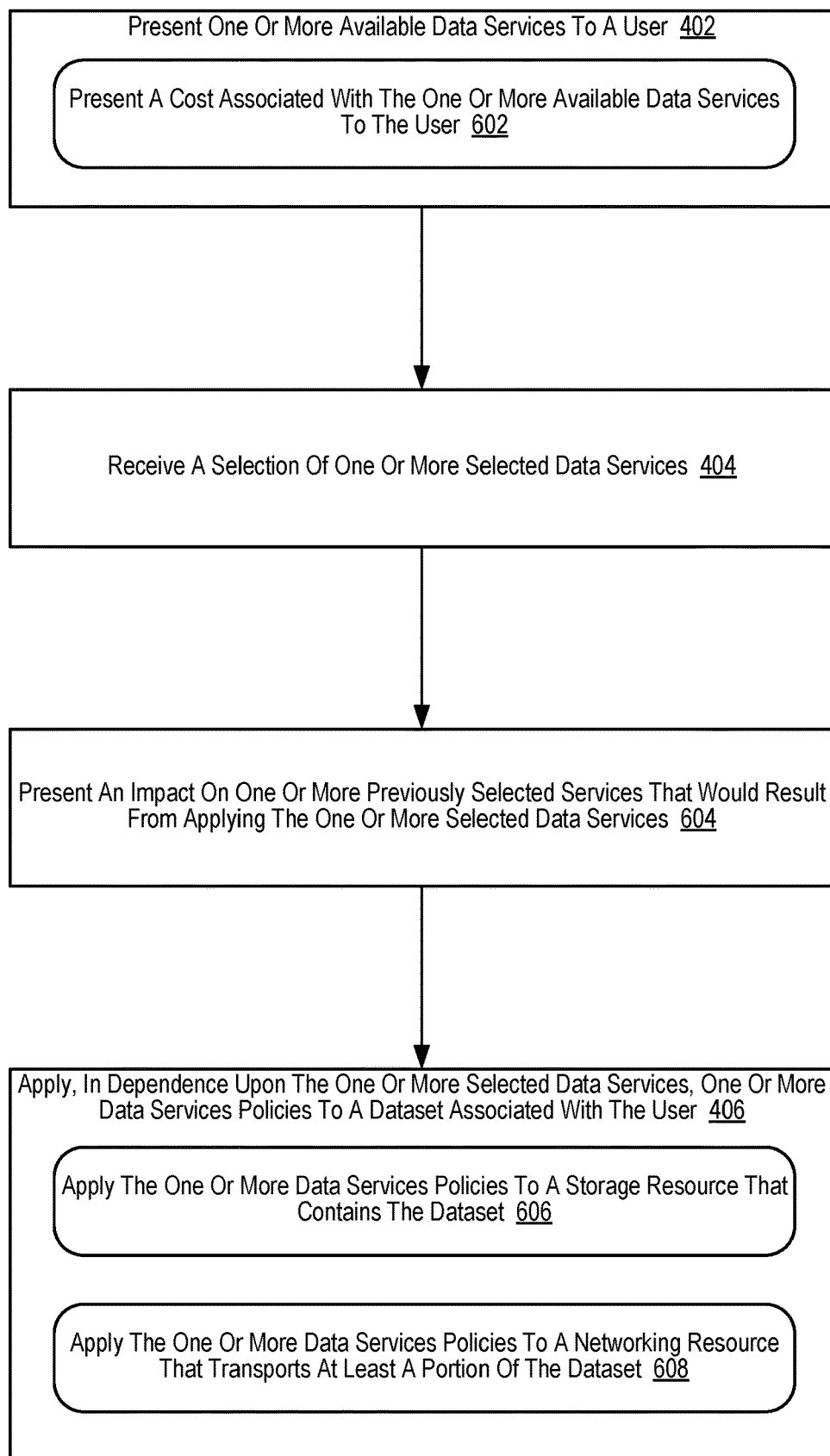
FIG. 6 sets forth a flow chart illustrating an additional example method of providing data management as-a-service in accordance with some embodiments of the present disclosure.

For further explanation, FIG. 6 sets forth a flow chart illustrating an additional example method of providing data management as-a-service in accordance with some embodiments of the present disclosure. The example method depicted in FIG. 6 is similar to the example methods depicted in FIG. 4 and FIG. 5, as the example method depicted in FIG. 6 also includes presenting 402 one or more available data services to a user, receiving 404 a selection of one or more selected data services, and applying 406, in dependence upon the one or more selected data services, one or more data services policies to a dataset associated with the user.

In the example methods described herein, the one or more available data services that are presented to the user may be selected in dependence upon one or more permissions associated with the user. The one or more permissions may represent the extent to which a user is allowed to access, modify, or otherwise initiate the application of various services. Readers will further appreciate that some services may be associated with one set of permissions while another set of services may be associated with a different set of permissions. For example, the ability to change which testing and development services are being applied may be open to most users whereas the ability to change which data compliance services are being applied may be open only to a small set of trusted users.

In the example method depicted in FIG. 6, presenting 402 one or more available data services to the user can include presenting 602 a cost associated with the one or more available data services to the user. Readers will appreciate that each of the service offerings may be offered at a price and, as such, pricing information may be presented 602 to the user as part of presenting 402 one or more available data services to the user. The costs that are presented 602 may be expressed, for example, in terms of an amount of money per amount of time that the service is applied, an amount of money based on the extent to which the service is utilized, or in some other way.

In the example method depicted in FIG. 6, in response to receiving 404 a selection of one or more selected data services, the method may include presenting 604, to the user, an impact on one or more previously selected services that would result from applying the one or more selected data services. The impact on one or more previously selected services that would result from applying the one or more selected data services may represent the effect on the previously selected service that would occur if the one or more selected data services were applied.

Consider an example in which a previously selected service was a service that guaranteed that write operations directed to a dataset that was stored on a first storage system would be serviced within a predetermined, relatively low write latency threshold. In such an example, assume that a user subsequently selected a service that ensured that the dataset could be protected from a failure of the first storage system by requiring that the first storage system backup the data contained in a write operation to a second storage system before acknowledging that the write has been completed. In such an example, the addition of this requirement to essentially have duplicate copies of data associated with a write be stored in distinct storage systems before acknowledging that the write has been completed would understandably result in higher write latencies. As such, presenting 604 an impact on one or more previously selected services that would result from applying the one or more selected data services may be carried out by displaying information describing the extent to which the previously selected service (i.e., the service that guarantees that write operations directed to a dataset that was stored on a first storage system would be serviced within a predetermined, relatively low write latency threshold) would be impacted if the selected data service (i.e., the service that ensured that the dataset could be protected from a failure of the first storage system by requiring that the first storage system backup the data contained in a write operation to a second storage system before acknowledging that the write has been completed) were applied. For example, if the average expected write latency would increase from 100 microseconds to 250 microseconds, presenting 604 an impact on one or more previously selected services that would result from applying the one or more selected data services may be carried out by displaying information indicating that the average expected write latency would increase from 100 microseconds to 250 microseconds. In such an example, the impact on one or more previously selected services may be determined by analyzing the performance of similar resources that had the same or similar services applied, by projecting the impact based on one or more performance projection formulas, or in some other way.

Readers will appreciate that in the example described in the previous paragraph, the two service may not conflict, such that both services can be successfully applied at the same time. Stated differently, applying the selected data services may not cause the guarantees offered by the previously selected data services to be violated. Applying the selected data services may, however, impact the previously selected data services such that the user can be presented 604 with the impact on one or more previously selected services that would result from applying the one or more selected data services so that the user can make an informed decision regarding whether they would like to proceed with applying the selected data services.

In the example method depicted in FIG. 6, applying 406 the one or more data services policies to the dataset associated with the user can include applying 606 the one or more data services policies to a storage resource that contains the dataset. The storage resource that contains the dataset may be embodied, for example, as one or more of the storage systems described above including modifications thereof, as one or more of the cloud-based storage systems described above including modifications thereof, as one or more cloud storage resources (e.g., Amazon S3, Amazon EBS, Azure Blob storage), as one or more storage devices arranged in some other way, or as combinations of such storage resources. Applying 606 the one or more data services policies to a storage resource that contains the dataset may be carried out, for example, by modifying the configuration of the storage resources, by modifying the operation of the storage resources, by monitoring the storage resources, or in some other way.

Consider an example where a user selects a data service that dynamically scales up and down the storage resource that store the user's datasets in dependence upon a variety of factors such as, for example, the size of the dataset, the amount of read and write activity that is directed to the dataset, the extent to which service level agreements associated with the datasets are being me, and so on. In such an example, assume that the storage resource that stores the users dataset is a cloud-based storage system as described above, including with reference to FIG. 3C. In such an example, further assume that the dataset is heavily accessed from 7 AM until 8 PM, but from 8 PM until 7 AM, the dataset is not accessed nearly as frequently as the dataset is largely used by employees of a business organization during business hours. In such an example, in order to scale up and down the storage resources, relatively powerful (and expensive) cloud computing instances may be used to support the execution of storage controller application in the cloud0based storage system from 7 AM until 8 PM, but the cloud-based storage system may be scaled down such that relatively unpowerful (and inexpensive) cloud computing instances may be used to support the execution of storage controller application in the cloud0based storage system from 8 PM until 7 AM. Such an embodiment is one example of applying 606 the one or more data services policies to a storage resource that contains the dataset, although many other examples are possible in accordance with embodiments of the present disclosure.

In the example method depicted in FIG. 6, applying 406 the one or more data services policies to the dataset associated with the user can include applying 608 the one or more data services policies to a networking resource that transports at least a portion of the dataset. The networking resource that transports at least a portion of the dataset may be embodied, for example, as one or more network switches, as one or more communications fabrics, and so on. Applying 608 the one or more data services policies to a networking resource that transports at least a portion of the dataset may be carried out, for example, by modifying the configuration of the networking resource, by modifying the operation of the networking resource, by monitoring the networking resource, or in some other way.

Consider an example in which a user selects a data service that is designed to prevent sensitive data from being obtained during transport and later accessed via a malicious actor. In such an example, the data service may require that a particular dataset be encrypted when stored or when in transit, and that secure data communications links be used for communications between a storage resource that stores the dataset and an application host that accesses the dataset. In such an example, data communications that involve the dataset may be carried using security protocols such as Transport Layer Security ('TLS'), using dedicated communications links that are part of a virtual private network, or in some other way. In such an example, applying 608 the one or more data services policies to a networking resource that transports at least a portion of the dataset may therefore be carried out by configuring the networking resources to use a particular security protocol, by adding virtual networking resources that may be used to carry out accesses to the dataset, or in some other way.

Enterprise storage systems, or more particularly a fleet of enterprise storage systems, typically provide telemetry data to a cloud-based service. For example, the telemetry data reported may include data describing various operating characteristics of the storage system and may be analyzed by the cloud-based service for a vast array of purposes including, for example, to determine the health of the storage system, to identify workloads that are executing on the storage system, to predict when the storage system will run out of various resources, to recommend configuration changes, workflow migrations, or other actions that may improve the operation of the storage system. However, such cloud-based services do not support a control channel for remote API requests directed to storage system APIs or for active management of software on the storage system. In the following examples, an edge management service provides such a control channel between a cloud-based service (i.e., a cloud-based storage service) and an edge device (e.g., a storage system controller or a server coupled to a storage system).

Figure 7:
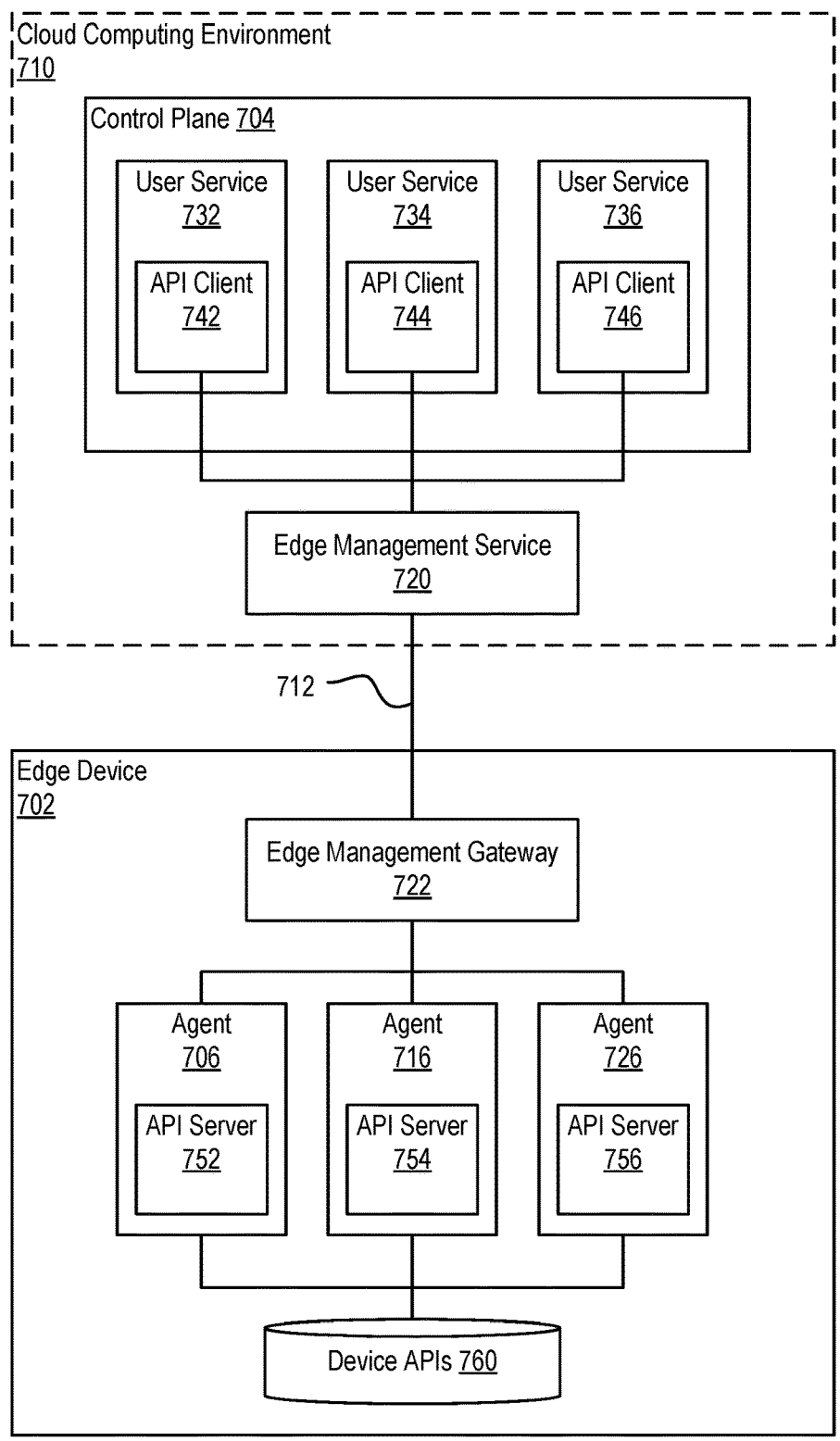
FIG. 7 sets forth a diagram illustrating an example system for non-disruptively moving a storage fleet control plane in accordance with some embodiments of the present disclosure.

For further explanation, FIG. 7 sets forth a flow chart illustrating an example system for non-disruptively moving a storage fleet control plane according to some embodiments of the present disclosure. The example of FIG. 7 includes an edge device 702 that is coupled to a cloud computing environment 710. In some examples, the edge device 702 is embodied in a physical storage system, which may be similar to any of the physical storage systems discussed above. Such a storage system may be, for example, an enterprise data storage system located in an on-premises data center. In one example, the edge device 702 may be a storage controller of such a storage system. In other examples, the edge device 702 may be an enterprise server coupled to an enterprise storage system or fleet of enterprise storage systems. For example, the edge device 702 may be an enterprise server in an enterprise data center that includes a fleet of enterprise storage systems. In these examples, the edge device 702 may be coupled to the enterprise storage systems through a local network (e.g., a LAN, SAN, etc.). Although, it should not be considered a requirement that the edge device 702 is related to storage systems or storage services. In fact, the edge device 702 may provide a myriad of edge services.

Although depicted in less detail, the cloud computing environment 710 may be similar to the cloud computing environment 316 described above with reference to FIGS. 3A-3C. In fact, the cloud computing environment may include the same, fewer, additional components as any of the cloud computing environments or cloud-based service environments described above. For example, the cloud computing environment may include a public cloud environment, a private cloud environment, a virtual private cloud environment, a hybrid cloud environment, and so on.

In the example of FIG. 7, the control plane 704 is supported by the cloud computing environment 710. In some examples, the control plane 704 includes one or more user services 732, 734, 736 executing on cloud resources of the cloud computing environment 710. For example, the cloud resources may be cloud computing instances that are provided by the cloud computing environment 710 to support the execution of software and services such as the control plane 704. Thus, the control plane 704 "resides" in the cloud computing environment 710 in that its execution is supported by cloud resources. In some examples, the user services 732, 734, 736 are containerized services or applications whose execution is supported by the cloud computing environment 710. The one or more user services 732, 734, 736 of the control plane 704 interface with one or more agents 706, 716, 726 installed on the edge device 702 to utilize services provided by the edge device 702.

In some examples, the user services 732, 734, 736 and the agents 706, 716, 726 share an API architecture through which the user services 732, 734, 736 may dispatch API calls to agents 706, 716, 726. The agents 706, 716, 726, in turn, respond to the API calls by interacting with device APIs 760. The device APIs 760 may be, for example, APIs native to the edge device 702 or APIs that are exposed to the edge device 702 by another device such as a connected storage system or fleet of storage systems. In some implementations, the common API architecture utilized by the user services 732, 734, 736 and the agents 706, 716, 726 is a REST API (e.g., HTTP) or an RPC (e.g., gRPC) API. In some examples, the user services 732, 734, 736 include API clients 742, 744, 746 while the agents 706, 716, 726 includes API servers 752, 754, 756.

In the example of FIG. 7, the control plane 704 and the agents 706, 716, 726 communicate through an edge management service 720 in the cloud computing environment 710 and an edge management gateway 722 on the edge device 702. The edge management service 720 and edge management gateway 722 are coupled by an edge management control channel 712. For example, the edge management control channel 712 may be implemented through an IoT messaging layer based on one or more IoT messaging protocols. The edge management service 720 may be embodied as a set of computer program instructions, such as a containerized application stored in cloud-based storage, that execute on cloud computing resources. The edge management gateway 722 may be embodied as a set of computer program instructions, stored on a computer-readable medium, that execute on a processor of the edge device 702.

In these examples, the edge management gateway 722 reads control messages from the control plane 704 and communicates with the agents 706, 716, 726 and other edge device components (e.g., a container orchestrator or certificate manager) in response to control messages. Thus, in such examples, the edge management control channel 712 provides a standard messaging layer between the control plane 704 and the agents 706, 716, 726 through the edge management service 720 and edge management gateway 722. Further, the edge management control channel 712 supports a mechanism for deploying agents 706, 716, 726 to edge device 702, which is described in more detail below. In some examples, all messages passed through the edge management control channel 712 are cryptographically signed in both directions.

In some examples, the edge management control channel 712 includes and IoT messaging layer that implements an IoT messaging protocol such as MQTT. In these examples, the edge management service 720 may receive API calls from the API clients 742, 744, 746 of the user services 732, 734, 736, where the API calls are directed to API servers 752, 754, 756 of the agents 706, 716, 726. The edge management service 720 converts an API call to an IoT message by encapsulating the API call in the payload of an IoT message packet (e.g., an MQTT packet). The edge management service 720 then publishes the IoT message to the edge management control channel 712. The IoT message is read by the edge management gateway 722, which extracts the API request and forwards it the API server 752, 754, 756 of the target agent 706, 716, 726.

Figure 8:
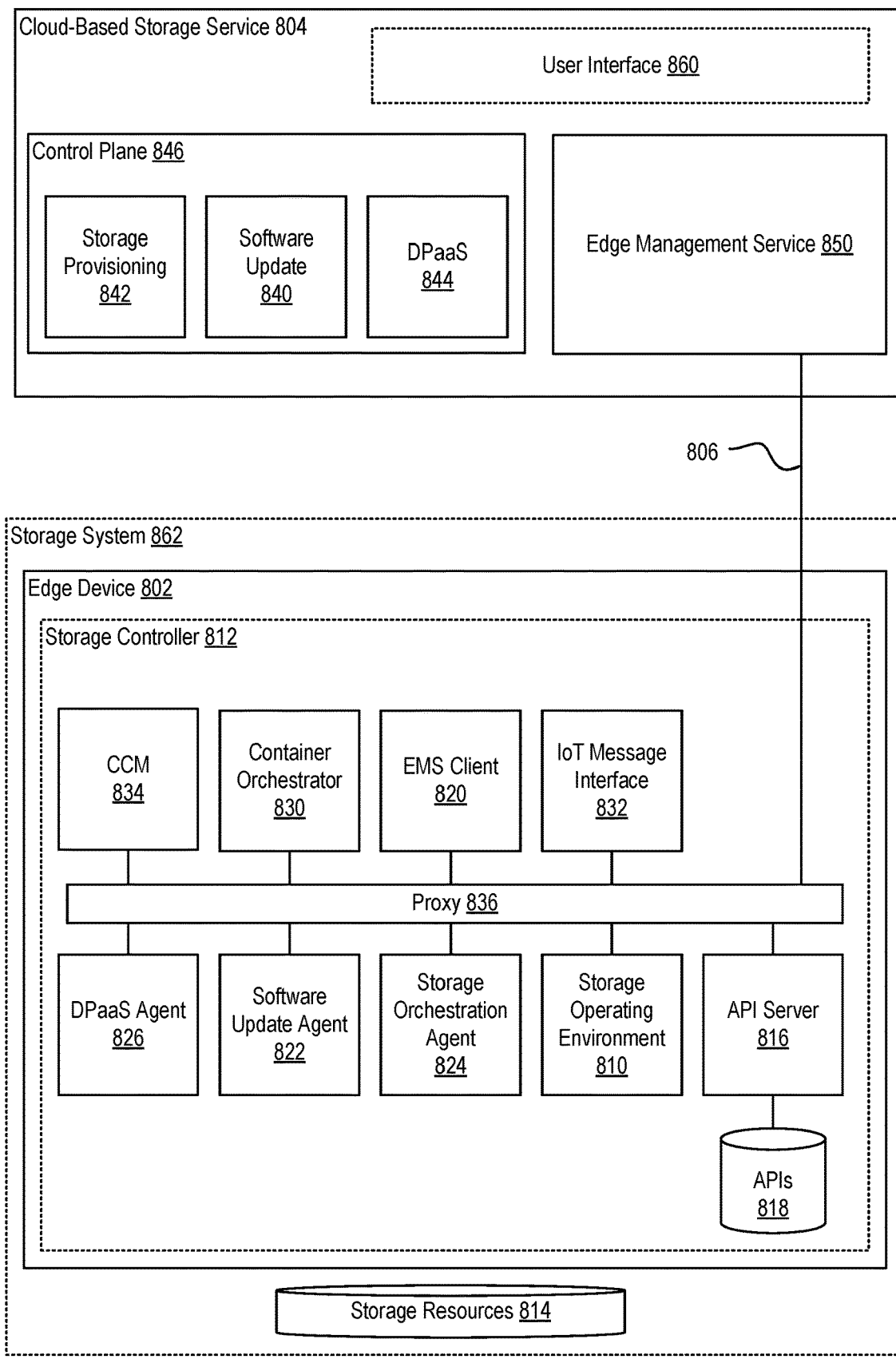
FIG. 8 sets forth a diagram illustrating an additional example system for non-disruptively moving a storage fleet control plane in accordance with some embodiments of the present disclosure.

For further explanation, FIG. 8 sets forth a diagram of an example architecture for an edge management system that employs a control channel between cloud-based storage services and enterprise devices (such as edge servers or enterprise storage systems). The example of FIG. 8 includes an edge device 802 that is configured to receive control messages from a cloud-based storage service 804 over a data communication link 806. In some examples, the cloud-based storage service 804 is a storage service or set of storage services (e.g., microservices) whose execution is supported by cloud resources (e.g., cloud computing instances) of a cloud computing environment, such as cloud computing environments discussed above.

In some examples, the edge device 802 is a component of storage system such as any of the storage systems discussed above. For example, edge device 802 may be a component of an on-premises storage system located in an enterprise data center, a hosted storage system located in a remote or colocation data center, or some other physical storage system. In other examples, the edge device is 802 is an enterprise server or other network appliance configured to interface with one or more storage systems (e.g., a fleet of storage systems). In these examples, the edge device 802 may be, for example, a server that is collocated with one or more storage systems in an enterprise data center. In yet other examples, the edge device 802 is a virtual device such a virtual machine hosted on a physical storage system, server, or other device collocated with one or more enterprise storage systems. For ease of explanation, in the example of FIG. 8, the edge device 802 is described in the context of a on-premises physical storage system unless otherwise noted. For example, the edge device can be embodied in a storage controller 812 of a storage system 862. The edge device 802 is also configured to send telemetry data (e.g., capacity, load, etc.) to the cloud-based storage service.

In some examples, the cloud-based storage service 804 includes an edge management service 850 for managing the edge device 802 and directing storage and data services on the edge device 802. In this regard, the cloud-based storage service 804 be associated with a user interface 860 for administrators and other enterprise personnel to configure the edge device 802 and request storage and data services on the edge device 802. For example, the user interface may be a web-based GUI. In some examples, the cloud-based storage service 804 includes a cloud-based control plane 846 for deploying and managing software on the edge device 802 as well as providing storage and data services to hosts utilizing the edge device 802. In some examples, the cloud-based storage service 804 includes one or more storage microservices 840, 842, 844 that provide storage and data services through a control channel to the edge device 802. For example, the storage microservices may include a storage orchestration microservice 842 that autonomously provisions volumes or other datasets on the edge device 802, migrates volumes, scales out storage, and so on. As another example, the storage microservices may include a data protection as-a-service (DPaaS) microservice 844 that manages snapshotting, RPO, RTO, and other data protection policies on the edge device 802 based on customer-driven objectives. As another example, the microservices may include a software update microservice 840 for deploying and upgrading software on the edge device 802. As yet another example, the storage microservices may include a disaster recovery as-a-service (DRaaS) microservice that manages data replication policies, failover procedures, and other disaster recovery safeguards for the edge device 802. The cloud-based storage service 804 may also provide other storage and data services. In some non-limiting examples, control messages sent to the edge device 802 from the cloud-based storage service 804 may include messages directing the edge device 802 to install or update software on the edge device 802, provision a volume on the edge device 802, take a snapshot of a volume on the edge device 802, set a policy on the edge device 802 and so on. In some examples, the control plane 846 and its constituent microservices are architected as a service mesh.

The data communications link 806 may be embodied as a data communications pathway that is provided through the use of one or more private and/or public data communications networks such as a LAN, WAN, SAN, the public Internet, a virtual private network, or as some other mechanism capable of transporting digital information between the edge device 802 and the cloud-based storage service 804. In such an example, digital information, such as control messages and telemetry data, may be exchanged between the edge device 802 and the cloud-base storage service 804 via the data communications link 806 using one or more data communications protocols. For example, digital information may be exchanged using hypertext transfer protocol (HTTP), internet protocol (IP), transmission control protocol (TCP), user datagram protocol (UDP), transport layer security (TLS), and so on. In some examples, the data communications link 806 utilizes an Internet-of-Things (IoT) messaging protocol such as the message queue telemetry transport (MQTT), advanced message queue protocol (AMQP), or other IoT messaging protocol. In such examples, messages and data may be passed between the edge device 802 and the cloud-based storage service 804 via a publish/subscribe messaging model and a message broker. In some examples, the IoT messaging layer supports over-the-air (OTA) installation and update of software on the edge device 802 from the cloud-based storage service 804.

In some implementations, the edge device 802 includes an edge management gateway 820 configured for communication with the edge management service 850 of the cloud-based storage service 804. The edge management gateway 820 receives control messages published by the edge management service 850, including but not limited to software installation messages, software update messages, security patching, and API calls for storage orchestration, DPaaS, DRaaS, and other storage and data services. As such, the edge management gateway 820 may read control messages published by the control plane 846 including the storage orchestration microservice 842, the DPaaS microservice 842, and so on. The edge device 802 also includes one or more storage service agents 822, 824, 826 that perform an action based on the control messages. For example, the edge device 802 may include a software update agent 822 that responds to control messages issued by the control plane 846 based on a user indication to deploy a software update. Thus, in some examples, the edge device 802 is configured to receive an "over-the-air" (OTA) software update from the cloud-based storage service 804 via the data communications link 806. The edge device 802 may also include a storage orchestration agent 824 that responds to control messages issued by the storage orchestration microservice 842 such as, for example, control messages to create, modify, or move volumes. The edge device 802 may also include a DPaaS agent 826 that responds to control messages issued by the DPaaS microservice 844, such as, for example, control messages to set data protection policies, take snapshots, and so on. It will be recognized that the edge device 802 may include a variety of other agents directed to storage and data services that are provided in the cloud-based storage service 804 and carried out on the edge device 802. The edge management gateway 820 routes control messages received from the cloud-based storage service 804 to the appropriate storage service agent 822, 824, 826.

In some implementations, the storage service agents 822, 824, 826 interface with a storage operating environment 810. In some examples, the storage operating environment 810 is a storage and data services application that executes on a storage controller 812; however, in other examples the storage operating environment 810 may include a set of containerized applications executing on the storage controller 812. In examples where the edge device 802 is a storage system, the edge device 802 incudes the storage controller 812 and storage resources 814. The storage controller 812 and storage resources 814 may be any of the storage controllers and storage resources discussed above. In examples where the edge device 802 is a separate server or appliance, the storage service agents 822, 824, 826 interface with a storage operating environment of a storage controller on a storage system that is collocated with the edge device 802.

In some implementations, the storage service agents 822, 824, 826 are configured to invoke storage system APIs exposed by the storage operating environment 810, a storage system API server, or some other storage system component. For example, a storage controller may include a device API server 816 that exposes a library of device APIs 818 for the storage system. When a control message encapsulating a storage agent API request is routed by the edge management gateway 820 to one of the storage service agents 822, 824, 826, that storage service agent fulfills the request by invoking one or more device APIs 818 exposed by the device API server 816. In some examples, all messages passed between the edge management gateway 820 and the edge management service 850 are cryptographically signed in both directions.

In some implementations, the edge device 802 includes a container orchestrator 830 that deploys containerized applications that embody the storage service agents 822, 824, 826. In some examples, the edge management gateway 820 provides an indication to the container orchestrator 830 to download an agent package and install a container image embodying the storage service agent. For example, a user/administrator may direct the cloud-based storage service 804, via the user interface, to deploy a particular storage service agent on a particular edge device. In some examples, the cloud-based storage service informs the user regarding the permissions that will be granted to the storage service agent. The cloud-based storage service 804 may publish a message indicating to the edge management gateway 820 that the particular storage service agent should be deployed on the edge device 802. The edge management gateway 820 may then direct the container orchestrator 830 to download the agent package, which has been signed by the cloud-based storage service, and install the agent. In some examples, the agent package is downloaded from the cloud-based storage service 804, while in other examples the agent package may be downloaded from another trusted source.

In some implementations, the edge device 802 also includes an IoT messaging interface 832. The IoT messaging interface 832 supports an IoT message layer of the data communications link 806 between the edge device 802 and the cloud-based storage service 804. The IoT messaging interface 832 sends and receives messages transmitted in accordance with an IoT messaging protocol such as MQTT or other IoT messaging protocols. For example, the IoT messaging interface 832 may be an AWS Greengrass™ Core.

In some implementations, the edge device 802 also includes a cloud connect manager (CCM) 834. The CCM 834 performs certificate management as well as log upload to the cloud-based storage service 804. For example, the CCM 834 authenticates communication received from the cloud-based storage service 804.

In some implementations, the edge device 802 also includes a proxy 836 for communication with the cloud-based storage service 804 and for communication among components of the edge device such as the edge management gateway 820, the storage service agents 822, 824, 826, the device API server 816, the container orchestrator 830, the IoT messaging interface 832, the CCM 834, and other components that may not be discussed here. In some examples, the proxy 836 is an application layer (OSI layer 7) proxy for HTTP message routing. For example, the proxy 836 may be an Envoy proxy.

Without loss of generality, consider a non-limiting example where an enterprise administrator installs the edge management gateway 820 on the edge device 802. Once installed, the edge management gateway 820 registers the edge device 802 with the edge management service 850. Subsequently, the enterprise administrator requests the edge management service 850 to deploy a storage service agent to an enterprise edge device 802. In this example, the administrator may initiate an RPC to the edge management service 850 of the cloud-based storage service 804 specifying a storage service agent to deploy and one or more edge devices on which the storage service agent should be deployed. The edge management service 850 may employ step authentication to verify the identity of the administrator before deploying the agent. The edge management service 850 publishes a message (e.g., an IoT message) that is read by the edge management gateway 820 of an edge device 802. The edge management gateway 820 directs the container orchestrator 830 to download the agent installation package for that storage service agent. The container orchestrator 830 verifies that the installation package is signed by an authority of the cloud-based storage service 804 and, if verified, installs the agent on the edge device 802.

Without loss of generality, consider another non-limiting example where a storage orchestration microservice 842 makes an RPC (e.g., a gRPC) to the storage orchestration agent 822 to create a new volume. A control message including the RPC is published by the edge management service 850 and read by the edge management gateway 820. For example, the control message may be published in an IoT messaging layer that is read through IoT messaging interface 832. The edge management gateway 820 routes the RPC to the storage orchestration agent 822, which calls a device API to create a new volume.

Figure 9:
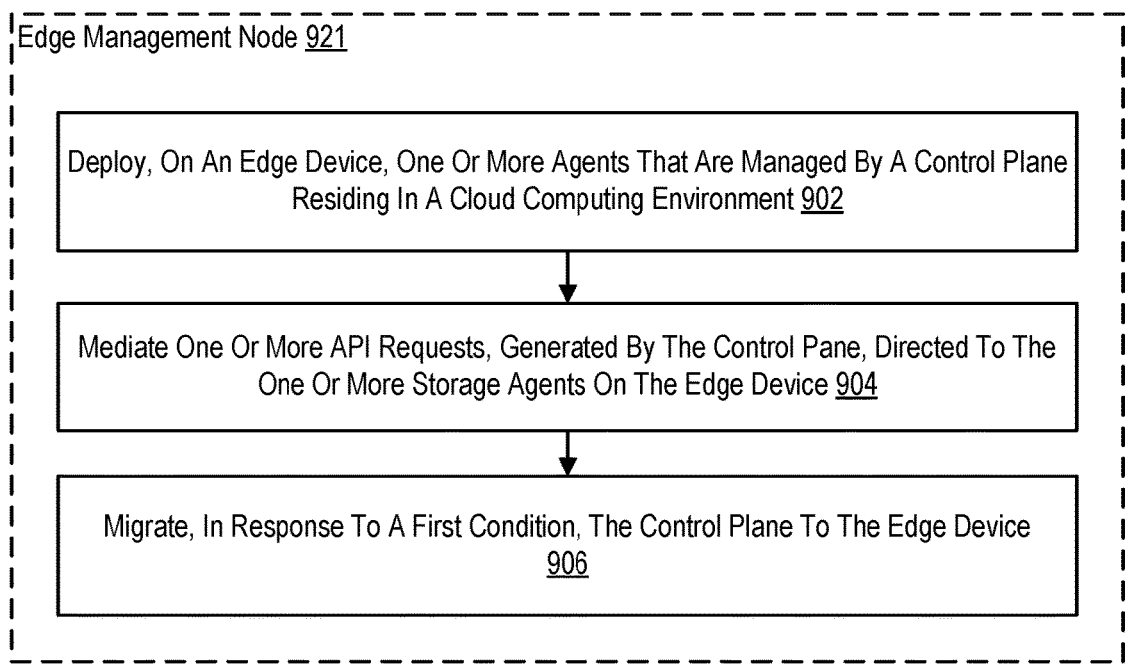
FIG. 9 sets forth a flow chart illustrating an example method of non-disruptively moving a storage fleet control plane in accordance with some embodiments of the present disclosure.
Figure 9:
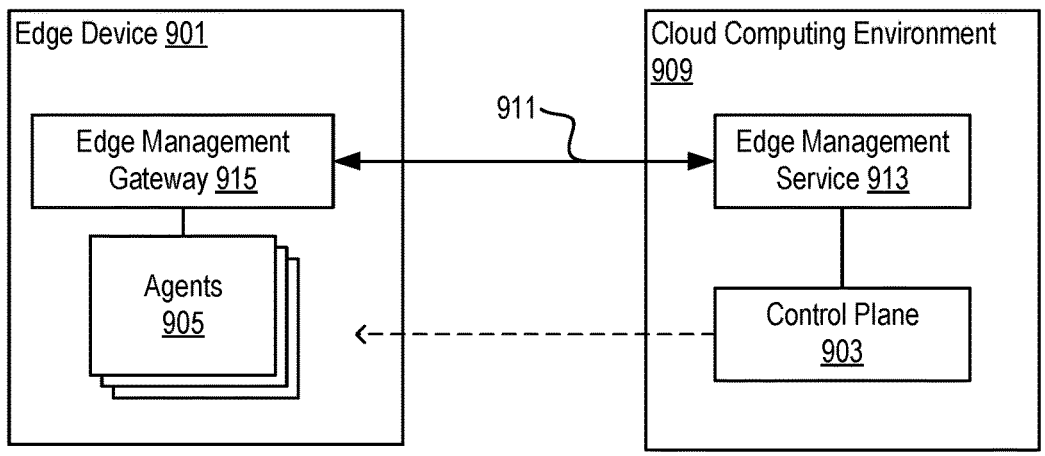

For further explanation, FIG. 9 sets forth a flow chart illustrating an example method of non-disruptively moving a storage fleet control plane according to some embodiments of the present disclosure. The example method of FIG. 9 includes deploying 902, on an edge device 901, one or more agents 905 that are managed by a control plane 903 residing in a cloud computing environment 909. Although depicted in less detail, the edge device 901 may be similar to the edge device 702 and the edge device 802 described above with reference to FIGS. 7 and 8. In fact, the edge device 901 depicted in FIG. 9 may include the same, fewer, additional components as any of the edge devices described above. In some embodiments, the edge device 901 is embodied in a physical storage system, which may be similar to any of the physical storage systems discussed above. Such a storage system may be, for example, an enterprise data storage system located in an on-premises data center. In one example, the edge device 901 is a storage controller of such a storage system. In another example, the edge device 901 is an enterprise server coupled to an enterprise storage system, for example, in an enterprise or collocation data center.

Although depicted in less detail, the cloud computing environment 909 may be similar to the cloud computing environment 316 described above with reference to FIGS. 3A-3C or the cloud computing environment 710 described above. In fact, the cloud computing environment may include the same, fewer, additional components as any of the cloud computing environments or cloud-based service environments described above. For example, the cloud computing environment may include a public cloud environment, a private cloud environment, a virtual private cloud environment, a hybrid cloud environment, and so on. The control plane 903 may be similar to the control planes discussed above with reference to FIGS. 7 and 8.

In the example of FIG. 9, the control plane 903 is supported by the cloud computing environment 909. In some examples, the control plane includes a service or set of services executing on cloud resources of the cloud computing environment 909. For example, the cloud resources may be cloud computing instances that are provided by the cloud computing environment 909 to support the execution of software and services such as the control plane 903. Thus, the control plane 903 "resides" in the cloud computing environment 909 in that its execution is supported by cloud resources. In some examples, the control plane 903 includes a set of microservices that are, for example, containerized services or applications whose execution is supported by the cloud computing environment 909. The control plane 903 manages the edge device 901, or a fleet of edge devices 901, through one or more agents 905 installed on the edge device 901. For example, the control plane 903 and the agents 905 share an API architecture through which the control plane makes remote API calls to the agents 905 on the edge device. The agents 905, in turn, respond to the API calls by interacting with device APIs. The device APIs may be, for example, APIs native to the edge device 901 or APIs that are exposed to the edge device 901 by another device such as a connected storage system or fleet of storage systems.

In some examples, the control plane 903 is a control plane for a storage service whose execution is supported by cloud resources, i.e., a cloud-based storage service. In these examples, the agents 905 are storage service agents that are managed by the control plane 903 to provide storage and data services. In response to API call from the control plane 903 for a storage or data services function, an agent 905 invokes one or more storage system APIs to carry out that storage or data services function. In some examples, the agent 905 may perform a translation of the API call received by the agent 905 from the control plane 903 to the storage system APIs that are invoked, particularly where the exposed storage system APIs are platform dependent. In various implementations, as discussed above, the edge device 901 may be a component of a storage system (e.g., a storage controller) or as a server coupled to a storage system or fleet of storage systems. In one example, where the edge device 901 is a storage controller of a storage system, the edge device 901 may include one or more storage system API servers through which the agents 905 invoke storage system APIs. In another example, where the edge device 901 is a server, the agents 905 may invoke storage system APIs through storage system API servers provided on connected storage systems.

In some implementations, the control plane 903 includes a set of storage microservices that are containerized services deployed on cloud resources, and that manage storage service agents 905 on the edge device 901. The storage microservices provide storage and data services that are carried out on storage systems that are edge devices or that are coupled to edge devices. For example, the storage microservices may include a storage orchestrator that autonomously provisions volumes, migrates volumes, scales out storage, defines placement groups, and other storage operations or storage-as-code features. As another example, the storage microservices may include a data protection as-a-service (DPaaS) microservice that manages snapshotting, RPO, RTO, and other data protection policies on storage systems based on customer-driven objectives. As another example, the storage microservices may include a software update microservice for deploying and upgrading software on storage systems. As yet another example, the storage microservices may include a disaster recovery as-a-service (DRaaS) microservice that manages data replication policies, failover procedures, and other disaster recovery safeguards for storage systems. As still another example, the storage microservices may include a cloud synchronization microservice that provides AI and ML models and updates to those modes to storage systems. Readers will appreciate that a variety of other storage and data services may be provided by the control plane 903. In some examples, each agent 905 on an edge device corresponds to a microservice of the control plane. As such, there may be a storage orchestrator agent, DPaaS agent, and so on. These agents 905 invoke storage system APIs to carry out storage orchestration, data protection, and so on.

In some examples, an edge device 901 and the cloud computing environment 909 include nodes of an edge management control channel 911 through which the control plane 903 and the edge device 901 communicate. For example, the edge management control channel 911 may be implemented through an IoT messaging layer based on one or more IoT messaging protocols. In one example, the cloud computing environment 909 includes an edge management service 913 that implements a node of the edge management control channel 911. For example, the edge management service 913 may be embodied as a set of computer program instructions, such as a containerized application stored in cloud-based storage, that execute on cloud computing resources. In these examples, the edge management service 913 is utilized by the control plane for communication with the agents 905. As another example, the edge device 901 includes an edge management gateway 915 that implements a node of the edge management control channel 911. For example, the edge management gateway 915 may be embodied as a set of computer program instructions, stored on a computer-readable medium, that execute on a processor of the edge device 901. In these examples, the edge management gateway 915 reads control messages from the control plane 903 and communicates with the agents 905 and other edge device components (e.g., a container orchestrator or certificate manager) in response to control messages. Thus, in such examples, the edge management control channel 911 provides a standard messaging layer between the control plane 903 and the agents 905 through the edge management nodes. Further, the edge management control channel 911 supports a mechanism for deploying agents 905 to edge devices 901, which is described in more detail below.

Deploying 902, on an edge device 901, one or more agents 905 that are managed by a control plane 903 residing in a cloud computing environment 909 may be carried out by an edge management node 921. In some examples, where the edge management node 921 is the edge management service 913, the edge management service 913 deploys 902 the agents 905 on the edge device 901 by sending a control message to the edge management gateway 915. For example, the edge management service 913 may receive a request (e.g., through a user interface) from an administrator or other personnel associated with the edge device or fleet of enterprise storage systems coupled to the edge device. The request may indicate one or more agents for deployment and one or more edge devices on which the agents should be deployed. As one example, where an edge device is implemented in an enterprise storage system, the edge management service 913 may receive a request from an administrator of a fleet of enterprise storage system identifying a list of storage service agents and a list of enterprise storage systems on which to deploy those storage service agents. In response to such requests, the edge management service 913 sends or publishes a control message directed to the edge management gateway 915 of the identified edge devices. In some implementations, the control message directs the edge management gateway 915 to install an identified agent 905. In additional implementations, the control message or subsequent messages may include an installation package for the identified agent 905. In this manner, the edge management service 913 may provide over-the-air ('OTA') software for the agent 905. For example, an OTA installation package may be a container package for a containerized application that implements the agent 905. In some implementations, the edge management service 913 deploys updates and security patches to one or more the agents 905 in the same manner that the agents 905 were originally deployed.

In some examples, where the edge management node 921 is the edge management gateway 915, the edge management gateway 915 deploys 902 the agents 905 on the edge device 901 by directing a container orchestrator of the edge device 901 to install an agent 905 identified in the control message received from the edge management service 913. For example, in response to a request from the edge management gateway 915, the container orchestrator may download a container package for the agent 905 from a container registry associated with the edge management service 913 and install an image of an agent application. In such examples, the agent 905 may execute on a container platform of the edge device. In other implementations, where the agent installation package is provided by the edge management service 913 as OTA software, the edge management gateway 915 may direct the container orchestrator to install the agent 905 from the received installation package.

In the example method of FIG. 9, an edge management node 921 also mediates 904 one or more API requests, generated by the control plane 903, directed to the one or more agents 905 on the edge device 901. In some examples, the edge management service 913 mediates 904 API calls from the control plane by receiving an API call that utilizes an API architecture shared by the control plane 903 and the agents 905 and converting the API call from the control plane 903 into a message that can be transmitted over the edge management control channel 911. For example, the control plane 903 and agent 905 may utilize a REST (e.g., HTTP) or RPC (e.g., gRPC) API architecture through which the control plane 903 invokes functions of the agent 905. For example, where the agent 905 is a storage service agent, the control plane 903 may invoke a 'create volume' function exposed by an agent API, or a 'create replication target' function exposed by an agent API. In such examples, the edge management service 913 may encapsulate the API call in a message that can be transmitted over the edge management control channel 911 to the edge management gateway

915. In this way, the API architecture of the control plane 903 and the agents 905 is overlayed on a messaging platform utilized by the edge management service 913 and edge management gateway 915 through the edge management control channel 911. In some examples, as described in more detail below, the messaging platform may be an IoT messaging platform, where the messages (i.e., control messages) are IoT messages in accordance with an IoT messaging protocol (e.g., MQTT).

In some examples, the edge management gateway 915 mediates 904 API calls by the control plane 903 by receiving a control message from the edge management service 913 that encapsulates the API call by the control plane 903 and routing the API call to the agent 905. In some implementations, the edge management gateway 915 extracts the API call from the control message. For example, the edge management gateway 915 may extract a REST or RPC API call from a message (e.g., an IoT message) transmitted by the edge management service 913. The edge management gateway 915 then determines, based on an identifier or path indicated in the API call, to which agent 905 the call is directed and routes the call to that agent 905. As discussed above, upon receiving the API call, an agent 905 invokes on or more local APIs exposed on the edge device 901. For example, an agent 905 may invoke a local platform-dependent API call that creates a volume on an enterprise storage system in response to an API call from the control plane 903.

In the example method of FIG. 9, an edge management node 921 also migrates 906, in response to a first condition, the control plane 903 to the edge device 901. In some examples, the edge management service 913 migrates 906 the control plane 903 to the edge device 901 by pushing the control plane 903 to the edge device 901 in response to detecting a particular condition. For example, the condition may be an impending scheduled outage where the cloud-based control plane 903 will be unavailable. As another example, the condition may be detecting a connection quality characteristic such as increased latency, disruption in connectivity, or other aspects of communication between the edge device 901 and the cloud-based control plane 903. For example, the edge management service 913 or the control plane 903 may determine that the time between a dispatched API call and a response from the agent is above a predetermined threshold. As another example, the condition may be a request from an administrator to migrate the control plane 903 to the edge device 901. In some implementations, the edge management service 913 migrates 906 the control plane by directing the edge management gateway 915 (e.g., through a control message) to deploy the control plane 903 or components (e.g., microservices) of the control plane 903 on the edge device 901.

In some examples, the edge management gateway 915 migrates 906 the control plane 903 to the edge device 901 by deploying the control plane 903 in response to a particular condition. For example, the condition may be the receipt of a control message from the edge management service 913 directing the edge management gateway 915 to deploy the control plane 903 on the edge device 901. As another example, the condition may be the detection of a degradation in connectivity to the edge management service 913. For example, the edge management gateway 915 may determine that it is unable to communicate with the edge management service 913 and thus the control plane 903. As yet another example, the condition may be a request from the administrator to deploy the control plane 903 on the edge device. In some implementations, the edge management gateway 915 migrates 906 the control plane 903 to the edge device 901 by requesting the container orchestrator on the edge device 901 to install one or more images for the control plane 903. For example, where the control plane 903 is a collection of microservices, the edge management gateway 915 may direct the container orchestrator to install containerized applications embodying those microservices. In some examples, the microservices are storage microservices. In some cases, the container orchestrator can download install packages for the control plane from a container registry associated with the cloud computing environment 909. In other cases, the images for the control plane may be already present on the edge device, in which case the container orchestrator may launch the container(s) embodying the control plane 903. Once the control plane 903 is deployed on the edge device 901, the edge management gateway 915 may confirm successful migration of the control plane 903 to the edge device.

In some implementations, upon successful migration of the control plane 903 to the edge device 901, a host connection to the control plane 903 is also migrated to the edge device 901. In some examples, the edge management service 913 coordinates the migration of host access to the control plane 903 from the cloud computing environment 909 to the edge device 901. For example, the edge management service 913 may redirect a virtual address from the cloud computing environment 909 to a port on the edge device 901. Thus, host access to the control plane 903 is non-disruptively migrated from the cloud computing environment 909 to the edge device 901. Once the control plane 903 has been deployed on the edge device 901, the control plane 903 can dispatch API calls directly to the agents 905, thus bypassing the edge management service 913 and edge management gateway 915. In other words, no additional encapsulation or adaptation of the API calls is necessary for the agents 905 to receive those API calls. Because the control plane 903 and the agents 905 utilize the same API architecture whether the control plane is resident in the cloud computing environment 909 or on the edge device 901 itself, the control plane 903 can remain agnostic to its computing environment thus facilitating seamless migration.

Figure 10:
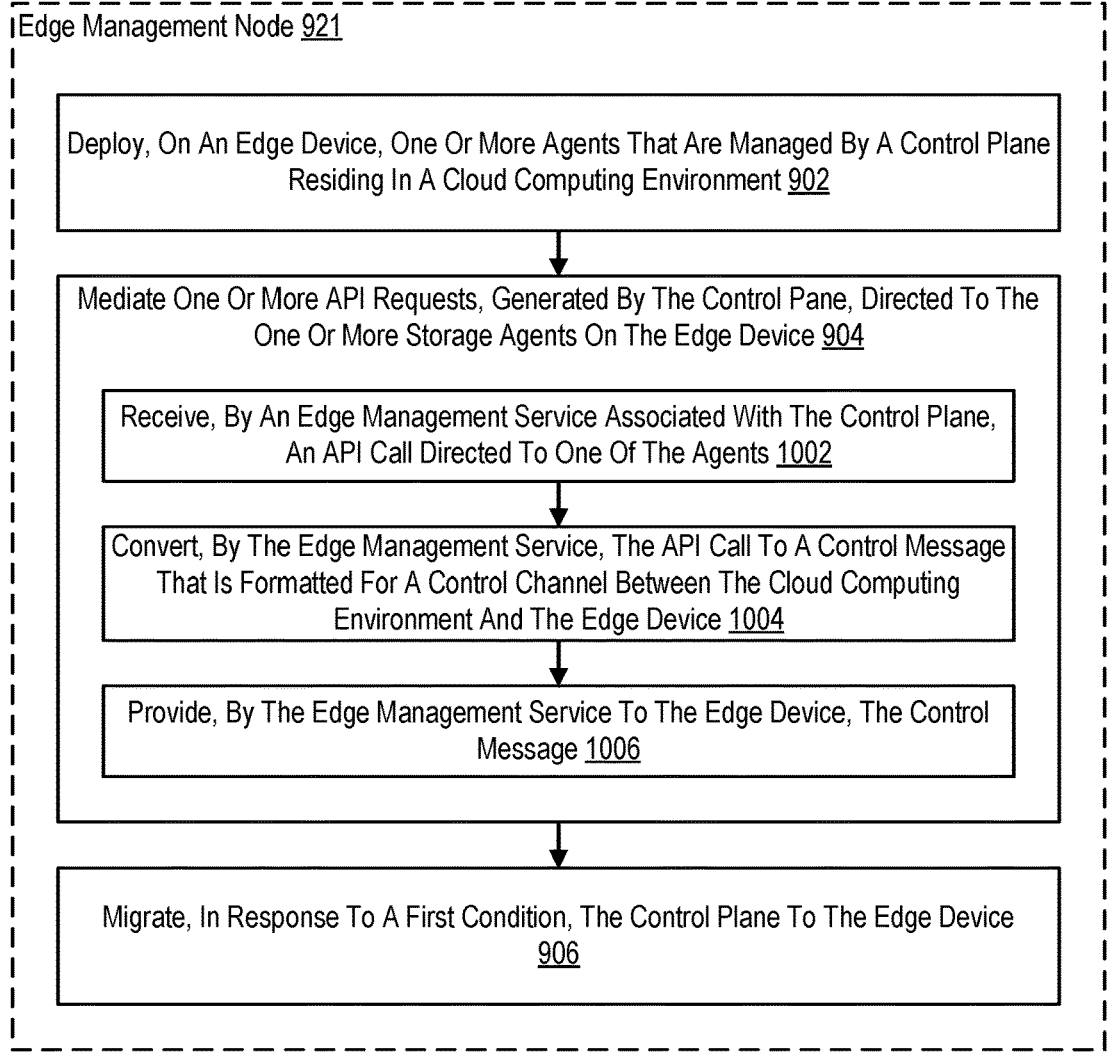
FIG. 10 sets forth a flow chart illustrating an additional example method of non-disruptively moving a storage fleet control plane in accordance with some embodiments of the present disclosure.
Figure 10:
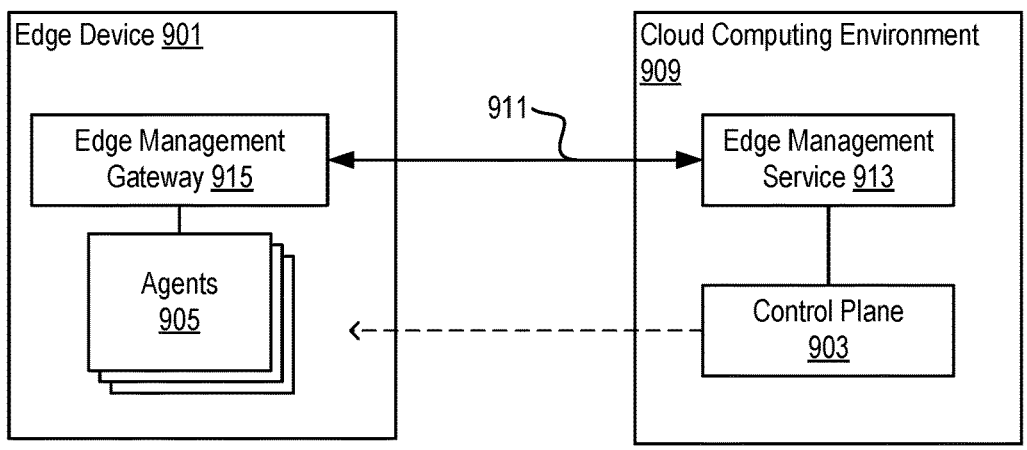

For further explanation, FIG. 10 sets forth a flow chart illustrating another example method of non-disruptively moving a storage fleet control plane according to some embodiments of the present disclosure. The example method of FIG. 10 includes the aspects described above with regard to FIG. 9. However, in the example method of FIG. 10, mediating 904 one or more API requests, generated by the control plane 903, directed to the one or more agents 905 on the edge device 901 also includes receiving 1002, by the edge management service 913 associated with the control plane 903, an API call directed to one of the agents 905, as discussed above. In some implementations, the control plane 903 includes one or more API clients. For example, the control plane 903 may comprise one or more user services (e.g., microservices) where each service includes its own API client. The API client may correspond to an API server of particular agent 905 on the edge device 901. In one example, the API client is a gRPC client. Each of the user services may be storage microservices such as those discussed above. When a microservice of the control plane 903 makes an API call to an agent 905 through its API client, the API call is mediated by the edge management service 913.

In the example of FIG. 10, mediating 904 API requests also includes converting 1004, by the edge management service 913, an API call to a control message that is formatted for a control channel 911 between the cloud computing environment 909 and the edge device 901, as discussed above. In some implementations, the edge management control channel 911 coupling the cloud-based edge management service 913 and the edge management gateway 915 on the edge device 901 is implemented by an IoT messaging layer utilizing one or more IoT protocols.

In such examples, the edge management service 913 encapsulates the API call in an IoT message. For example, the edge management service 913 may convert a REST or RPC call directed to an agent to an IoT message that can be published over the IoT messaging layer. As one example, the edge management service 913 generates an IoT message packet (e.g., an MQTT packet) that includes the API call as a payload of the IoT message packet.

In the example of FIG. 10, mediating 904 API requests also includes providing 1006, by the edge management service 913, the control message to the edge device 901. In some implementations, the edge management service 913 provides the control message by publishing an IoT message, that encapsulates the API call, through an IoT messaging layer. The IoT message is read by the edge management gateway 915 of the edge device 901. For example, the edge management service 913 may publish the IoT message to a control channel subscribed to by the edge management gateway 915. In some examples, the edge management control channel 911 includes an MQTT messaging layer, and the IoT message is provided to the edge management gateway 915 as an MQTT message, although it will be recognized that other IoT protocols may be used. It will also be recognized that the edge management service 913 may provide the control message to the edge device through other messaging protocols that are not IoT protocols.

Figure 11:
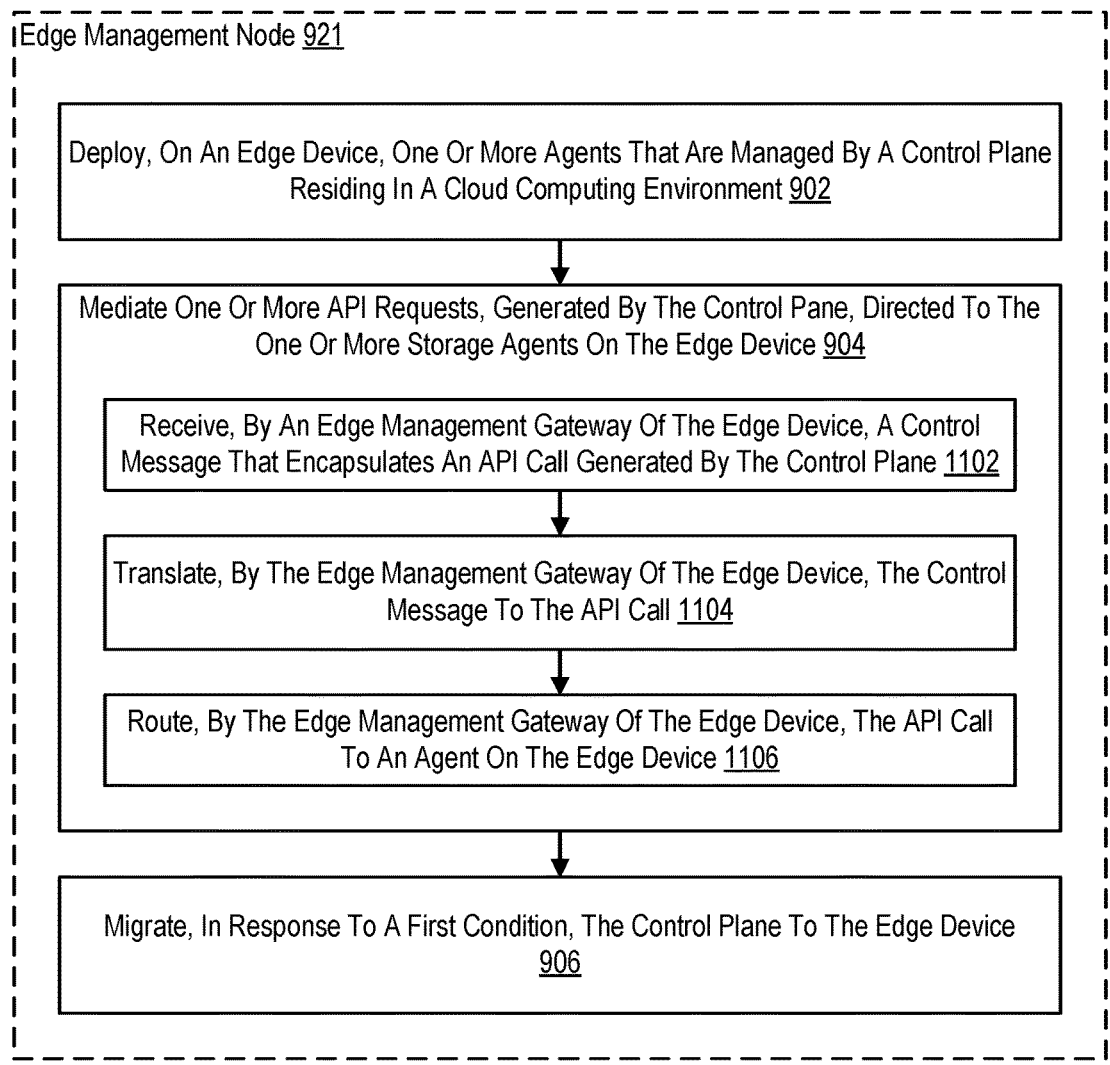
FIG. 11 sets forth a flow chart illustrating an additional example method of non-disruptively moving a storage fleet control plane in accordance with some embodiments of the present disclosure.
Figure 11:
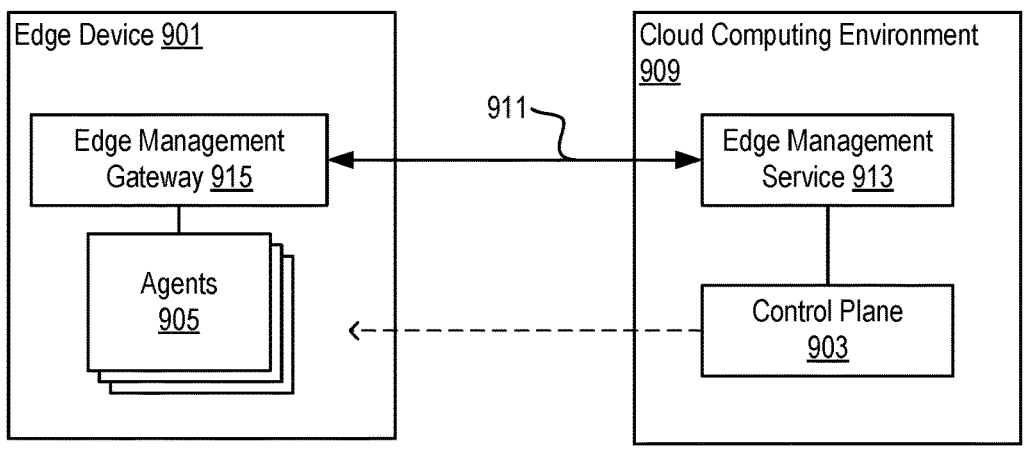

For further explanation, FIG. 11 sets forth a flow chart illustrating another example method of non-disruptively moving a storage fleet control plane according to some embodiments of the present disclosure. The example method of FIG. 11 includes the aspects described above with regard to FIG. 9. However, in the example method of FIG. 11, mediating 904 one or more API requests, generated by the control plane 903, directed to the one or more agents 905 on the edge device 901 also includes receiving 1102, by an edge management gateway 915 of the edge device 901, a control message that encapsulates an API call generated by the control plane 903. In some examples, as discussed above, the API call is encapsulated in a control message that is formatted for the edge management control channel 911. For example, the API call may be a REST or RPC API call that is encapsulated in an IoT message that is provided over an IoT messaging layer. In some implementations, the edge management gateway 915 is a subscriber of the edge management control channel 911, and thus reads the control message subsequent to publishing by the edge management service 913. The edge management gateway 915 is configured to identify, from the control message, that the control message includes an API call directed to an agent 905 on the edge device 901. For example, the control message may be embodied in a packet (e.g., and MQTT packet) that indicates the control message includes an API call for an agent of the edge device.

In the example of FIG. 11, mediating 904 API requests also includes translating 1104, by the edge management gateway 915 of the edge device 901, the control message to the API call. In some examples, the edge management gateway 915 extracts the encapsulated API call generated by the control plane 903 from the control message that was transmitted by the edge management service 913. For example, the edge management gateway 915 may extract the API call from a payload of an IoT message packet (e.g., an MQTT packet). In one example, the API call generated by a storage service provided by the control plane 903 is directed to a storage service agent 905 on the edge device 901.

In the example of FIG. 11, mediating 904 API requests also includes routing 1106, by the edge management gateway 915 of the edge device 901, the API call to an agent 905 on the edge device. In some examples, the edge management gateway 915 forwards the extracted API call to the agent 905 to which the API call is directed. For example, the edge management gateway 915 may include a router for routing agent API calls to agents 905. In some implementations, each agent 905 includes an API server, such as an HTTP API server or gRPC API server, that receives the API calls generated by the control plane 903. Further, the agent 905 is configured to interface with local device APIs, which may be platform dependent. In some examples, the agent 905 is configured to interface with an API server of a local storage system. For example, the local storage system may be an enterprise storage system that includes the edge device or a collocated enterprise storage system. The agent 905, whether the edge device 901 is included in a storage system or as a standalone appliance, may be configured to interface with storage system API servers of a fleet of storage systems. Thus, in some implementations, the edge device 901 and agents 905 on the edge device may be configured to receive API calls generated by the control plane 903 and invoke, in response to those API calls, storage system APIs for a local storage system or fleet of storage systems, thus allowing storage and data services on enterprise storage systems to be managed by a cloud-based control plane 903.

However, subsequent to migration of the control plane 903 to the edge device 901, an API call generated by the migrated control plane 903 and received by the agent 905 bypasses the edge management service 913 and edge management gateway 915. That is, the migrated control plane 903 can directly invoke agent APIs without converting the API to and from a message formatted for the edge management control channel 911. Further, because the control plane 903 and the agent 905 share the same API architecture whether the control plane 903 is cloud-based or local to the edge device 901, no adaption of the API call is required for the API call to the agent. For example, an API client of the control plane 903 can directly call on an API server of the agent, thus bypassing the edge management gateway 915. For example, where the control plane includes one or more storage microservices, a containerized storage microservice that is now deployed on the edge device 901 (after migration) can now generate an API call directed to a storage service agent 905 on the edge device 901 without any conversion, translation, or other adaption of that API call.

Figure 12:
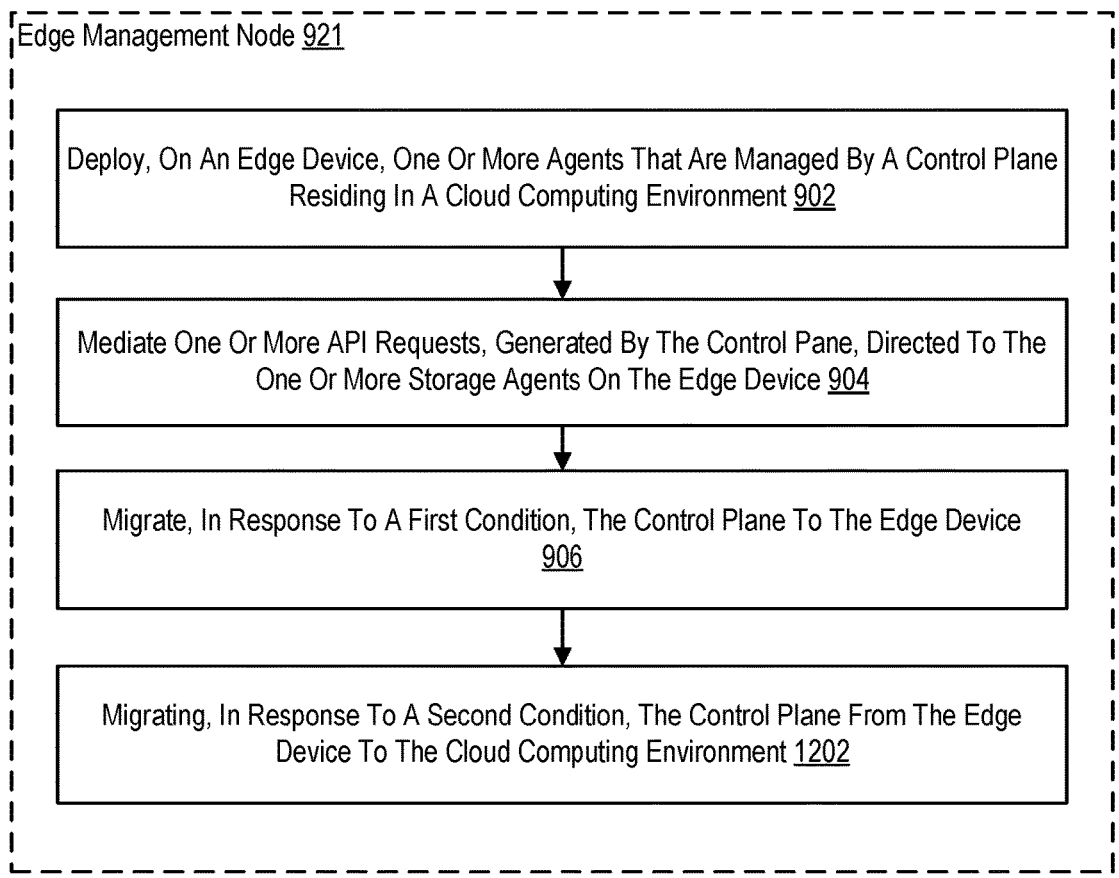
FIG. 12 sets forth a flow chart illustrating an additional example method of non-disruptively moving a storage fleet control plane in accordance with some embodiments of the present disclosure.
Figure 12:
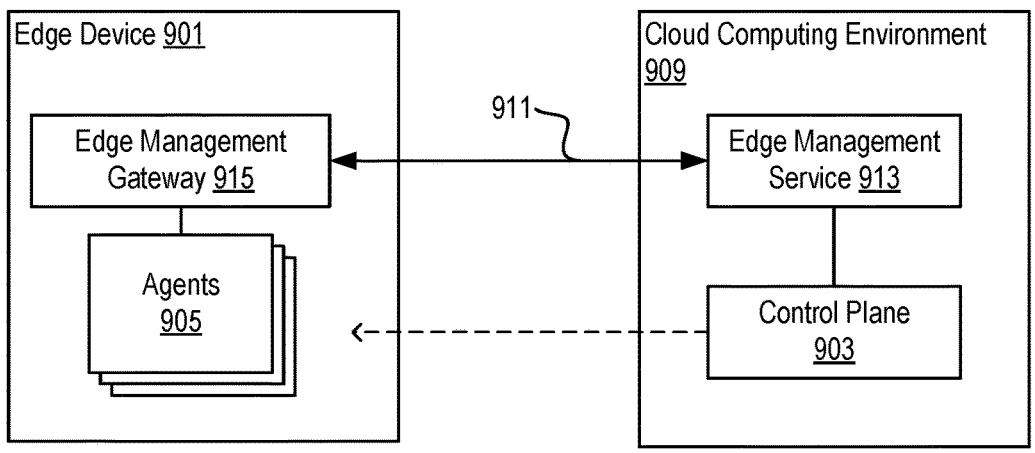

For further explanation, FIG. 12 sets forth a flow chart illustrating another example method of non-disruptively moving a storage fleet control plane according to some embodiments of the present disclosure. The example method of FIG. 12 includes the aspects described above with regard to FIG. 9. The example of FIG. 12 also includes migrating 1202, in response to a second condition, the control plane 903 from the edge device 901 to the cloud computing environment 909. In some examples, the edge management service 913 migrates 1202 the control plane 903 from the edge device 901 to the cloud computing environment 909 by redeploying the control plane 903 in response to detecting a particular condition. For example, the condition may be the completion of scheduled outage where a cloud-based control plane 903 was unavailable. As another example, the condition may be an improvement to latency, connectivity or other aspects of communication between the edge device 901 and the cloud computing environment 909. As another example, the condition may be a request from an administrator to migrate the control plane 903 to the cloud computing environment 909. Upon successful migration of the control plane 903 from the edge device 901 to the cloud computing environment 909, a host connection to the control plane 903 is also migrated to the cloud computing environment 909. In some examples, the edge management service 913 coordinates the migration of host access to the control plane 903. For example, the edge management service 913 may redirect a virtual address from a port on the edge device 901 to a cloud computing instance in the cloud computing environment 909. Thus, host access to the control plane 903 is non-disruptively migrated from the edge device 901 to the cloud computing environment 909. Once the control plane 903 has been deployed in the cloud computing environment 909 the edge management service 913 resumes the mediation of API calls generated by the control plane and directed to agents 905 on the edge device 901, while host access to the control plane 903 is not disrupted.

Example embodiments are described largely in the context of a fully functional computer system. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Embodiments can include be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to some embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   deploying, on an edge device, one or more agents that process control messages generated from one or more API requests sent by a control plane residing remotely in a cloud computing environment, wherein the one or more API requests are converted into control messages formatted for the one or more agents on the edge device; and
   migrating, in response to a first condition, the control plane to the edge device, whereupon the one or more API requests are dispatched directly from the control plane residing on the edge device, bypassing conversion.

2. The method of claim 1, wherein the control plane includes one or more containerized microservices.

3. The method of claim 1, wherein the edge device is embodied in a storage system; wherein the one or more agents are storage service agents; and wherein the control plane provides one or more storage and data services utilizing the one or more storage service agents.

4. The method of claim 1, wherein the one or more agents are configured to interface with one or more local APIs of the edge device.

5. The method of claim 1, wherein the control plane and the one or more agents utilize a particular API architecture; and wherein the control plane utilizes the particular API architecture when residing in the cloud computing environment and when residing on the edge device subsequent to migration.

6. The method of claim 1, wherein the first condition relates to at least one of an availability of the control plane, a quality of a data link between the control plane and the one or more agents, and a user request.

7. The method of claim 1, wherein the conversion of the one or more API requests into control messages formatted for the one or more agents on the edge device includes:
   receiving, by an edge management service associated with the control plane, an API request directed to one of the agents;
   converting, by the edge management service, the API request to a control message that is formatted for a control channel between the cloud computing environment and the edge device; and
   providing, by the edge management service to the edge device, the control message.

8. The method of claim 7, wherein the control message is embodied in an Internet-of-Things (IoT) message and the control channel includes an IoT messaging layer.

9. The method of claim 8, wherein the IoT message encapsulates the API request.

10. The method of claim 1, wherein the conversion of the one or more API requests into control messages formatted for the one or more agents on the edge device includes:
    receiving, by an edge management gateway of the edge device, a control message that encapsulates an API request generated by the control plane;
    translating, by the edge management gateway of the edge device, the control message to the API request; and
    routing, by the edge management gateway of the edge device, the API request to an agent on the edge device.

11. The method of claim 1, wherein, subsequent to migration of the control plane, an API request generated by the migrated control plane and received by an agent bypasses conversion by an edge management node in the cloud computing environment.

12. The method of claim 1 further comprising:
    migrating, in response to a second condition, the control plane from the edge device to the cloud computing environment.

13. An apparatus comprising:
    a memory; and
    a processor, operatively coupled to the memory, configured to:
      deploy, on an edge device, one or more agents that process control messages generated from one or more API requests sent by a control plane residing remotely in a cloud computing environment, wherein the one or more API requests are converted into control messages formatted for the one or more agents on the edge device; and
      migrate, in response to a first condition, the control plane to the edge device, whereupon the one or more API requests are dispatched directly from the control plane residing on the edge device, bypassing conversion.

14. The apparatus of claim 13, wherein the edge device is embodied in a storage system; and wherein the control plane includes one or more storage and data services for the storage system.

15. The apparatus of claim 13, wherein the one or more agents are configured to interface with one or more local APIs of the edge device.

16. The apparatus of claim 13, wherein the conversion of the one or more API requests into control messages formatted for the one or more agents on the edge device includes:
   receive, by an edge management service associated with the control plane, an API request directed to one of the agents;
   convert, by the edge management service, the API request to a control message that is formatted for a control channel between the cloud computing environment and the edge device; and
   provide, by the edge management service to the edge device, the control message.

17. The apparatus of claim 13, wherein the conversion of the one or more API requests into control messages formatted for the one or more agents on the edge device includes:
   receive, by an edge management gateway of the edge device, a control message that encapsulates an API request generated by the control plane;
   translate, by the edge management gateway of the edge device, the control message to the API request; and
   route, by the edge management gateway of the edge device, the API request to an agent on the edge device.

18. The apparatus of claim 13, wherein, subsequent to migration of the control plane, an API request generated by the migrated control plane and received by an agent bypasses conversion by an edge management node in the cloud computing environment.

19. The apparatus of claim 13, the processor further configured to:
   migrate, in response to a second condition, the control plane from the edge device to the cloud computing environment.

20. A non-transitory computer readable storage medium storing instructions, which when executed, cause a processor to:
   deploy, on an edge device, one or more agents that process control messages generated from one or more API requests sent by a control plane residing remotely in a cloud computing environment, wherein the one or more API requests are converted into control messages formatted for the one or more agents on the edge device; and
   migrate, in response to a first condition, the control plane to the edge device, whereupon the one or more API requests are dispatched directly from the control plane residing on the edge device, bypassing conversion.

* * * * *